United States Patent
Fukui

[19]

[11] Patent Number: 6,167,202
[45] Date of Patent: *Dec. 26, 2000

[54] CAMERA SYSTEM OR FLASH UNIT

[75] Inventor: Hajime Fukui, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/696,492

[22] Filed: Aug. 14, 1996

[30] Foreign Application Priority Data

Aug. 21, 1995 [JP] Japan .................................. 7-212270
Aug. 21, 1995 [JP] Japan .................................. 7-212271
Aug. 21, 1995 [JP] Japan .................................. 7-212272
Aug. 21, 1995 [JP] Japan .................................. 7-212273

[51] Int. Cl.⁷ .............................. G03B 15/03; G03B 7/16; G03B 9/70; G03B 17/18
[52] U.S. Cl. .......................... 396/157; 396/167; 396/203
[58] Field of Search .................................... 396/157, 166, 396/167, 201, 202, 203, 164

[56] References Cited

U.S. PATENT DOCUMENTS

| | | | |
|---|---|---|---|
| 4,258,991 | 3/1981 | Kuraishi | 354/32 |
| 4,464,039 | 8/1984 | Ishida | 354/418 |
| 4,705,382 | 11/1987 | Mukai et al. | 354/412 |
| 4,969,007 | 11/1990 | Otani et al. | 354/413 |
| 5,109,244 | 4/1992 | Otani et al. | 354/127.11 |
| 5,287,134 | 2/1994 | Cocca | 354/132 |
| 5,440,368 | 8/1995 | Momochi | 354/415 |
| 5,504,553 | 4/1996 | Takagi | 354/415 |
| 5,526,091 | 6/1996 | Sakagami | 354/431 |
| 5,692,223 | 11/1997 | Ichikawa et al. | 396/182 |
| 5,732,293 | 3/1998 | Nonaka et al. | 396/157 |
| 5,839,005 | 11/1998 | Fukui | 396/159 |

*Primary Examiner*—Russell Adams
*Assistant Examiner*—Christopher E Mahoney
*Attorney, Agent, or Firm*—Robin, Blecker & Daley

[57] ABSTRACT

A camera system which performs light measurement by causing a flash unit to perform a preliminary emission before causing said flash unit to perform a main emission, and computes a control value for the main emission on the basis of a result of the light measurement, includes charge detecting circuitry for detecting a state of charge of a capacitor for storing energy to be used for emission of the flash unit, an upper limit value computer for computing an amount-of-emission upper limit value on the basis of a detection result provided by said charge detecting circuitry and decision circuitry for determining whether flash control under which the main emission can provide a correct amount-of-emission is possible, before the main emission on the basis of the control value and an amount-of-emission upper limit value computed by the upper limit value computer after the preliminary emission.

14 Claims, 35 Drawing Sheets

INSUFFICIENT AMOUNT OF LIGHT

✕ : SYMBOL INDICATIVE OF BLINKING OF LIGHT

FLASH CONTROL OK

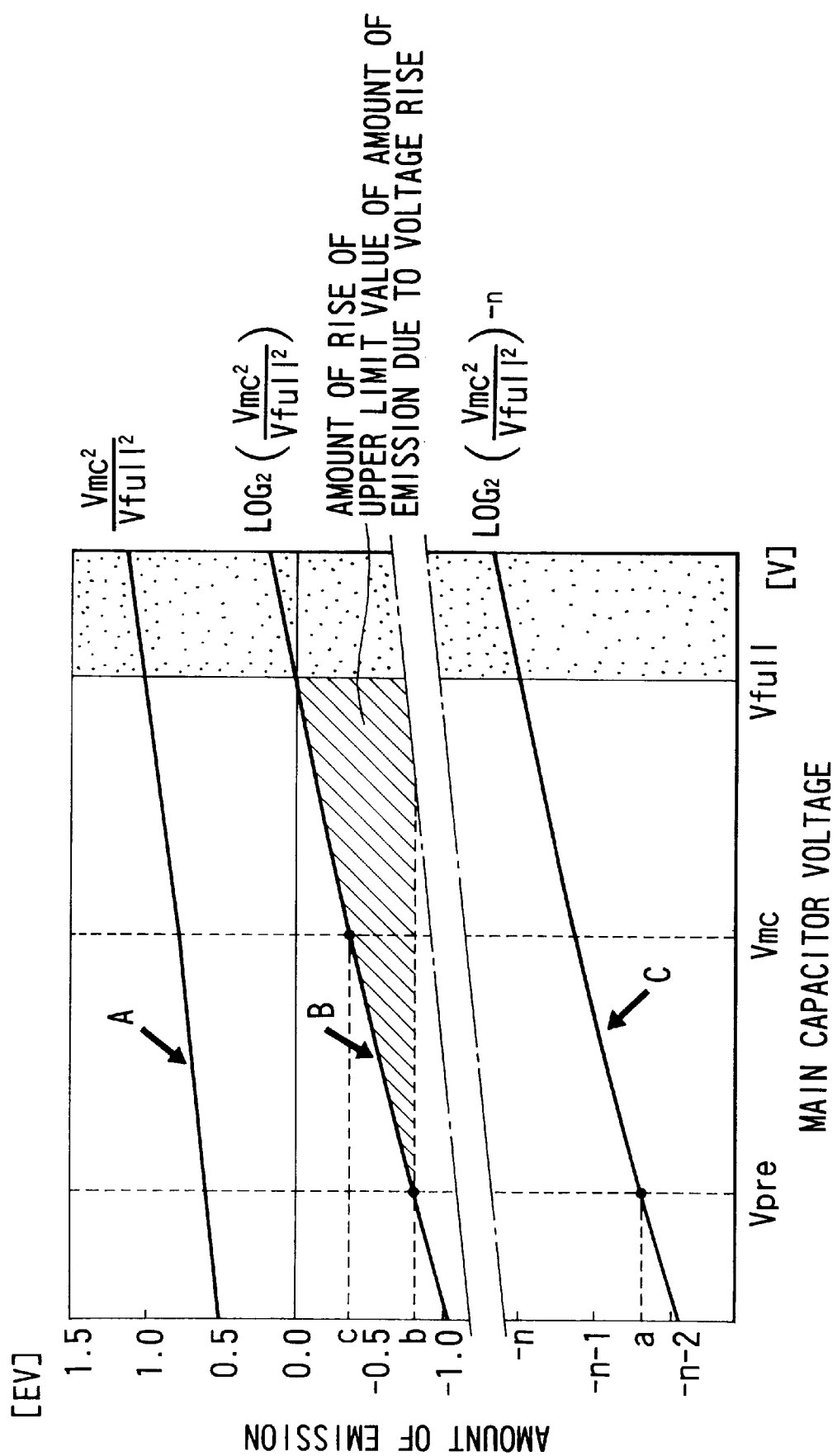

PRELIMINARY EMISSION

MAIN EMISSION

F I G. 15(a)
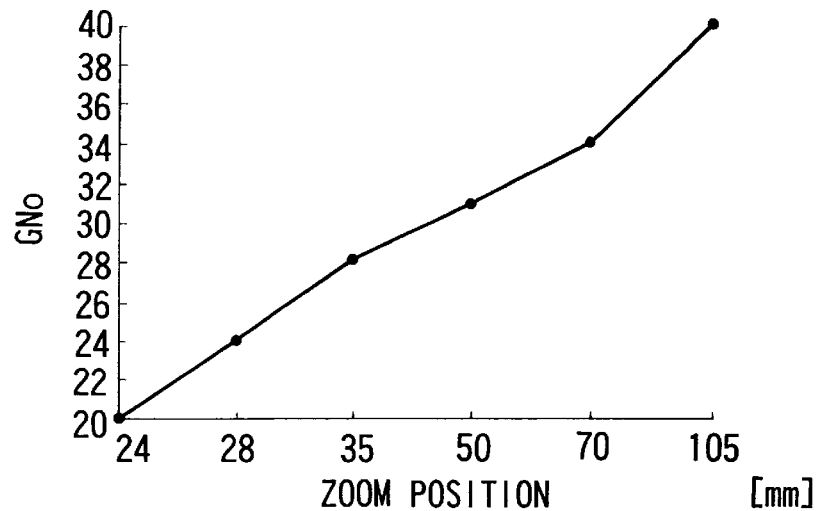
F I G. 15(b)
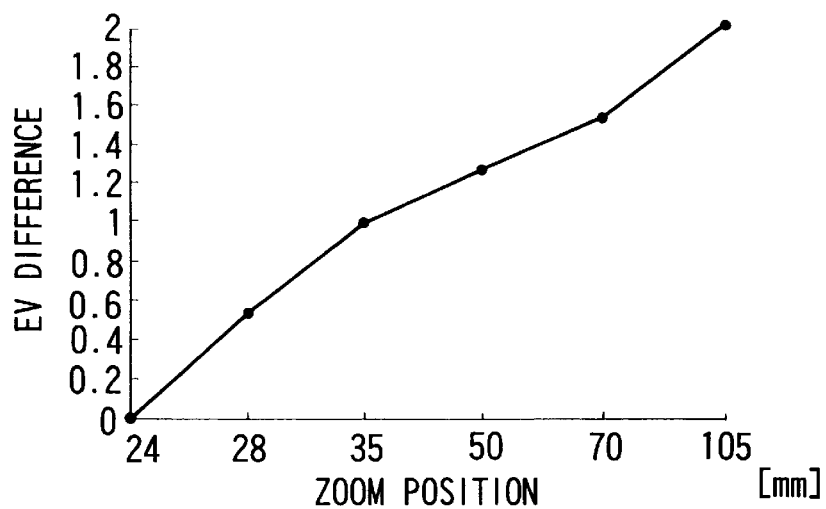
F I G. 15(c)
|  | ZOOM POSITION | | | | | |
|---|---|---|---|---|---|---|
|  | 24mm | 28mm | 35mm | 50mm | 70mm | 105mm |
| GNo | 20 | 24 | 28 | 31 | 34 | 40 |
| EV DIFFERENCE | 0.00 | 0.53 | 1.00 | 1.26 | 1.53 | 2.00 |

PRELIMINARY EMISSION (35mm)

AFTER ZOOMING (105mm)

CURRENT EFFECTIVE
RANGE OF FLASH CONTROL

EFFECTIVE RANGE OF FLASH
CONTROL AFTER ZOOMING

FRAME "b"

FRAME "a"

FRAME "b"

FRAME "a"

CAMERA SYSTEM OR FLASH UNIT

BACKGROUND OF THE INVENTION

1. Field of the Invention

The present invention relates to a camera system which is arranged to perform light measurement by performing a preliminary emission before a main emission for photography and compute a control value optimum for the main emission.

2. Description of the Related Art

In a conventional type of camera system which is arranged to determine whether correct exposure of a subject is possible, on the basis of the result of light measurement using preliminary emission, invisible light is projected toward the subject as a preliminary emission and, if correct flash exposure is expected on the basis of the subject-reflected light, a predetermined display mark is continuously lit to provide a display indicating that flash control is possible. If incorrect flash exposure is expected, the predetermined display mark is blinked to provide a warning display.

It is also known that, in a conventional TTL flash control type of camera system, if emission stop control of a flash unit is carried out within a predetermined time, it is determined that correct flash control has been performed.

However, the former type of camera system has the following problem. If a preliminary emission is performed while a capacitor for storing energy to be used for emission of a flash unit is being charged, it is possible to determine whether flash control is possible at the time of the preliminary emission, but if a preliminary emission is performed with flash control being impossible and the capacitor is subsequently charged up to a higher voltage, it is impossible to determine whether flash control has become possible as the result of the voltage rise of the capacitor.

The latter TTL flash control type of camera system has the problem that a difference in emission stop time occurs owing to the differences in reflectance between various kinds of films, so that no accurate decision result can be obtained.

Japanese Laid-Open Patent Application Nos. Sho 61-156239 and Sho 61-156240 propose other types of camera systems. In these camera systems, prior to photography, a preliminary emission pointed at a subject is carried out and the light reflected from the subject is received, and a control value for a main emission for photography is determined as a relative amount of the amount of the received light. During photography, if the actual amount of emission of the main emission reaches the determined amount of emission, the main emission is made to stop, so that a correct amount of main emission can be achieved.

Some types of camera systems which are provided with flash units employ an automatic zoom flash system which can vary the illuminating area of a flash unit by automatically changing the illuminating angle or the like of the flash unit according to the focal length (zooming) of a photographing lens. Such an automatic zoom flash system is also employed in the aforesaid type of camera system which performs preliminary emission and main emission.

Japanese Laid-open Patent Application No. Sho 60-61733 proposes a camera system which is arranged to warn a photographer if the illuminating area of a flash unit is varied after a preliminary emission. Japanese Laid-open Patent Application No. Sho 60-100125 proposes a camera system which is arranged to again perform a preliminary emission if the illuminating area of a flash unit is varied after a preliminary emission. However, the former camera system which only issues a warning cannot meet the demand for automation of photography. The latter camera system which again performs a preliminary emission after a preliminary emission has the problem that not only is a person who is a subject dazzled by the repetition of preliminary emissions but also emission energy is wastefully consumed.

Another conventional type of automatic exposure camera system is capable of performing control called "AE lock", i.e., the control of memorizing and fixing a measured light value of ambient light at an arbitrary point in time. For example, if a photographer desires to take a picture in which a main subject is located on one side of an image plane against the bright sky under a backlight condition, as shown in FIG. 36, the photographer first carries out AE lock with the camera system pointed at the main subject, as shown by a frame "a", and then moves the camera system so that the desired scene shown by a frame "b" can be photographed. In this manner, although the main subject is not located in the center of the image plane, the main subject can be photographed at a correct exposure level.

However, in the case of such a conventional automatic exposure camera system in which AE lock does not work during flash photography, if the scene shown by the frame "b" in which the main subject is not located in the center of the image plane is photographed by flash photography with the camera system pointed at the scene shown by the frame "b" in FIG. 37, flash control is performed on the background, so that the main subject is photographed at a complete overexposure level.

To solve this problem, the aforementioned camera systems described in Japanese Laid-Open Patent Application Nos. Sho 61-156239, Sho 61-156240 and Sho 60-61733 have a so-called FE lock function. In this FE lock function, prior to photography, a preliminary emission, which is pointed at the main subject as shown by the frame "a" in FIG. 37, is carried out and the light reflected from the main subject is received, and a control value for a main emission for photography is determined as a relative amount of the amount of the received light. Then, if the camera system is pointed at the scene shown by the frame "b" and the main emission is performed by the determined amount of emission, the main subject can be photographed at a correct exposure level.

Some types of camera systems which are provided with flash units are arranged to be able to vary the illuminating area of a flash unit by changing the illuminating angle or the like of the flash unit according to the focal length (zooming) of a photographing lens. Such a flash unit is also employed in the aforesaid type of camera system having the FE lock function.

SUMMARY OF THE INVENTION

One aspect of the present invention is to provide a camera system or a flash unit of the type which performs control of the amount of emission of a main emission on the basis of a preliminary emission and which determines and/or displays whether photography can be correctly effected with a flash unit even if a condition (charge voltage or illuminating angle) of the flash unit varies during the period between the preliminary emission and the main emission.

Another aspect of the present invention is to provide a camera system or a flash unit, suited to a zoom flash system, which repeatedly detects the state of an illuminating angle or the value of charge voltage of a main capacitor after a preliminary emission has been performed, finds an amount-of-emission upper limit value of the flash unit relative to the latest detected conditional change, and determines and/or displays whether flash photography can be correctly effected.

Another aspect of the present invention is to provide a camera system or a flash unit, suited to a flash zoom system, of the type which performs a preliminary emission and determines the amount of emission of a main emission and which corrects, if an illuminating angle varies after the preliminary emission, a factor for determining the amount of emission of the main emission, according to information indicative of the varied illuminating angle, and performs accurate emission control of the main emission according to the variation in the illuminating angle after the preliminary emission.

Another aspect of the present invention is to provide a camera system or a flash unit, suited to a flash zoom system, of the type which performs a preliminary emission and determines the amount of emission of a main emission and which restricts the preliminary emission if no correct correspondence is established between the focal length of a lens and the illuminating angle of the flash unit.

The above and other aspects and objects of the present invention will become apparent from the following detailed description of preferred embodiments of the present invention, taken in conjunction with the accompanying drawings.

BRIEF DESCRIPTION OF THE DRAWINGS

FIG. 7 is a graph aiding in describing an amount-of-emission upper limit value of a flash unit according to the first embodiment;

FIGS. 15(*a*), 15(*b*) and 15(*c*) are graphic representations aiding in describing an amount-of-emission upper limit value of a flash unit according to the fourth embodiment;

DETAILED DESCRIPTION OF THE PREFERRED EMBODIMENTS (First Embodiment)

Figure 1:
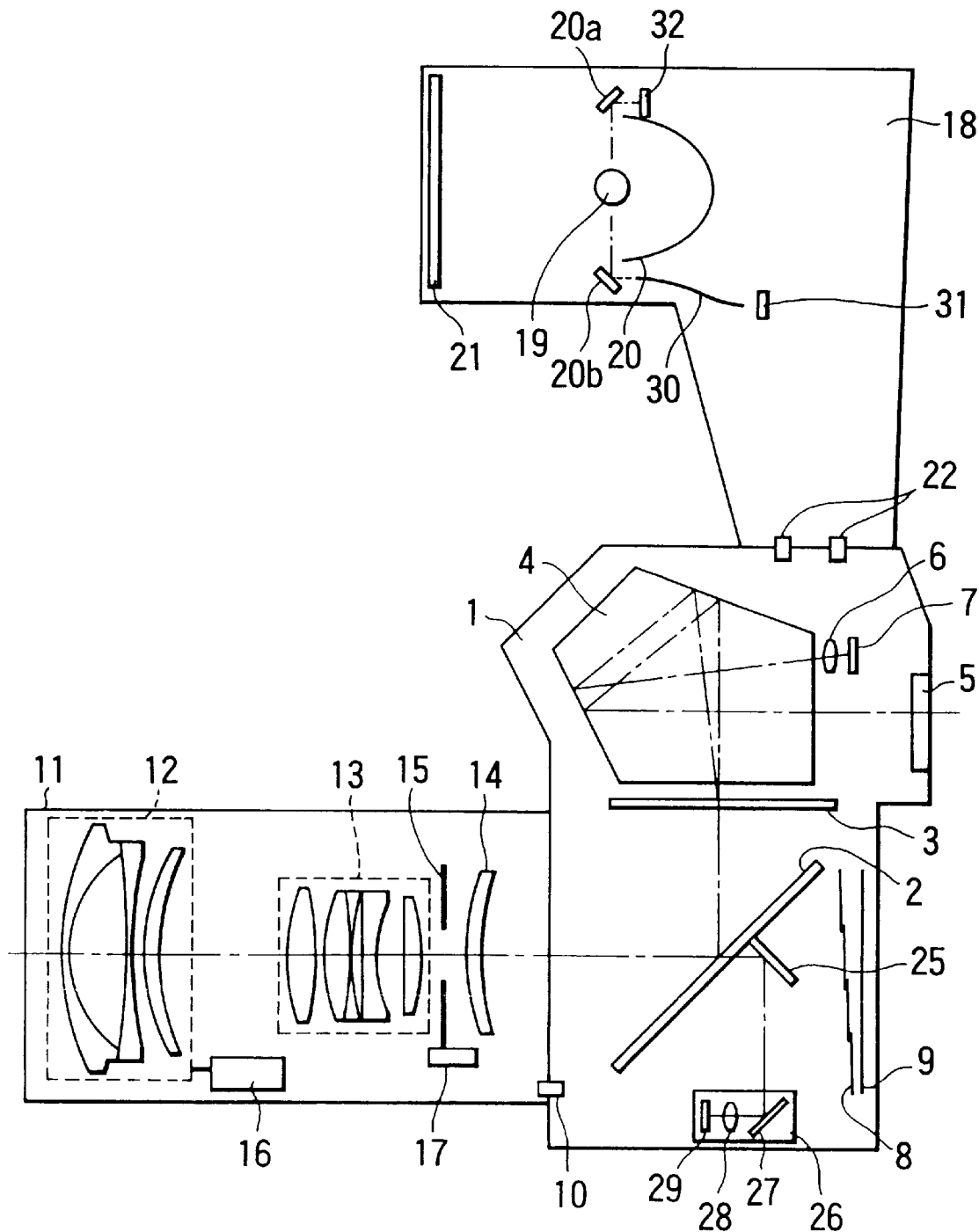
FIG. 1 is a diagrammatic cross-sectional view of a camera system according to a first embodiment of the present invention.

FIG. 1 is a diagrammatic cross-sectional view showing the optical arrangement and the like of a camera system which is applied to a single-lens reflex camera according to one embodiment of the present invention.

The single-lens reflex camera shown in FIG. 1 includes a camera body 1 in which the elements required to perform photography are accommodated, such as optical parts, mechanical parts, electrical circuits and film.

A main mirror 2 is arranged to be obliquely inserted into a photographic optical path or retracted therefrom according to whether the shown camera is placed in an observation-enabled state or a photography-enabled state. The main mirror 2 is a half-mirror which, when it is obliquely inserted in the photographic optical path, transmits approximately half of a light ray reflected from a subject and received by the main mirror 2 to a focus detecting optical system which will be described later.

A focusing screen 3 is disposed in a predetermined image forming plane of a photographing lens system (12 to 14), and a pentagonal prism 4 is provided for changing a view-finder optical path. A viewfinder 5 is arranged so that a photographer can observe a photographic image plane, by observing the focusing screen 3 through the viewfinder 5.

An image forming lens 6 and a light measuring sensor 7 are provided for measuring a subject luminance in the photographic image plane. The image forming lens 6 conjugationally relates the focusing screen 3 and the light measuring sensor 7 to each other via the reflected-light optical path formed in the pentagonal roof prism 4. Reference numeral 8 denotes a shutter and reference numeral 9 denotes a photosensitive material which is a silver-halide film or the like.

A sub-mirror 25 which bends downwardly the reflected light ray of the subject passing through the main mirror 2 and conducts the light ray to a focus detecting unit 26. A secondary image forming mirror 27, a secondary image forming lens 28, a focus detecting line sensor 29 and the like are provided in the focus detecting unit 26. The secondary image forming mirror 27 and the secondary image forming lens 28 form a focus detecting optical system, which forms a secondary image forming plane of a photographing optical system on the focus detecting line sensor 29. The focus detecting unit 26 detects the state of focus of the subject in the photographic image plane by a known phase-difference detecting method and controls a focus adjusting mechanism for the photographing lens system, through processing performed by an electrical circuit which will be described later.

Reference numeral 10 denotes a mount contact group which serves as an interface between the camera body 1 and a lens barrel 11. The lens barrel 11 is secured to the camera body 1. The photographic lens system includes the lens groups 12 to 14. The first lens group 12 is arranged to move along the optical axis of the photographing lens system and adjust the position of focus of an image to be photographed. The second lens group 13 is arranged to move along the optical axis and vary the magnification of an image to be photographed, i.e., the focal length of the photographing lens system. The lens group 14 is a third lens group which is fixed. Reference numeral 15 denotes a photographing lens diaphragm.

A first lens group driving motor 16 is controlled in accordance with an automatic focus adjusting operation to cause the first lens group 12 to move on the optical axis so that the position of focus can be automatically adjusted. A lens diaphragm driving motor 17 is activated so that the photographing lens diaphragm 15 can be set to a desired aperture diameter.

An external flash unit 18 is secured to the camera body 1, and executes emission control in accordance with a signal supplied from the camera body 1. The flash unit 18 includes a xenon tube 19 which converts electric-current energy into emission energy, a reflector 20 and a Fresnel lens 21. The reflector 20 and the Fresnel lens 21 have the role of efficiently gathering light of the emission energy toward the subject. Reference numeral 22 denotes a flash contact group which serves as an interface between the camera body 1 and the external flash unit 18.

The flash unit 18 also includes a glass fiber 30 which conducts light emitted by the xenon tube 19 to a light receiving element 31, such as a photodiode, for monitoring the light. The light receiving element 31 directly measures the amounts of emissions of a preliminary emission and a main emission of the flash unit 18. A light receiving element 32 is also made from a photodiode or the like for monitoring light emitted by the xenon tube 19. By restricting the emission current of the xenon tube 19 according to the output of light receiving element 32, control of a flat emission which will be described later is executed. Light guides 20a and 20b are integral with the reflector 20 and reflect the light of the xenon tube 19 toward the light receiving element 32 and the glass fiber 30, respectively.

Figure 2:
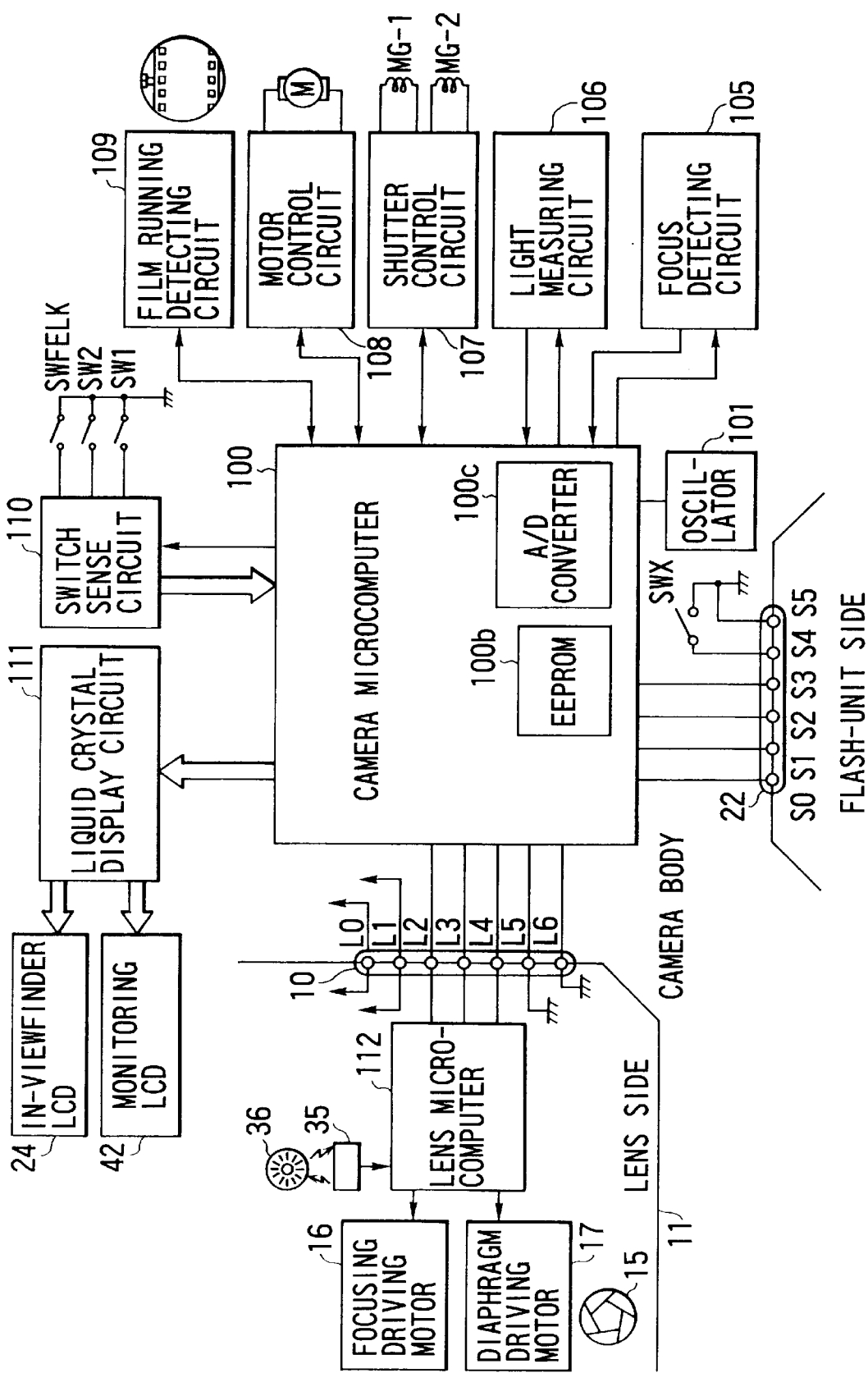
FIG. 2 is a block diagram of the electrical circuit of the first embodiment.
Figure 3:
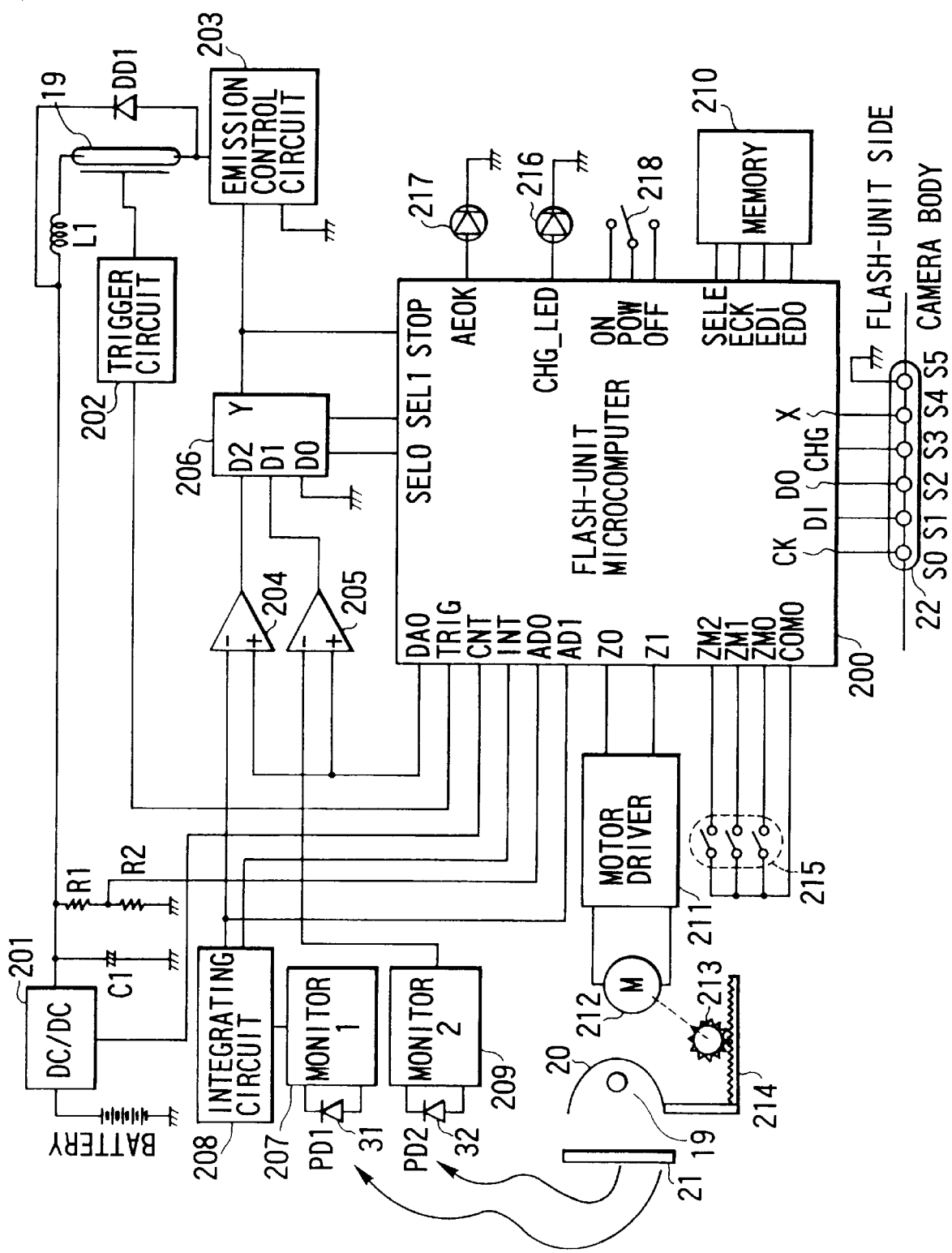
FIG. 3 is a block diagram of the electrical circuit of the first embodiment.

FIGS. 2 and 3 show electrical circuits of the present camera system. In FIGS. 2 and 3, identical reference numerals are used to denote constituent elements identical to those shown in FIG. 1. A camera microcomputer 100 operates on the basis of a clock signal produced by an oscillator 101. An EEPROM 100b stores a film count value and other photography information. An A/D converter 100c performs A/D conversion of analog signals supplied from a focus detecting circuit 105 and a light measuring circuit 106. The camera microcomputer 100 sets various states by performing signal processing of a digital value supplied from the A/D converter 100c.

The focus detecting circuit 105 and the light measuring circuit 106 as well as a shutter control circuit 107, a motor control circuit 108, a film running detecting circuit 109, a switch sense circuit 110 and a liquid crystal display circuit 111 are connected to the camera microcomputer 100. The camera microcomputer 100 communicates signals with a lens microcomputer 112 disposed in the lens barrel 11 via the mount contact group 10. The camera microcomputer 100 also communicates signals with a flash-unit microcomputer 200 provided in the external flash unit 18, via the flash contact group 22.

The focus detecting circuit 105 performs storage control and reading control of the CCD line sensor 29, which is a known distance measuring element, in accordance with a signal supplied from the camera microcomputer 100, and outputs pixel information to the camera microcomputer 100. The camera microcomputer 100 performs A/D conversion of the pixel information and performs focus detection based on a known phase-difference detecting method. The camera microcomputer 100 performs an exchange of signals with the lens microcomputer 112 on the basis of the focus detection information, to adjust the focus of the photographing lens system.

The light measuring circuit 106 supplies the output from the light measuring sensor 7 to the camera microcomputer 100 as a luminance signal indicative of the luminance of the subject. The light measuring circuit 106 outputs luminance signals both when the flash unit 18 is in a steady state in which the flash unit 18 has not yet performed a preliminary emission of flash light toward a subject and when the flash unit 18 is in a preliminary emission state in which the flash unit 18 has performed the preliminary emission. The camera microcomputer 100 performs A/D conversion of the luminance signals, and performs a computation on an aperture value to adjust the amount of exposure for photography, a computation on a shutter speed, and a computation on the amount of emission of the main emission of the flash unit 18 during exposure.

The shutter control circuit 107 causes a shutter leading curtain driving magnet MG-1 and a shutter trailing curtain driving magnet MG-2, which constitute the focal plane shutter 8, to run to execute an exposure operation, in accordance with a signal from the camera microcomputer 100.

The motor control circuit 108 controls a motor M in accordance with a signal from the camera microcomputer 100, to cause the motor M to move the main mirror 2 up and down, charge the shutter 8 and transport the film 9.

The film running detecting circuit 109 detects whether the film 9 has been wound by one frame during a film transport, and sends a signal indicative of the detection result to the camera microcomputer 100.

When a release button (not shown) is pressed to a first stroke position, a switch SW1 is turned on to start a light measuring operation and an automatic focusing (AF) operation. When the release button is pressed to a second stroke position, a switch SW2 is turned on to start an exposure operation. A switch SWFELK is provided for independently executing a preliminary emission which will be described later. The switch sense circuit 110 senses signals supplied from the switches SW1, SW2 and SWFELK and other camera operating members (not shown) and sends them to the camera microcomputer 100. A switch SWX is a known flash-synchronizing switch for starting an emission of the flash unit 18.

The liquid crystal display circuit 111 controls an in-viewfinder LCD 24 and a monitoring LCD 42, in accordance with a signal from the camera microcomputer 100.

The arrangement of the lens barrel 11 will be described below. The camera body 1 and the lens barrel 11 are electrically connected to each other via the mount contact group 10. The mount contact group 10 includes a power supply contact L0 for the focusing driving motor 16 and the diaphragm driving motor 17 both of which are provided in the lens barrel 11, a power supply contact L1 for the lens microcomputer 112, a clock-signal contact L2 for communication of known serial data, a contact L3 for transmission of data from the camera body 1 to the lens barrel 11, a contact L4 for transmission of data from the lens barrel 11 to the camera body 1, a motor grounding contact L5 for a motor power supply, and a grounding contact L6 for a power supply of the lens microcomputer 112.

The lens microcomputer 112 is connected to the camera microcomputer 100 via the mount contact group 10, and operates the first lens group driving motor 16 and the diaphragm driving motor 17 to control a focus adjusting operation and an aperture value of the photographing lens system. An optical detector 35 and a pulse plate 36 which rotates in interlocking relationship to the movement of the first lens group 12 are provided in the lens barrel 11, and the lens microcomputer 112 can obtain information indicative of the position of the first lens group 12 and perform focus adjustment of the lens barrel 11, by counting the angle of rotation (the number of pulses) of the pulse plate 36 through the optical detector 35.

The arrangement of the flash unit 18 will be described below with reference to FIG. 3. The flash-unit microcomputer 200 is a circuit which performs control of the flash unit 18 in accordance with a signal from the camera microcomputer 100, and performs various kinds of control, such as control of the amount of emission, control of the emission intensity and the emission time of a flat emission, and control of the illuminating angle of an emission.

A DC/DC converter 201 boosts a battery voltage to several hundred volts and charges a main capacitor C1, in accordance with an instruction given by the flash-unit microcomputer 200.

Voltage dividing resistors R1 and R2 are provided so that the flash-unit microcomputer 200 can monitor the voltage of the main capacitor C1. The flash-unit microcomputer 200 performs A/D conversion of a divided voltage supplied from the resistors R1 and R2, through an A/D converter (not shown) built in the flash-unit microcomputer 200, and indirectly monitors the voltage of the main capacitor C1 to control the operation of the DC/DC converter 201 and control the voltage of the main capacitor C1 to set it to a predetermined voltage.

A trigger circuit 202 outputs a trigger signal in response to an instruction received from the camera microcomputer 100 via the flash-unit microcomputer 200 during an emission of the flash unit 18, and applies a high voltage of several thousand volts to a trigger electrode of the xenon tube 19 to induce an electric discharge of the xenon tube 19. Thus, the charge energy stored in the main capacitor C1 is discharged via the xenon tube 19 as light energy.

An emission control circuit 203 employs a switching element such as an IGBT. When a trigger voltage for starting an emission is applied to the emission control circuit 203, the emission control circuit 203 becomes conductive and allows a current to flow through the xenon tube 19. When the emission control circuit 203 becomes nonconductive and shuts off the flow of a current through the xenon tube 19, the emission of the xenon tube 19 is made to stop.

A comparator 204 is employed for stopping an emission at the time of a flash emission which will be described later, while a comparator 205 is employed for controlling an emission intensity at the time of a flat emission which will be described later. A data selector 206 selects an input provided at any of terminals D0 to D2, in accordance with selecting signals SEL1 and SEL2 supplied from the flash-unit microcomputer 200, and outputs the selected input to a terminal Y.

A flash-emission controlling monitor circuit 207 logarithmically compresses and amplifies the output of the light receiving element 31. An integrating circuit 208 integrates the output of the flash-emission controlling monitor circuit 207. A flat-emission controlling monitor circuit 209 amplifies the output of the light receiving element 32. A memory 210 is a writable memory, such as an EEPROM or a flash ROM, for memorizing the emission time of a flat emission and the like.

The flash unit 18 also includes a known motor driving circuit 211, a flash zoom driving motor 212, a pinion gear 213, a rack gear 214, a flash zoom position detecting encoder 215 for detecting the position of the reflector 20 with respect to the Fresnel lens 21, and an LED 216 for indicating whether an emission is possible.

Each terminal of the flash-unit microcomputer 200 will be described below. The flash-unit microcomputer 200 includes an input terminal CK through which to input a synchronizing clock signal required for the flash-unit microcomputer 200 to perform serial communication with the camera body 1, an input terminal DI through which to input serial communication data, an output terminal D0 through which to output serial communication data, an output terminal CHG through which to transmit an emission-possible or emission-impossible state of the flash unit 18 to the camera body 1 by means of an electric current, and an input terminal X through which to input an emission signal from the camera body 1.

The flash-unit microcomputer 200 also includes an output terminal ECK through which to output a communication clock signal required for the flash-unit microcomputer 200 to perform serial communication with the memory 210 externally connected to the flash-unit microcomputer 200, an input terminal EDI through which to input serial data from the memory 210, an output terminal EDO through which to output serial data to the memory 210, and an enable terminal SELE through which to output a signal which enables or disables communication with the memory 210. If a low-level signal is outputted through the enable terminal SELE, the communication with the memory 210 is set to an enabled state, whereas if a high-level is outputted through the enable terminal SELE, the communication with the memory 210 is set to a disabled state.

Although in this embodiment the memory 210 is provided outside the flash-unit microcomputer 200, the memory 210 may be built in the flash-unit microcomputer 200.

The flash-unit microcomputer 200 also includes an input terminal POW through which to input a state of a power switch 218, an output terminal OFF through which to output a signal to turn off the flash unit 18, when connected to the power switch 218, and an output terminal ON through which to output a signal to turn on the flash unit 18, when connected to the power switch 218. If the power switch 218 is turned on, the input terminal POW is connected to the output terminal ON, and the impedance at the output terminal ON becomes high while the impedance at the output terminal OFF becomes low. If the power switch 218 is turned off, the input terminal POW is connected to the output terminal OFF, and the impedance at the output terminal ON becomes low while the impedance at the output terminal OFF becomes high.

The flash-unit microcomputer 200 also includes a display output terminal CHG_LED for providing a display indicating that an emission is possible, and an input terminal AEOK for providing a display indicating whether flash exposure control has been correctly performed.

The flash-unit microcomputer 200 also includes an input terminal STOP through which to input an emission stop signal. If a low-level signal is inputted through the input terminal STOP, the flash-unit microcomputer 200 stops an emission of the flash unit 18. The flash-unit microcomputer 200 also includes output terminals SEL0 and SEL1 for instructing the data selector 206 to select a particular input from among the inputs D0 to D2. If low-level signals are outputted from the respective output terminals SEL1 and SEL0, the terminal D0 is connected to the terminal Y. If low- and high-level signals are outputted from the respective output terminals SEL1 and SEL0, the terminal D1 is connected to the terminal Y. If high- and low-level signals are outputted from the respective output terminals SEL1 and SEL0, the terminal D2 is connected to the terminal Y.

A terminal DAO is the output terminal of a D/A converter built in the flash-unit microcomputer 200, and a comparison level for each of the comparators 204 and 205 is outputted from the output terminal DAO as an analog voltage. A terminal TRIG is an output terminal through which to output a trigger signal which instructs the trigger circuit 202 to trigger an emission. A terminal CNT is an output terminal through which to output a signal for controlling the operation of the DC/DC converter 201 to start and stop charging the main capacitor C1. If a high-level signal is outputted from the output terminal CNT, the DC/DC converter 201 starts charging the main capacitor C1, and if a low-level signal is outputted from the output terminal CNT, the DC/DC converter 201 stops charging the main capacitor C1.

A terminal INT is an output terminal through which to output a signal for controlling the integration operation of the integrating circuit 208. If a high-level signal is outputted from the output terminal INT, the integrating circuit 208 is inhibited from performing an integration, whereas if a low-level signal is outputted from the output terminal INT, the integrating circuit 208 is enabled to perform an integration.

Terminals AD0 and AD1 are A/D input terminals through which to input voltages to be converted into digital data so that they can be processed in the flash-unit microcomputer 200. The input terminal Ad0 is provided for monitoring the voltage of the main capacitor C1, while the input terminal AD1 is provided for monitoring the integral output voltage of the integrating circuit 208.

The flash-unit microcomputer 200 also includes control output terminals Z0 and Z1 through which to control the motor driving circuit 211 for driving the flash zoom driving motor 212, input terminals ZM0, ZM1 and ZM2 through which to input signals outputted from the flash zoom position detecting encoder 215, and a common terminal COM0 through which to input a current equivalent to the ground level of the flash zoom position detecting encoder 215.

Individual emission operations will be described below.

Preliminary Emission

If the flash unit 18 is in the emission-possible state which is one of the aforesaid basic operating states of the flash unit 18, the camera microcomputer 100 detects that an emission of the flash unit 18 is possible. If a preliminary emission is to be performed, the camera microcomputer 100 communicates signals indicative of the emission intensity and the emission time of the preliminary emission to the flash unit 18 via the aforesaid communication terminals, and instructs the flash unit 18 to execute the preliminary emission. In addition, the camera microcomputer 100 performs A/D conversion of the value of the voltage divided by the resistors R1 and R2 and memorizes the voltage level of the main capacitor C1 for the preliminary emission.

The flash-unit microcomputer 200 sets a predetermined voltage at the terminal DAO according to a predetermined emission intensity signal transmitted from the camera microcomputer 100, and then sets low- and high-level signals at the respective terminals SEL1 and SEL0 to select the terminal D1. At this time, since the xenon tube 19 has not yet emitted light, a substantial amount of photoelectric current does not flow in the light receiving element 32 and the monitor circuit 209 does not output a signal to be applied to the inverting input terminal of the comparator 205, so that the output of the comparator 205 goes to its high level and the emission control circuit 203 is brought to a conductive state. When a trigger signal is outputted from the terminal TRIG, the trigger circuit 202 generates a high voltage to discharge the xenon tube 19, so that an emission (preliminary emission) of the flash unit 18 is started.

In the meantime, when a predetermined time passes after the generation of the trigger signal, the flash-unit microcomputer 200 instructs the integrating circuit 208 to start an integration, so that the integrating circuit 208 starts to integrate the output of the monitor circuit 207, i.e., a logarithmically compressed photoelectric output of the light receiving element 31 for integrating the amount of light. At the same time, the flash-unit microcomputer 200 activates a timer for counting a predetermined time. The reasons why the start of the integration is delayed with respect to the generation of the trigger signal are that it is necessary to prevent the integrating circuit 208 from integrating noise other than the photoelectric signal owing to noise due to the generation of the trigger signal, and that an actual emission involves a delay of over 10 μsec after the generation of the trigger signal.

When the preliminary emission is started, the amount of photoelectric current in the light receiving element 32 for controlling the emission intensity of a flat emission increases and the output voltage of the monitor circuit 209 rises. When this output voltage becomes higher than a predetermined comparison voltage which is set at the non-inverting input terminal of the comparator 205, the output of the comparator 205 is inverted from high to low and the emission control circuit 203 shuts off the emission current of the xenon tube 19. Thus, the discharge loop of the xenon tube 19 is shut down, but since a circulating current loop is formed by a diode DD1 and a coil L1, the emission current gradually decreases after an overshoot due to a circuit delay has subsided.

Since the emission intensity falls with the decrease in the emission current, the photoelectric current of the light receiving element 32 decreases and the output of the monitor circuit 209 falls. If this output falls below the predetermined comparison level, the output of the comparator 205 is again inverted from low to high and the emission control circuit 203 becomes conductive to form the discharge loop of the xenon tube 19, so that the emission current increases and the emission intensity also increases. In this manner, the output level of the comparator 205 is repeatedly inverted on the basis of the predetermined comparison voltage set at the terminal DAO to cause the emission intensity to repeatedly increase and decrease at intervals of a short period, so that the control of the flat emission of continuing an emission at a desired approximately constant emission intensity is effected.

When the aforesaid emission time timer counts up and a predetermined emission time of the preliminary emission passes, the flash-unit microcomputer 200 sets low- and low-level signals at the respective terminals SEL1 and SEL0. Thus, the data selector 206 selects the input terminal D0, i.e., the low-level input, and the output of the data selector 206 forcedly goes to its low level, so that the emission control circuit 203 shuts off the discharge loop of the xenon tube 19 and brings the preliminary emission to an end.

At the time of the end of the preliminary emission, the flash-unit microcomputer 200 reads through the A/D input terminal AD1 the integral output of the integrating circuit 208 in which an integration of the preliminary emission has been performed, and performs A/D conversion of the read integral output and obtains an integral value, i.e., the amount of emission of the preliminary emission, as a digital value.

Main Emission

Control of the main emission will be described below.

Regarding the timing of transition from a preliminary emission to a main emission, there are two modes. In the first mode, when the switch SW2 which serves as a shutter release switch is turned on, the flash unit 18 is made to perform a preliminary emission, and the camera body 1 obtains the luminance of the light reflected by a subject during the preliminary emission, from the output of the light measuring sensor 7, and finds the amount of correct exposure which becomes correct when the flash unit 18 is used. Upon completion of the preliminary emission, the camera microcomputer 100 drives the photographing lens diaphragm 15 to set it to a correct aperture value, and moves up and retracts the main mirror 2 and the sub-mirror 25 from the photographic optical path. Upon completion of the driving of the main mirror 2 and the sub-mirror 25, the camera microcomputer 100 opens the shutter 8 and causes the flash unit 18 to perform a main emission. The above-described first mode is hereinafter referred to as the "batch emission mode".

In the second mode, when the preliminary emission lock switch SWFELK (refer to FIG. 2) which interlocks with an operating member independent of a release operating member is turned on, the flash unit 18 is made to perform the aforesaid preliminary emission, and the camera body 1 obtains the luminance of the light reflected by a subject during the preliminary emission, from the output of the light measuring sensor 7, and finds the amount of correct exposure which becomes correct when the flash unit 18 is used. Then, when the switch SW2 is turned on, the camera microcomputer 100 drives the photographing lens diaphragm 15 to set it to a correct aperture value, and moves up and retracts the main mirror 2 and the sub-mirror 25 from the photographic optical path. Upon completion of the driving of the main mirror 2 and the sub-mirror 25, the camera microcomputer 100 opens the shutter 8 and causes the flash unit 18 to perform a main emission. The above-described second mode is hereinafter referred to as the "FE lock mode".

In the FE lock mode, the flash unit is made to perform the preliminary emission with the subject located in a central light measuring area, and then the shutter is made to run with the camera system pointed at a region to be photographed by a photographer. Accordingly, in a manner similar to a known AE lock, the photographer can achieve a correct exposure using the flash unit even if, during flash photography, the subject is not located in the center of the region to be photographed.

The operation of the aforesaid main emission will be described below in sequence. First, when the sequence of a main emission is started after the shutter release switch SW2 has been turned on, the camera microcomputer 100 determines a shutter speed and an aperture value on the basis of the luminances supplied from the light measuring sensor 7, i.e., the luminance of the light reflected by a subject during a preliminary emission and the luminance of ambient natural light, an exposure, a film sensitivity, and the light reflected from the subject during the preliminary emission.

In addition, when the camera microcomputer 100 receives from the flash-unit microcomputer 200 data indicative of an upper limit up to which an emission is possible, if the shutter speed is faster than a flash-synchronizing speed, the camera microcomputer 100 determines, on the basis of such received data, the correct emission intensity of a main emission based on a flat emission, and indicates the obtained emission intensity and emission time to the flash-unit microcomputer 200 by serial communication through the communication lines of terminals S0 to S2. The emission time is obtained by adding a shutter opening time equivalent to the shutter speed to the curtain speed of the shutter and adding a certain amount of time margin to the sum so as to take account of mechanical fluctuations in the time required for a shutter curtain to actually appear in the image plane.

On the other hand, if the shutter speed is slower than the flash-synchronizing speed, the camera microcomputer 100 determines the amount of correct emission of a main emission based on a flash emission, and indicates the obtained amount of correct emission to the flash-unit microcomputer 200.

The emission intensity and the amount of emission of the main emission are defined as relative information relative to the emission intensity and the amount of emission of the preliminary emission.

Main Flat Emission

Control of the main emission based on the flat emission will be described below.

The flash-unit microcomputer 200 obtains the current emission intensity of a main flat emission on the basis of a received emission intensity of a main emission, and sets a predetermined voltage which becomes a predetermined emission intensity, at the terminal DAO. The method of setting this correct emission intensity will be described later.

Then, the flash-unit microcomputer 200 provides low- and high-level outputs at the respective terminals SEL1 and SEL0 to select the input terminal D1. At this time, since the xenon tube 19 has not yet emitted light, a substantial amount of photoelectric current does not flow in the light receiving element 32. Accordingly, the monitor circuit 209 does not output a signal, so that the output of the comparator 205 goes to its high level and the emission control circuit 203 is brought to a conductive state.

Then, when a trigger signal is outputted from the terminal TRIG, an emission from the flash unit 18 is started. At the same time that the emission is started, the flash-unit microcomputer 200 activates the timer for counting a time indicated from the camera body 1. The control of the emission intensity of the flat emission is identical to that of the preliminary emission, and the description thereof is omitted for the sake of simplicity.

When the emission time timer counts up and a predetermined emission time passes, the flash-unit microcomputer 200 sets low- and low-level signals at the respective terminals SEL1 and SEL0. Thus, the data selector 206 selects the input terminal D0, i.e., the low-level input, and the output of the data selector 206 forcedly goes to its low level, so that the emission control circuit 203 shuts off the discharge loop of the xenon tube 19 and brings the preliminary emission to an end.

Main Flash Emission

Control of the main emission based on the flash emission will be described below.

The flash-unit microcomputer 200 obtains the amount of current emission of a main flat emission on the basis of the received amount of emission of a main emission, and sets a predetermined voltage which becomes the amount of correct emission, at the terminal DAO. This predetermined voltage is obtained by adding or subtracting a voltage equivalent to the relative amount of emission to or from the integral output read from the terminal AD1 at the end of the aforesaid preliminary emission.

Then, the flash-unit microcomputer 200 provides high- and low-level outputs at the respective terminals SEL1 and SEL0 to select the input terminal D2. At this time, since the integrating circuit 208 is in an operation-inhibited state, the integrating circuit 208 does not output a signal. Accordingly, the output of the comparator 204 goes to its high level and the emission control circuit 203 is brought to a conductive state.

Then, when a trigger signal is outputted from the terminal TRIG, an emission from the flash unit 18 is started. The flash-unit microcomputer 200 sets a low-level signal at the integration start terminal INT when an actual emission is started over 10 μsec after trigger noise due to the application of the trigger signal has been settled. Thus, the integrating circuit 208 integrates the output from the monitor sensor 31 via the monitor circuit 207. When the integral output of the integrating circuit 208 reaches the predetermined voltage set at the terminal DAO, the comparator 204 is inverted and the conduction of the emission control circuit 203 is shut off via the data selector 206 to stop the emission of the xenon tube 19.

In the meantime, the flash-unit microcomputer 200 monitors the state of the input terminal STOP. When the input level at the input terminal STOP is inverted and the emission is stopped, the flash-unit microcomputer 200 sets low- and low-level signals at the terminals SEL1 and SEL0 to set a forcedly emission-inhibited state. In addition, the flash-unit microcomputer 200 inverts the level at the integration start terminal INT to bring the integration as well as the entire emission processing to an end.

Figure 4:
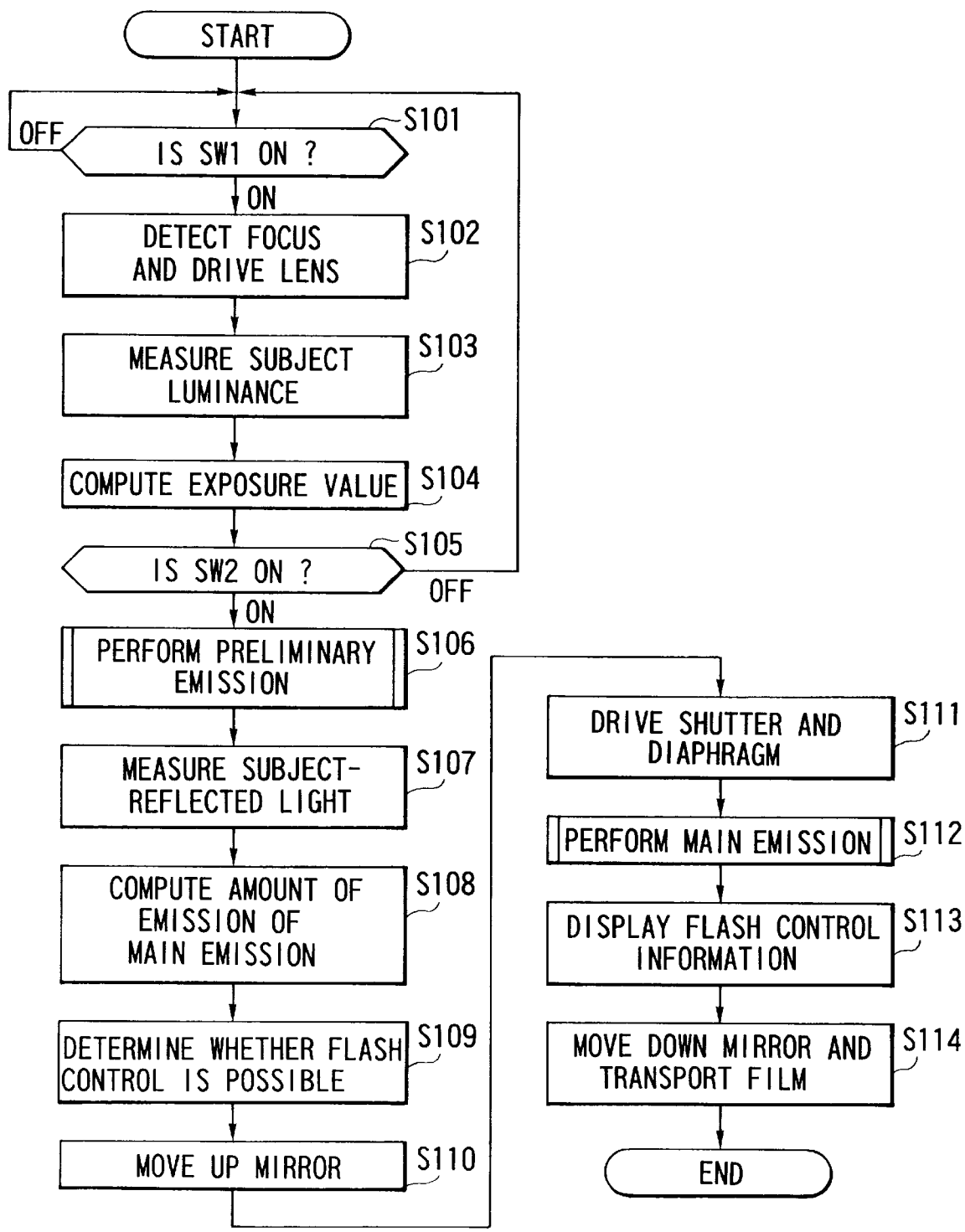
FIG. 4 is a flowchart showing the operation of a camera according to the first embodiment.

The operation flow of the camera system in the batch emission mode will be described below with reference to FIG. 4. FIG. 4 shows a flowchart for setting an emission operation to be performed by the camera microcomputer 100.

First, when the operation of the camera system is started, the process proceeds to Step S101, in which the camera microcomputer 100 determines whether the switch SW1 which serves as a light measurement/distance measurement starting switch has been turned on. If the switch SW1 is on, the process proceeds to Step S102, whereas if the switch SW1 is off, the camera microcomputer 100 repeats Step S101.

In Step S102, the camera microcomputer 100 drives the focus detecting circuit 105 to perform a focus detecting operation using a known phase-difference detecting method. The camera microcomputer 100 also instructs the lens microcomputer 112 to perform driving for focusing, thereby performing focus adjustment. Then, in Step S103, the camera microcomputer 100 obtains a subject luminance value Bv through the light measuring circuit 106. Then, in Step S104, the camera microcomputer 100 determines the amount of correct exposure, EvS (=Tv+Av), from the subject luminance and a film sensitivity, and determines a shutter speed and an aperture value in accordance with a photographing mode which has been set.

Then, in Step S105, the camera microcomputer 100 determines whether the release starting switch SW2 is on. If the switch SW2 is on, the process proceeds to Step S106. If the switch SW2 is off, the process returns to Step S101 and repeats Steps S101 to S105. In Step S106, the camera microcomputer 100 indicates a predetermined amount of emission to the flash-unit microcomputer 200 and causes the flash unit 18 to perform the aforesaid preliminary emission. Then, in Step S107, the camera microcomputer 100 causes the light measuring circuit 106 to measure the light reflected from a subject during the preliminary emission, and finds the amount of exposure of the preliminary emission, EvF.

Then, in Step S108, the camera microcomputer 100 obtains the amount of correct emission of a main emission relative to the preliminary emission by subtracting the amount of exposure of the preliminary emission measured in Step S107 from the amount of correct exposure obtained in Step S104. Specifically, the camera microcomputer 100 obtains a main emission luminance (the amount of correct emission of the main emission) which is required to achieve a correct exposure, by subtracting the luminance of reflected light due to the preliminary emission of the flash unit 18 from the subject luminance under natural light.

Then, in Step S109, the camera microcomputer 100 determines whether flash control is possible, on the basis of the amount of correct emission of the main emission obtained in Step S108 and an amount-of-emission upper limit (to be described later) received from the flash unit 18, and informs the flash unit 18 whether flash control is possible. Specifically, the camera microcomputer 100 compares the amount of correct exposure of the main emission and the amount-of-emission upper limit. If the amount of correct exposure of the main emission is larger than the amount-of-emission upper limit by a predetermined value, the camera microcomputer 100 determines that flash control is impossible or inappropriate. If the amount of correct exposure of the main emission is smaller than the sum of the amount-of-emission upper limit and the predetermined value, the camera microcomputer 100 determines that flash control is possible or appropriate. Incidentally, it is preferable that the predetermined value be on the order of 0.3 EV to 0.5 EV, in terms of exposure accuracy.

Then, in Step S110, the camera microcomputer 100 moves up the main mirror 2 and retracts the main mirror 2 from the photographic optical path together with the sub-mirror 25, prior to an exposure operation.

Then, in Step S111, the camera microcomputer 100 gives the lens microcomputer 112 an instruction to set a correct aperture value according to the exposure value based on the amount of exposure computed in Step S103, and causes the shutter control circuit 107 to drive the shutter 8 upon completion of such aperture setting.

Then, in Step S112, the flash-unit microcomputer 200 is caused to control the main emission of the flash unit 18 in accordance with the amount of emission obtained in Step S108, in synchronism with the driving of the shutter 8. After the main emission, in Step S113, the camera microcomputer 100 gives the flash-unit microcomputer 200 an instruction to cause a flash control confirmation LED 217 to emit light for a predetermined time in accordance with the decision result obtained in Step S109. In other words, the decision result obtained before the main emission, i.e., the information indicative of whether flash control is possible, continues to be displayed even after the main emission.

When the exposure operation is completed in this manner, the process proceeds to Step S114, in which the camera microcomputer 100 moves down the main mirror 2 and the sub-mirror 25 which have been retracted from the photographing optical path, thereby obliquely inserting the main mirror 2 and the sub-mirror 25 into the photographing optical path. The camera microcomputer 100 winds the film 9 by one frame, by means of the motor control circuit 108 and the film running detecting circuit 109.

Figure 5:
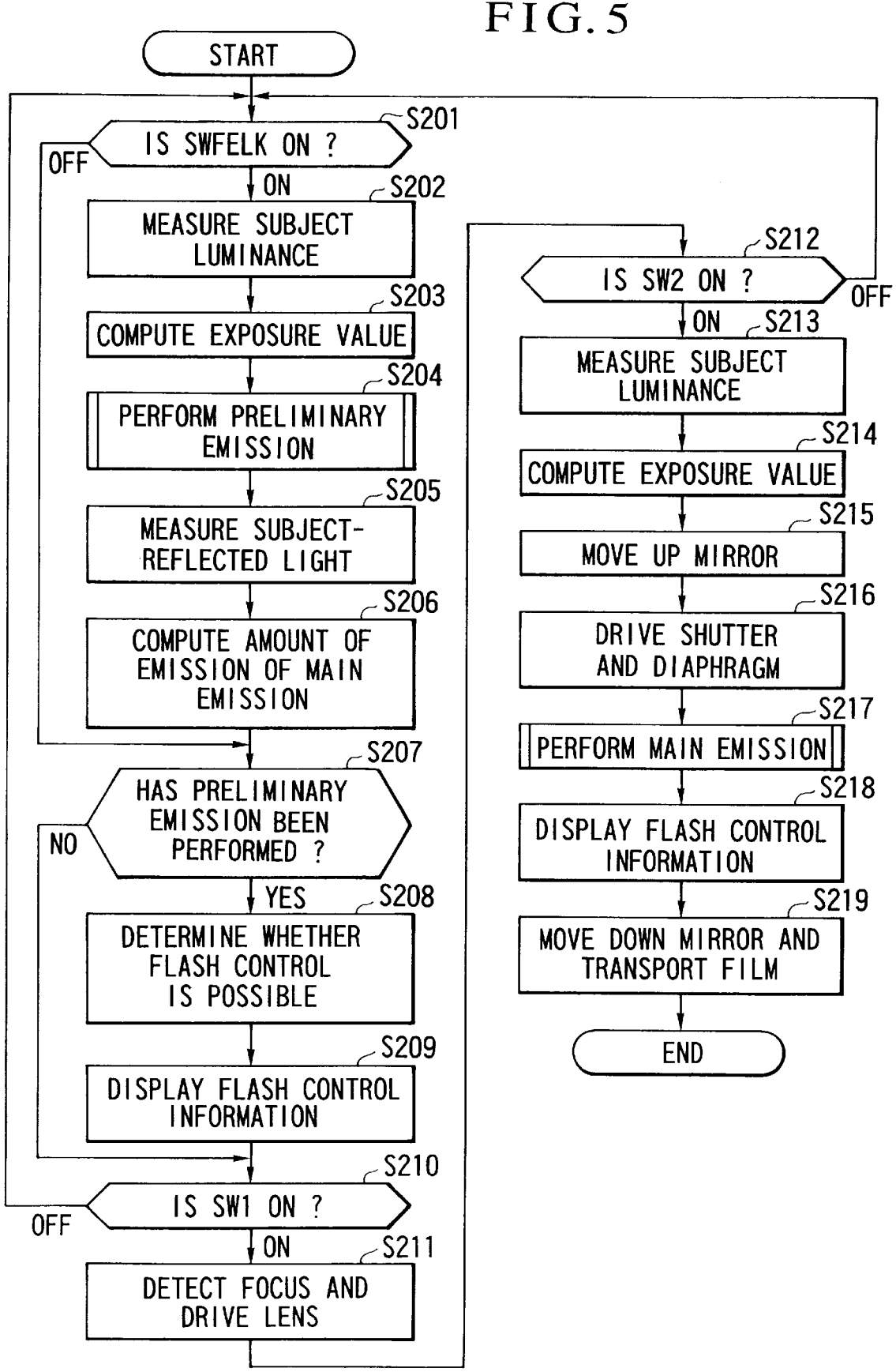
FIG. 5 is a flowchart showing the operation of the camera according to the first embodiment.

The operation flow of the camera system in the FE lock mode will be described below with reference to FIG. 5. FIG. 5 shows a flowchart for setting an emission operation to be performed by the camera microcomputer 100.

First, when the operation of the camera system is started, the process proceeds to Step S201, in which the camera microcomputer 100 determines whether the FE lock switch SWFELK has been turned on. If the switch SWFELK is on, the process proceeds to Step S202, whereas if the switch SWFELK is off, the process jumps to Step S207.

In Step S202, the camera microcomputer 100 obtains the subject luminance value Bv through the light measuring circuit 106. Then, in Step S203, the camera microcomputer 100 determines the amount of correct exposure, EVS (=TV+Av), from the subject luminance and the film sensitivity, and determines a shutter speed and an aperture value in accordance with a photographing mode which has been set.

Then, in Step S204, the camera microcomputer 100 indicates a predetermined amount of emission to the flash-unit microcomputer 200 and causes the flash unit 18 to perform a preliminary emission. Then, in Step S205, the camera microcomputer 100 causes the light measuring circuit 106 to measure the light reflected from a subject during the preliminary emission, and finds the amount of exposure of the preliminary emission, EvF.

Then, in Step S206, the camera microcomputer 100 obtains the amount of correct emission of a main emission relative to the preliminary emission by subtracting the amount of exposure of the preliminary emission measured in Step S205 from the amount of correct exposure obtained in Step S203. Specifically, the camera microcomputer 100 obtains a main emission luminance (the amount of correct emission of the main emission) which is required to achieve a correct exposure, by subtracting the luminance of reflected light due to the preliminary emission of the flash unit 18 from the subject luminance under natural light.

Then, in Step S207, the camera microcomputer 100 determines whether the preliminary emission has been performed. If the preliminary emission has been performed, the process proceeds to Step S208, whereas if the preliminary emission has not been performed, the process proceeds to Step S210. In Step S208, the camera microcomputer 100 determines whether flash control is possible, on the basis of the amount of correct exposure of the main emission obtained in Step S206 and an amount-of-emission upper limit (to be described later) received from the flash unit 18. Specifically, the camera microcomputer 100 compares the amount of correct exposure of the main emission and the amount-of-emission upper limit. If the amount of correct exposure of the main emission is larger than the amount-of-emission upper limit by a predetermined value, the camera microcomputer 100 determines that flash control is impossible or inappropriate. If the amount of correct exposure of the main emission is smaller than the sum of the amount-of-emission upper limit and the predetermined value, the camera microcomputer 100 determines that flash control is possible or appropriate. Incidentally, it is preferable that the predetermined value be on the order of 0.3 EV to 0.5 EV, in terms of exposure accuracy.

Figure 6A:
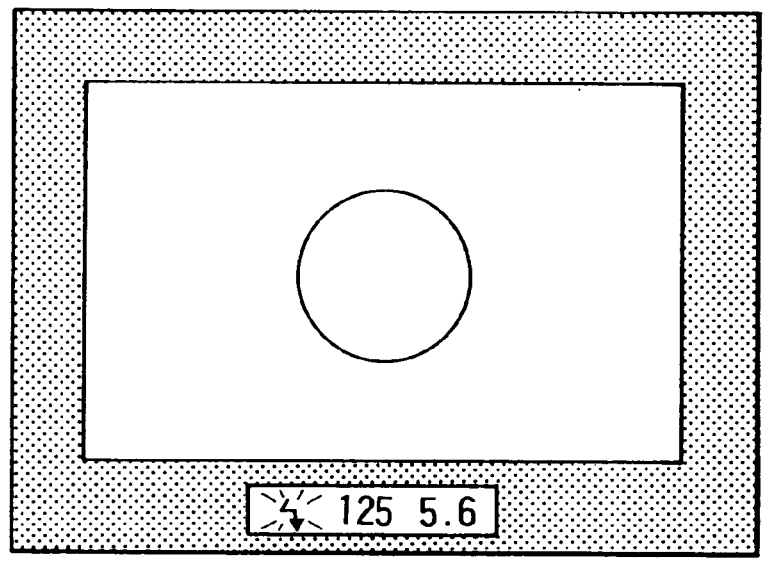
FIGS. 6(*a*) and 6(*b*) are views showing display examples provided in the camera according to the first embodiment.
Figure 6B:
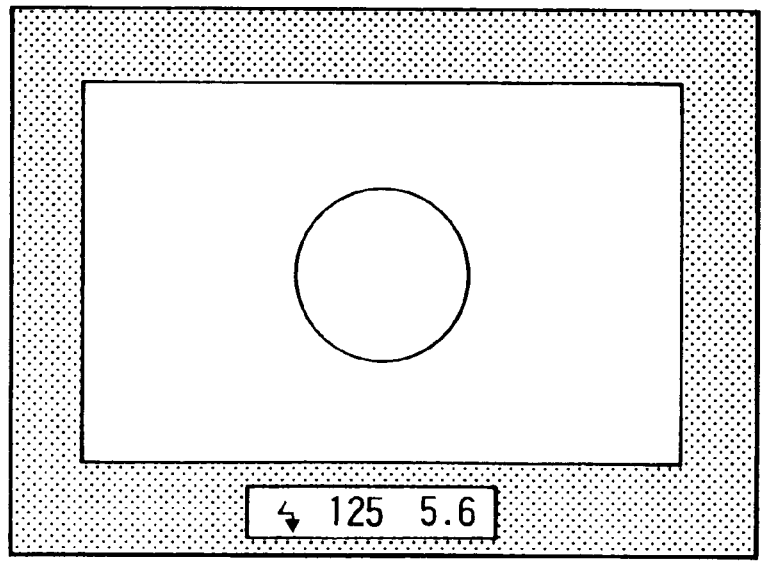

Then, in Step S209, if flash control is possible or appropriate, the camera microcomputer 100 causes a flash mark to continuously emit light, as shown in FIG. 6(*b*), whereas if flash control is impossible or inappropriate, the camera microcomputer 100 blinks the flash mark, as shown in FIG. 6(*a*), to warn a photographer. Although in this embodiment the flash mark is made to continuously emit light or blink to indicate whether flash control is possible, the result of such decision may also be displayed by displaying the difference between the amount of emission of the main emission and the amount-of-emission upper limit value in an exposure level display part, as shown in FIGS. 9(*a*) and 9(*b*) by way of example.

In Step S210, the camera microcomputer 100 determines whether the light measurement/distance measurement starting switch SW1 has been turned on. If the switch SW1 is on, the process proceeds to Step S211, whereas if the switch SW1 is off, the camera microcomputer 100 repeats Steps S201 to S209. Each time Steps S208 and S209 are executed, the display provided in Step S209 is updated according to a rise in the voltage of the main capacitor C1. Thus, the camera microcomputer 100 makes a decision as to whether flash control is possible and provides display of the result of the decision in real time during the period of time between the preliminary emission and the main emission.

In Step S211, the camera microcomputer 100 drives the focus detecting circuit 105 to perform a focus detecting operation using a known phase-difference detecting method. The camera microcomputer 100 also instructs the lens microcomputer 112 to perform driving for focusing, thereby performing focus adjustment. Then, in Step S212, the camera microcomputer 100 determines whether the release starting switch SW2 has been turned on. If the switch SW2 is on, the process proceeds to Step S213. If the switch SW2 is off, the process returns to Step S201.

In Step S213, the camera microcomputer 100 obtains the subject luminance value Bv (=Bvo+Avo) through the light measuring circuit 106 in order to cope with a change of framing which may occur after the preliminary emission. Then, in Step S214, the camera microcomputer 100 determines the amount of correct exposure, EvS (=Tv+Av), from the subject luminance and the film sensitivity, and determines a shutter speed and an aperture value in accordance with a photographing mode which has been set. Then, in Step S215, the camera microcomputer 100 moves up the main mirror 2 and the sub-mirror 25 and retracts them from the photographic optical path, prior to an exposure operation.

Then, in step S216, the camera microcomputer 100 gives the lens microcomputer 112 an instruction to set a correct aperture value according to the exposure value based on the amount of exposure computed in Step S214, and causes the shutter control circuit 107 to drive the shutter 8 upon completion of such aperture setting. Then, in Step S217, the flash-unit microcomputer 200 is caused to control the main emission of the flash unit 18 in accordance with the amount of emission obtained in Step S206, in synchronism with the driving of the shutter 8.

After the main emission, in Step S218, the camera microcomputer 100 gives the flash-unit microcomputer 200 an instruction to cause the flash control confirmation LED 217 to emit light for a predetermined time in accordance with the decision result obtained in Step S208. When the exposure operation is completed in this manner, the process proceeds to Step S219, in which the camera microcomputer 100 moves down the main mirror 2 and the sub-mirror 25 which have been retracted from the photographing optical path, thereby obliquely inserting the main mirror 2 and the sub-mirror 25 into the photographing optical path. The camera microcomputer 100 winds the film 9 by one frame, by means of the motor control circuit 108 and the film running detecting circuit 109, and brings the operation to an end.

A variation in the amount-of-emission upper limit value according to a rise in the voltage of the main capacitor C1 after the preliminary emission will be described below with reference to FIG. 7. In FIG. 7, the horizontal axis represents the voltage of the main capacitor C1, while the vertical axis represents, in accordance with the APEX notation, the deviation of the amount of emission with the amount of emission obtainable from the main capacitor C1 which is fully charged (voltage=$V_{full}$) being set to "0".

Referring to FIG. 7, electric charge Q to be stored in the main capacitor C1 is expressed as:

$$Q=CV,$$

and energy U to be stored in the main capacitor C1 is expressed as:

$$U=QV/2.$$

Therefore, energy $U_{full}$ to be obtained when the main capacitor C1 is fully charged is expressed as:

$$U_{full}=CV_{full}^2/2,$$

and emission energy $U_{mc}$ to be obtained from a voltage $V_{mc}$ relative to the full-charge voltage of the main capacitor C1 is expressed as:

$$U_{mc}=C(V_{mc}/V_{full})^2/2.$$

It can be said, therefore, that the amount of emission for the voltage $V_{mc}$ is proportional to $(V_{mc}/V_{full})^2$. A line A of FIG. 7 shows a function which represents that the amount of emission for the voltage $V_{mc}$ is proportional to $(V_{mc}/V_{full})^2$. If $Fa(V_{mc})$ indicates a function which represents the ratio of the amount of emission to be obtained from the full-charge voltage to the amount of emission to be obtained from the voltage $V_{mc}$, $Fa(V_{mc})$ is expressed as:

$$Fa(V_{mc})=(V_{mc}^2/V_{full}^2)k.$$

Incidentally, k is a coefficient which represents a loss due to the internal resistance of a power source or a switching control circuit of the flash unit 18. Although the value of k can be experimentally obtained, k is set to k=1 in the case of FIG. 7.

A line B shows a function for logarithmically converting $Fa(V_{mc})$ with base 2 for the purpose of providing APEX display, and $Fb(V_{mc})$ is expressed as:

$$Fb(V_{mc})=LOG_2(V_{mc}^2/V_{full}^2).$$

A line C shows a function which represents the amount of emission of the preliminary emission obtained by subtracting the amount of light, nEv, from the amount of emission of a full emission, and $Fc(V_{mc})$ is expressed as;

$$Fc(V_{mc})=LOG_2(V_{mc}^{2/V}{}_{full}^2)-n.$$

Referring to the vertical axis, a level "a" shows the amount of emission of a preliminary emission to be obtained from a capacitor voltage $V_{pre}$, with respect to the voltage $V_{full}$ at which the main capacitor C1 is fully charged and provides a full emission. A level "b" shows the amount of emission of a full emission which is performed at the voltage $V_{pre}$, and a level "c" shows the amount of emission of a full emission which is performed at the capacitor voltage $V_{mc}$.

The hatched portion in FIG. 7 shows the amount of rise of an amount-of-emission upper limit value due to a rise in the voltage of the main capacitor C1 after the preliminary emission, and the shaded portion in FIG. 7 shows an operation-inhibited portion corresponding to voltages higher than the full-charge voltage.

As can be seen from FIG. 7, if a preliminary emission is performed at the level "a" when the voltage of the main capacitor C1 is at $V_{pre}$, the capacitor voltage rises with the elapse of time and the level at which a main emission is possible also rises as shown by the line B, so that a main emission at up to the level "c" is possible in the case of the voltage $V_{mc}$. Accordingly, if the level at which a main emission is possible in the case of the capacitor voltage $V_{pre}$ is the level "c", since a preliminary emission is performed at an approximately. 0.5-EV underexposure level, a display indicating that flash control is impossible is provided in Step S109 or S209. After that, when the capacitor voltage reaches the voltage $V_{mc}$, a display indicating that flash control is possible is provided.

Figure 8:
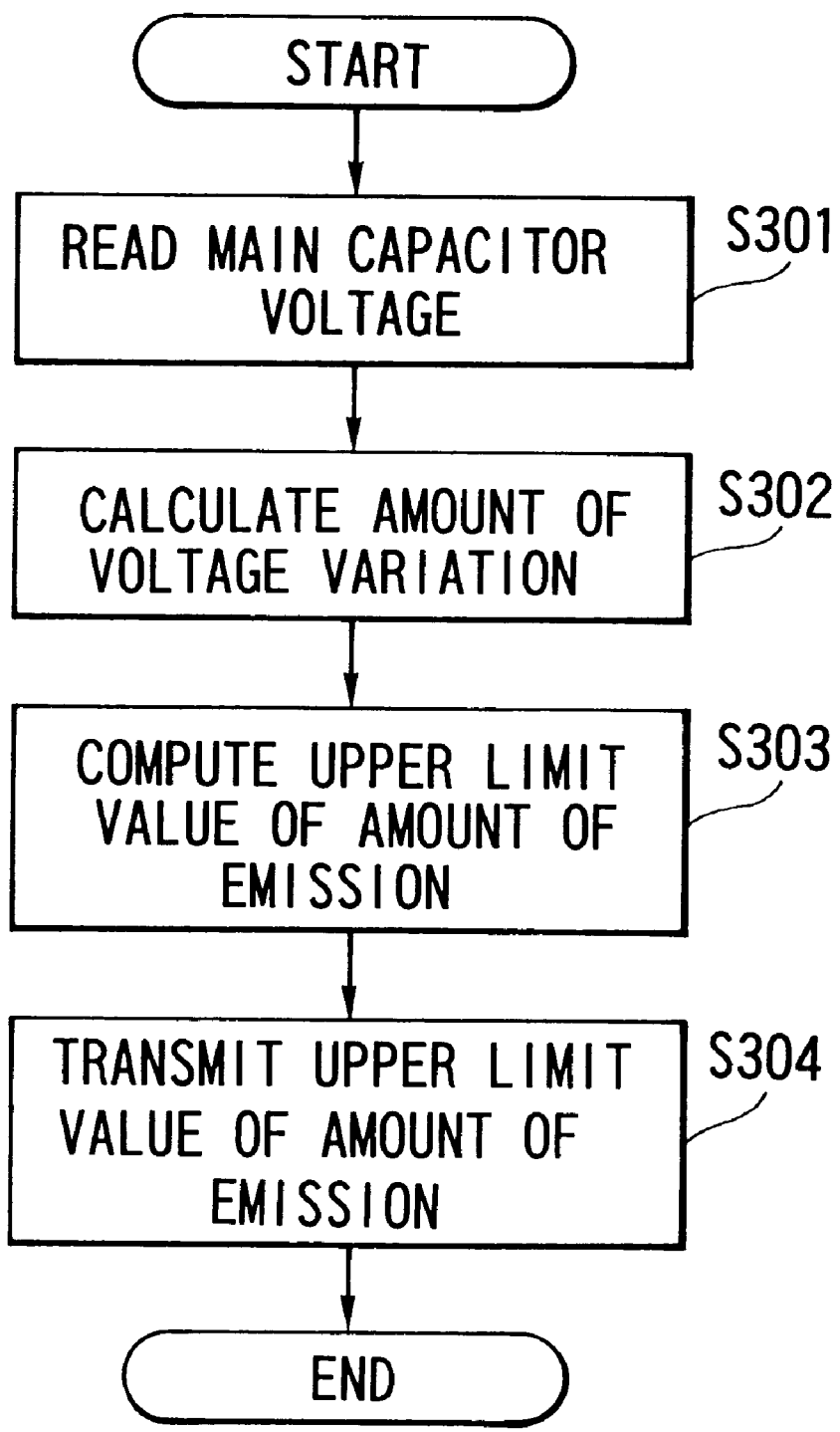
FIG. 8 is a flowchart showing the operation of the flash unit according to the first embodiment.

The calculation of the amount-of-emission upper limit value which is performed by the flash-unit microcomputer 200 in Step S208 of FIG. 5 will be described below with reference to the flowchart of FIG. 8.

First, in Step S301, the flash-unit microcomputer 200 reads the divided voltage of the main capacitor C1 through the input terminal AD0, and, in Step S302, obtains the amount of voltage variation, $\Delta V_{mc}(=V_{mc}-V_{pre})$, relative to the voltage provided across the main capacitor C1 when the flash-unit microcomputer 200 receives an instruction to perform a preliminary emission, from the voltage (memorized value) provided across the main capacitor C1 when the preliminary emission is performed.

Then, in Step S303, the flash-unit microcomputer 200 computes the amount-of-emission upper limit value (FPH_LIMIT) by using the following expressions:

$$FPH\_LIMIT = FPH\_LIMIT_{pre} + LOG_2\left(\frac{V_{mc}^2}{V_{pre}^2} * k\right)$$

$V_{pre}$: voltage provided across the main capacitor C1 at the time of the preliminary emission, $V_{mc}$: voltage currently provided across the main capacitor C1, $FPH\_LIMIT_{pre}$: amount-of-emission upper limit value at the time of the preliminary emission ($FPH\_LIMIT_{pre}$ is determined on the basis of the voltage $V_{pre}$ provided at the time of the preliminary emission), and k: loss coefficient.

Then, in Step S304, the flash-unit microcomputer 200 transmits the amount-of-emission upper limit value obtained in Step S303 to the camera microcomputer 100. Thus, the camera microcomputer 100 compares the amount-of-emission upper limit value obtained in Step S304 in the above-described manner and the amount of emission which is needed for the main emission, and determines whether flash control is possible.

As is apparent from the above description, according to the first embodiment, the amount-of-emission upper limit value of the main emission is computed on the basis of the voltage of the main capacitor C1 in real time and the amount-of-emission upper limit value and the amount of correct emission of the main emission are compared to make a decision as to whether flash control is possible, and the result of this decision can be displayed in real time before photography. Accordingly, even if it is determined at the time of a preliminary emission that flash control is impossible, if, after that, the voltage of the main capacitor C1 rises and flash control becomes possible, a photographer can be securely informed of that fact before photography. In addition, if it is determined that flash control is possible, the main emission is controlled so that the amount of emission of the main emission does not exceed the amount-of-emission upper limit value which increases with the rise in the voltage of the main capacitor C1, so that a main emission which causes an insufficient amount of emission can be prevented and it is possible to realize photography capable of utilizing emission energy effectively and efficiently.

Since the result of a decision as to whether flash control is possible is further displayed after the main emission, a highly reliable post-check can be made as to the result of flash control without an error due to a difference in film reflectance like TTL flash control.

(Second Embodiment)

This embodiment includes means for displaying a deviation between the amount-of-emission upper limit value and the amount of correct emission in order to give a photographer detailed information indicating whether flash control is possible. The hardware arrangement of the second embodiment is similar to that of the first embodiment, and the description thereof is omitted for the sake of simplicity.

Figure 9A:
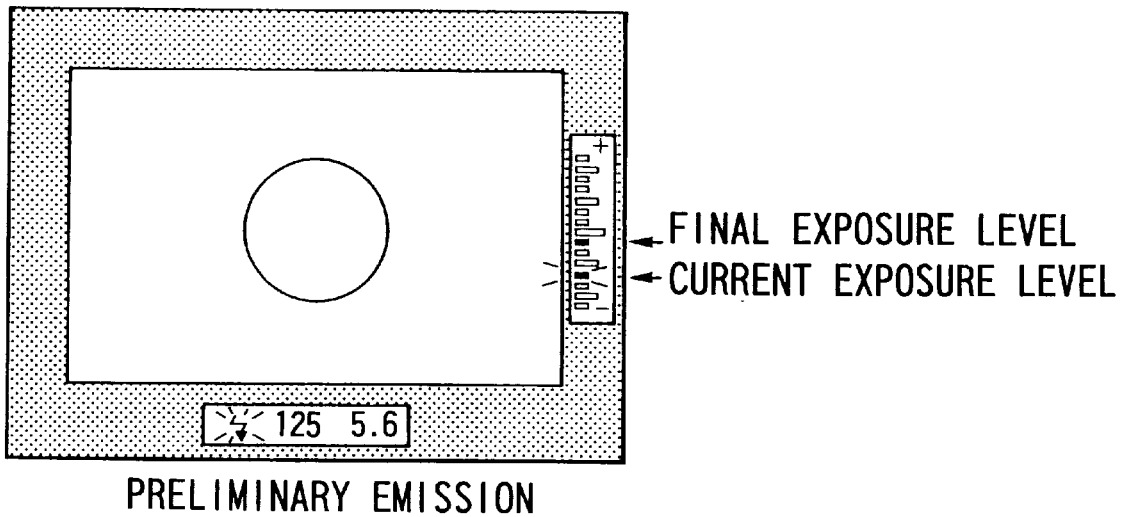
FIGS. 9(*a*) and 9(*b*) are views showing display examples provided in the camera according to a second embodiment of the present invention.
Figure 9B:
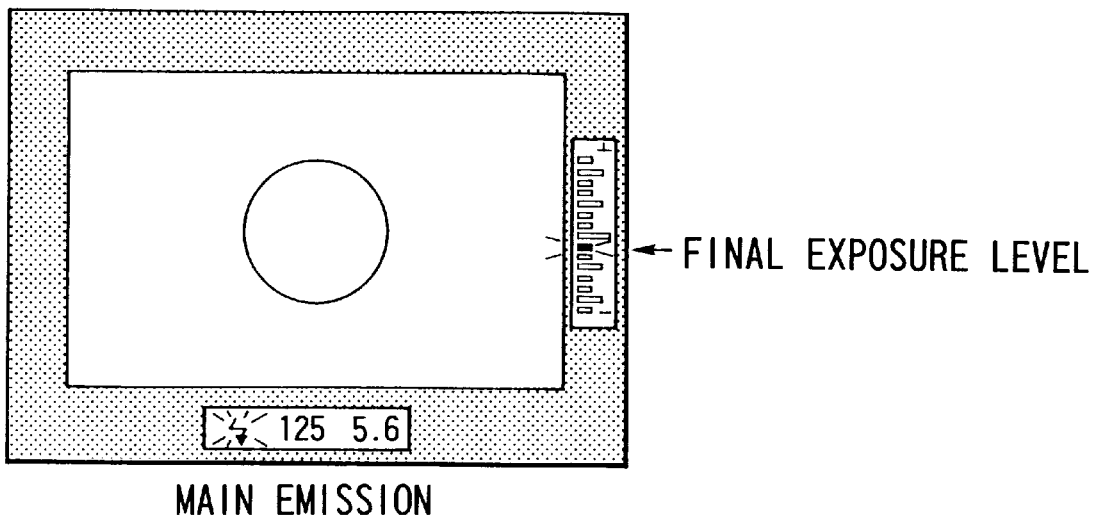

FIGS. 9(a) and 9(b) show the in-viewfinder display device 24 of a camera system according to the second embodiment. The bottom portion of the viewfinder 5 of the second embodiment is similar to that of the viewfinder 5 of the first embodiment, but the second embodiment differs from the first embodiment in that the level at which an emission can be performed is displayed in the right-side portion of the viewfinder 5. A similar display may also be provided on the monitoring display device 42 disposed on the top of the camera body 1.

FIG. 9(a) shows a state of a display indicating whether flash control is possible, which display is provided immediately after a preliminary emission. In the right-side portion, the current exposure level is displayed by blinking, while a final exposure level to be obtained when the main capacitor C1 is fully charged is displayed by continuous lighting. Specifically, the display of FIG. 9(a) shows that the current exposure level is a 0.3-EV underexposure level and even if the main capacitor C1 is fully charged, the final exposure level remains a 0.3-EV underexposure level.

The display of FIG. 9(b) shows that the final exposure level has been reached, but is still a 0.3-EV underexposure level, as indicated by blinking.

A flowchart for performing a computation to provide the aforesaid display during flash photography will be described below with reference to FIG. 10. Since the aforesaid display is suited to the FE lock mode, a flowchart for performing a display computation for the FE lock mode will be described below. Incidentally, this computation is performed in Step S208 of FIG. 5 referred to in the description of the first embodiment, and since the other steps are similar to those shown in FIG. 5, the description thereof is omitted for the sake of simplicity.

Figure 10:
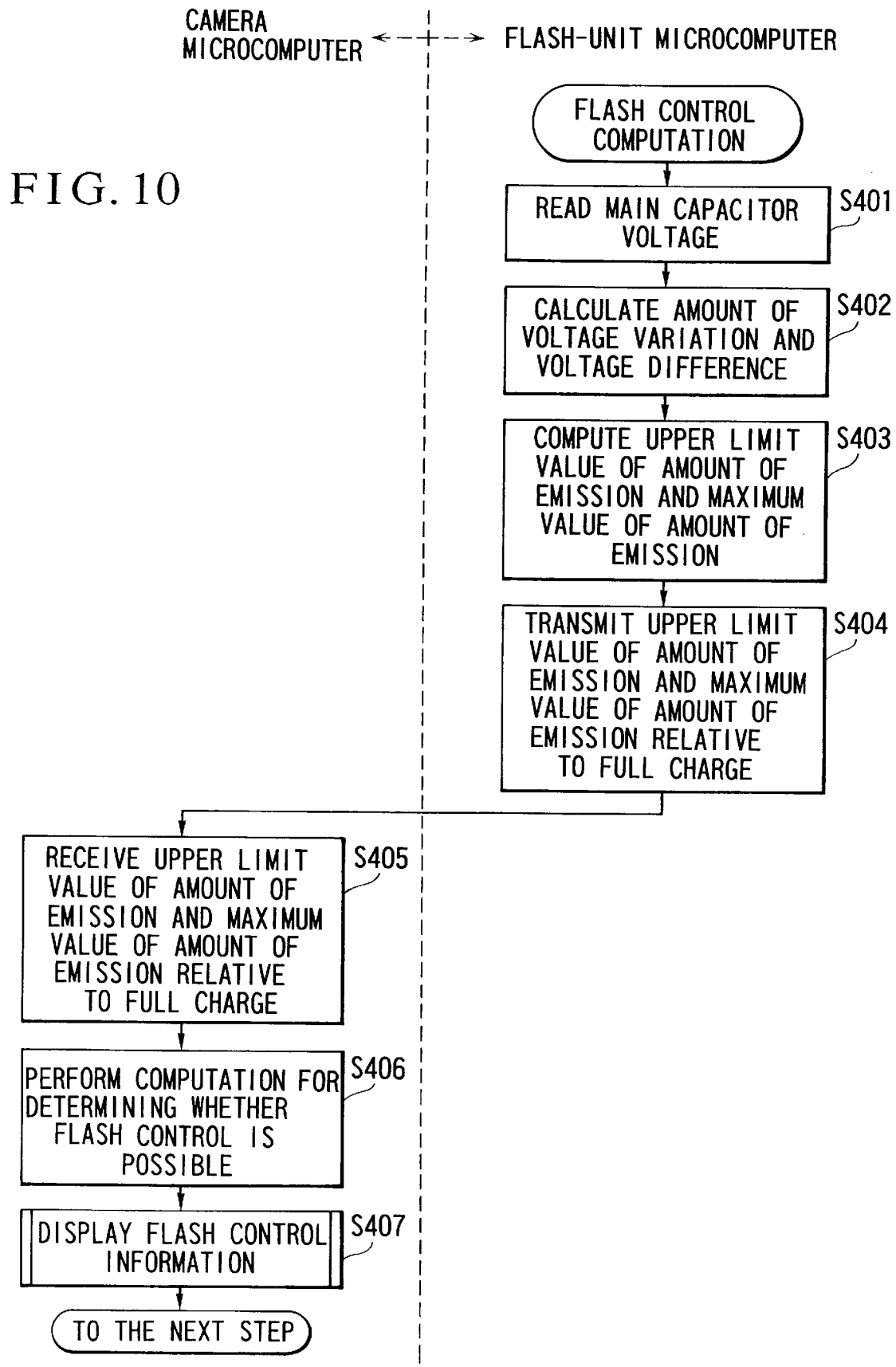
FIG. 10 is a flowchart showing the operation of a camera system according to the second embodiment.

FIG. 10 shows the flow of a program from the flash-unit microcomputer 200 to the camera microcomputer 100. Steps S401 to S404 are processed by the flash-unit microcomputer 200, and Steps S405 to S407 are processed by the camera microcomputer 100.

First, in Step S401, the flash-unit microcomputer 200 reads the divided voltage of the main capacitor C1 through the input terminal Ad0.

Then, in Step S402, from the voltage (memorized value) provided across the main capacitor C1 when the preliminary emission is performed, the flash-unit microcomputer 200 obtains the amount of voltage variation, $\Delta V_{mc}$, relative to the voltage provided across the main capacitor C1 when the flash-unit microcomputer 200 receives an instruction to perform the preliminary emission, and a difference, $\Delta V_{full}$, between the fully-charge capacitor voltage and the capacitor voltage provided at the time of the preliminary emission.

Then, in Step S403, the flash-unit microcomputer 200 computes the amount-of-emission upper limit value (FPH_LIMIT) and an amount-of-emission maximum value relative to full charge (FPH_MAX), by using the following expressions:

$$FPH\_LIMIT = FPH\_LIMIT_{pre} + LOG_2\left(\frac{V_{mc}^2}{V_{pre}^2} * k\right)$$

-continued $$FPH\_MAX = FPH\_LIMIT_{pre} + LOG_2\left(\frac{V_{full}^2}{V_{pre}^2} * k\right)$$

$V_{pre}$: voltage provided across the main capacitor C1 at the time of the preliminary emission, $V_{mc}$: voltage currently provided across the main capacitor C1, $V_{full}$: full-charge voltage of the main capacitor C1, $FPH\_LIMIT_{pre}$: amount-of-emission upper limit value at the time of the preliminary emission ($FPH\_LIMIT_{pre}$ is determined on the basis of the voltage $V_{pre}$ provided at the time of the preliminary emission), and FPH_MAX: amount-of-emission maximum value relative to full charge, and k: loss coefficient.

Then, in Step S404, the flash-unit microcomputer 200 transmits the amount-of-emission upper limit value and the amount-of-emission maximum value obtained in Step S403 to the camera microcomputer 100.

In Step S405, the camera microcomputer 100 receives the amount-of-emission upper limit value and the amount-of-emission maximum value from the flash-unit microcomputer 200. Then, in Step S406, the camera microcomputer 100 computes the difference between the amount-of-emission upper limit value and the amount of correct emission of the main emission obtained in Step S206 of FIG. 5, and the difference between the amount of correct emission of the main emission and the amount-of-emission maximum value.

Then, in Step S407, on the basis of the value obtained in Step S406, the camera microcomputer 100 causes the liquid crystal display circuit 111 to display the current emission level and a full-charge emission level on each of the in-viewfinder display device 24 and the monitoring display device 42, as shown in FIG. 9(a).

Thus, the photographer can check whether flash control is possible or appropriate, before photography, and can know in advance whether flash control becomes possible or appropriate if the main capacitor C1 is fully charged. In addition, since the display is updated according to a rise in the voltage of the main capacitor C1 after a preliminary emission, not only can the photographer check whether flash control is possible with the current energy, but also can check how the amount of light is insufficient if flash control is impossible or inappropriate, before photography. Incidentally, the display may also be provided after photography.

As is apparent from the above description, according to the second embodiment, since whether flash control is possible is displayed in real time and the maximum amount of emission of the fully charged main capacitor C1 is computed and displayed before photography, the photographer can check before photography whether a correct exposure can be obtained when the main capacitor C1 is fully charged. In addition, if it is determined that flash control is possible, the control of the main emission is performed on the basis of the amount-of-emission upper limit value relative to full charge, it is possible to prevent a main emission which causes an insufficient amount of emission and it is possible to realize highly efficient and reliable flash photography.

(Third Embodiment)

Figure 11:
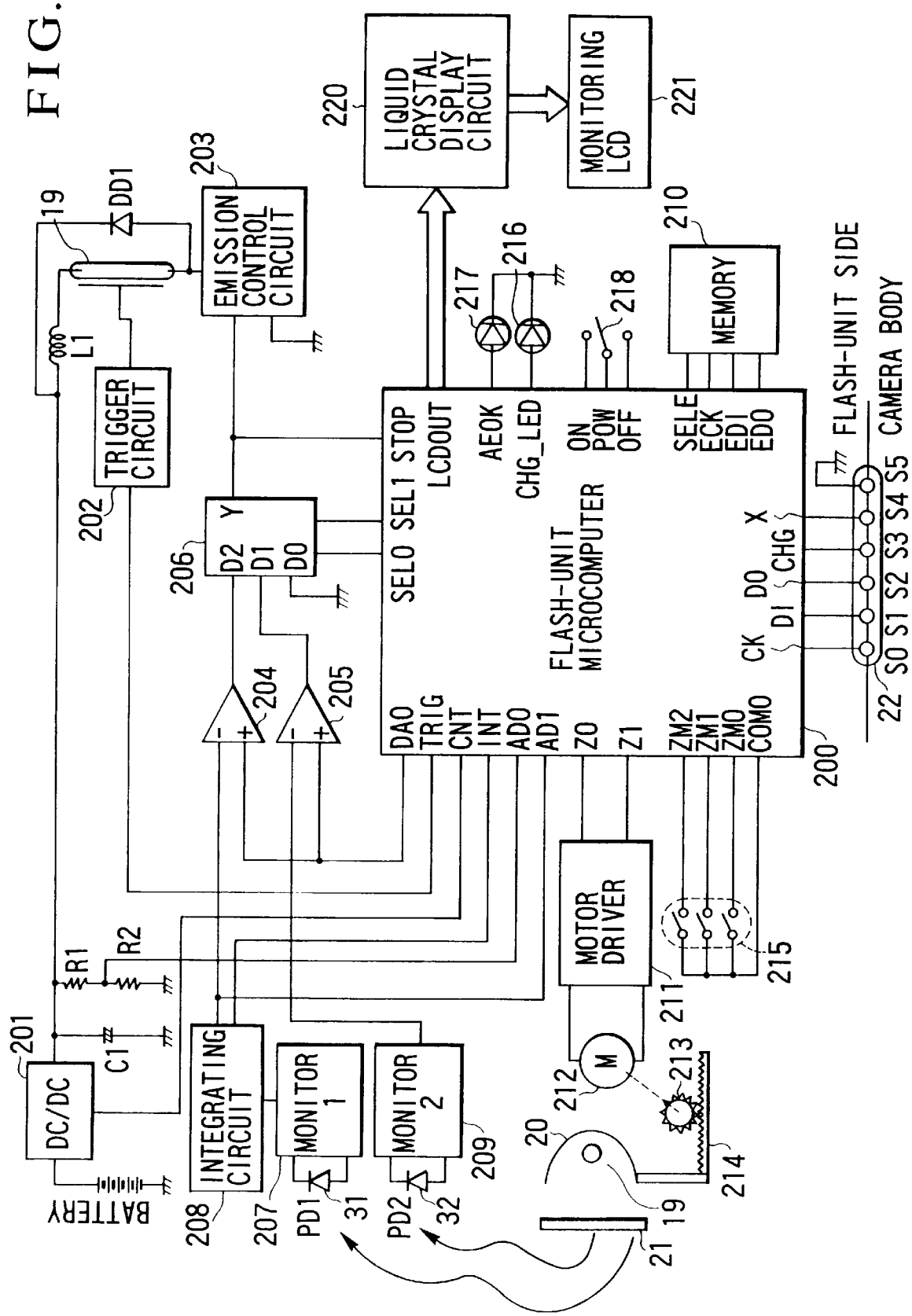
FIG. 11 is a block diagram of the electrical circuit of a third embodiment of the present invention.

FIG. 11 is a block diagram showing the electrical circuit of a camera system according to a third embodiment of the present invention. In FIG. 11, identical reference numerals are used to denote constituent elements identical to the corresponding ones shown in FIG. 3. In the third embodiment, not only the camera body 1 but also the flash unit 18 has the function of displaying the amount of exposure which function has been described above in connection with the second embodiment.

Figure 12:
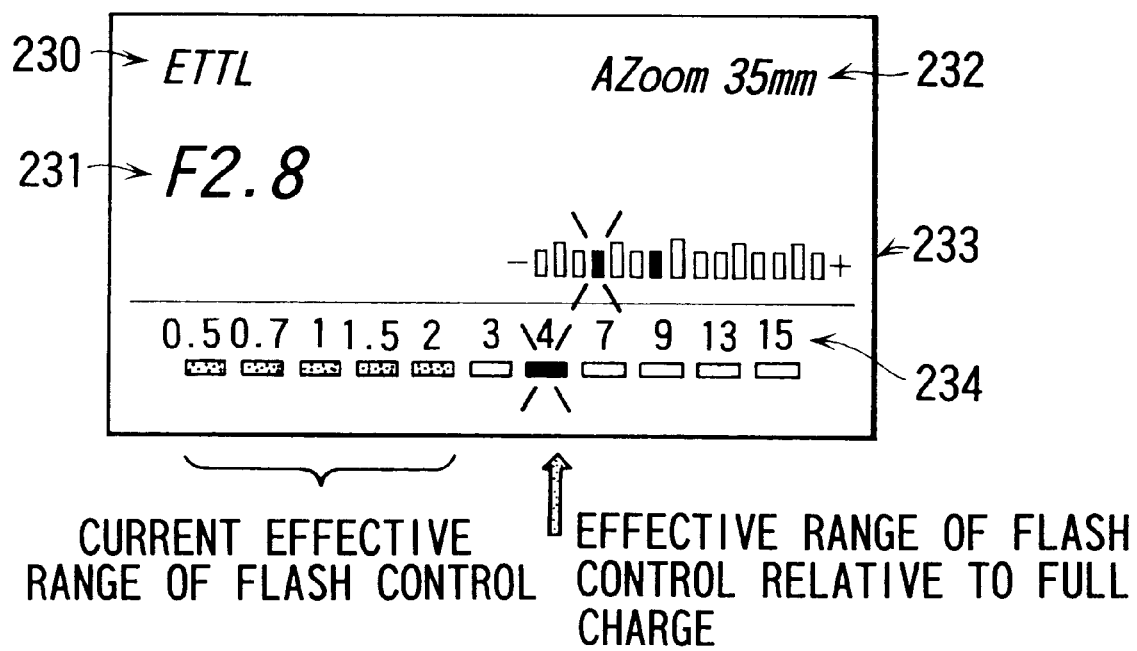
FIG. 12 is a view showing a display example provided on a flash unit according to the third embodiment.

In FIG. 11, reference numeral 220 denotes a liquid crystal display circuit, and reference numeral 221 denotes a liquid crystal display which constitutes display means. FIG. 12 shows a display example to be provided on the monitoring liquid crystal display 221. The monitoring liquid crystal display includes a display part 230 for indicating a photographing mode, a display part 231 for indicating an aperture value of the photographing lens system, a display part 232 for indicating a focal length of the photographing lens system, a display part 233 for indicating an exposure level to indicate whether flash control is possible, and a display part 234 for indicating an effective photographing range (distance).

A flowchart for performing a computation to provide the aforesaid display during flash photography will be described below with reference to FIG. 13. Since the aforesaid display is particularly suited to the FE lock mode, a flowchart for performing a display computation for the FE lock mode will be described below. Incidentally, this computation is performed in Step S209 of FIG. 5 referred to in the description of the first embodiment, and since the other steps are similar to those shown in FIG. 5, the description thereof is omitted for the sake of simplicity.

Figure 13:
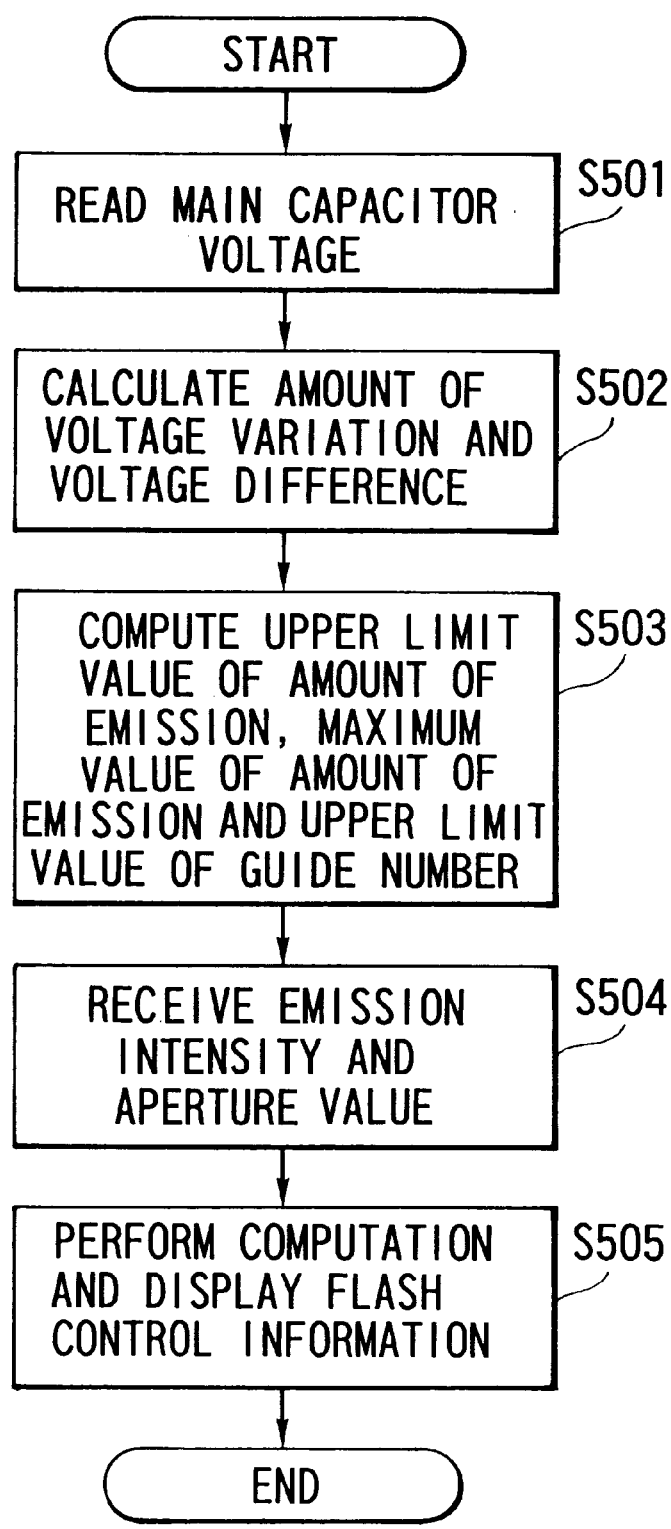
FIG. 13 is a flowchart showing the operation of the flash unit according to the third embodiment.

FIG. 13 shows the flow of a program in the flash-unit microcomputer 200.

First, in Step S501, the flash-unit microcomputer 200 reads the divided voltage of the main capacitor C1 through the input terminal Ad0.

Then, in Step S502, from the voltage (memorized value) provided across the main capacitor C1 when the preliminary emission is performed, the flash-unit microcomputer 200 obtains the amount of voltage variation, $\Delta V_{mc}$, relative to the voltage provided across the main capacitor C1 when the flash-unit microcomputer 200 receives an instruction to perform the preliminary emission, and the difference $\Delta V_{full}$ between the fully-charge capacitor voltage and the capacitor voltage provided at the time of the preliminary emission.

Then, in Step S503, the flash-unit microcomputer 200 computes the amount-of-emission upper limit value (FPH_LIMIT), the amount-of-emission maximum value relative to full charge (FPH_MAX) and a guide-number upper limit value (GN_LIMIT) by using the following expressions:

$$FPH\_LIMIT = FPH\_LIMIT_{pre} + LOG_2\left(\frac{V_{mc}^2}{V_{pre}^2} * k\right)$$

$$FPH\_MAX = FPH\_LIMIT_{pre} + LOG_2\left(\frac{V_{full}^2}{V_{pre}^2} * k\right)$$

$$GN\_LIMIT = GN\_MAX_{pre} \sqrt{\left(\frac{V_{full}^2}{V_{pre}^2} * k\right)}$$

$V_{pre}$: voltage provided across the main capacitor C1 at the time of the preliminary emission, $V_{mc}$: voltage currently provided across the main capacitor C1, $V_{full}$: full-charge voltage of the main capacitor C1, $FPH\_LIMIT_{pre}$: amount-of-emission upper limit value at the time of the preliminary emission, FPH_MAX: amount-of-emission maximum value relative to full charge, GN_LIMIT: current guide-number upper limit value, and
k: loss coefficient.

Then, in Step S504, the flash-unit microcomputer 200 receives the amount of correct exposure of the main emission and an aperture value from the camera microcomputer 100. Then, in Step S505, the flash-unit microcomputer 200 computes the current exposure level on the basis of the difference between the received amount of correct exposure of the main emission and the amount-of-emission upper limit value obtained in Step S503, and also computes a maximum exposure level relative to full charge on the basis of the difference between the amount of correct emission of the main emission and the amount-of-emission maximum value relative to full charge. Then, the flash-unit microcomputer 200 displays these computation results on the exposure level display part 233 of the display means 221.

In addition, the flash-unit microcomputer 200 computes the current effective range (distance) of flash control from the aperture value received from the camera body 1 and the guide number, computed in Step S503, which is obtainable from the current capacitor voltage, and also computes a maximum illumination distance relative to full charge from a guide number relative to full charge and the aperture value. The flash-unit microcomputer 200 displays these computation results on the distance display means 234 of the display means 221. During this time, since the display is blinked as shown in FIG. 12 until the main capacitor C1 is fully charged, the photographer can check whether the main capacitor C1 is being charged or is fully charged.

Since, after the preliminary emission, the above-described display is provided not only on the display portion provided on the camera body but also on the display portion provided on the flash unit, the photographer can check both whether flash control is possible and an effective photographing range before photography. In addition, since the display is updated according to a rise in the voltage of the main capacitor C1 after the preliminary emission, the photographer can check before photography whether flash control is possible with the current energy, and can also check how the amount of light is insufficient if flash control is impossible. Incidentally, the display may also be provided after photography.

As is apparent from the above description, according to the third embodiment, the amount-of-emission upper limit value is displayed in real time, and the current guide number is computed on the basis of the voltage of the main capacitor C1 and a memorized guide number and the current effective range of flash control and an effective range of flash control relative to full charge are displayed according to an aperture set value. Accordingly, not only can the photographer check before photography the effective range of flash control in real time but can also determine the effective range of flash control relative to full charge, so that the photographer can perform highly reliable flash photography.

(Fourth Embodiment)

Figure 14:
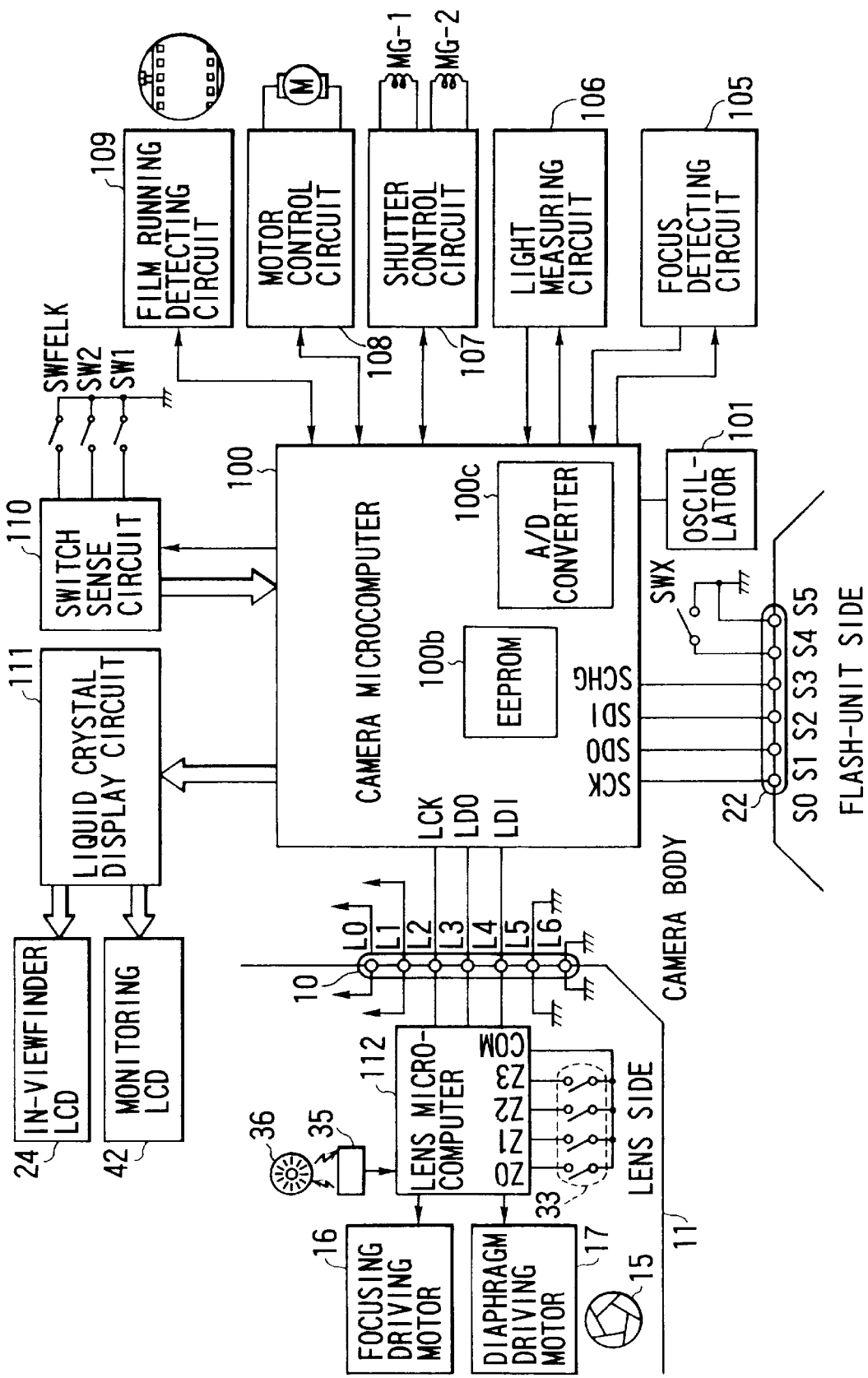
FIG. 14 is a block diagram of the electrical circuit of a fourth embodiment of the present invention.

FIG. 14 is a circuit block diagram of a fourth embodiment of the present invention. In FIG. 14, identical reference numerals are used to denote constituent elements identical to those shown in the block diagram of FIG. 2.

The flash-unit microcomputer 100 shown in FIG. 14 includes an output terminal SCK through which to output a communication clock signal required for the camera microcomputer 100 to perform serial communication with the flash unit 18, an output terminal SDO through which to output serial data when the camera microcomputer 100 performs serial communication with the flash unit 18, an input terminal SDI through which to input serial data when the camera microcomputer 100 performs serial communication with the flash unit 18, an input terminal SCHG through which to detect whether the charging of the main capacitor C1 for storing emission energy for the flash unit 18 has been completed, an output terminal LCK through which to output a communication clock signal required for the camera microcomputer 100 to perform serial communication with the lens barrel 11, an output terminal LDO through which to output serial data when the camera microcomputer 100 performs serial communication with the lens barrel 11, and an input terminal LDI through which to input serial data when the camera microcomputer 100 performs serial communication with the lens barrel 11.

The lens barrel 11 includes an encoder 33 for detecting a zoom position, i.e., the position (focal length) of the second lens group 13 shown in FIG. 1, and the lens microcomputer 112 can precisely detect the zoom position from among 4-bit sixteen divided positions between the telephoto end and the wide-angle end of the second lens group 13, by reading through terminals Z0 to Z3 the zoom position information (focal length information) detected by the encoder 33. Incidentally, the lens microcomputer 112 includes a common terminal COM through which to input a current having a voltage equivalent to the ground level of the zoom position detecting encoder 33.

The circuit arrangement of the flash unit used in the fourth embodiment is identical to that shown in FIG. 3 and the operation of the fourth embodiment is identical to that of the first embodiment, and the fourth embodiment is controlled in accordance with the flowcharts shown in FIGS. 4 and 5. Accordingly, the detailed description of the circuit arrangement and the operation of the fourth embodiment is omitted for the sake of simplicity, and only the difference between the fourth embodiment and the first embodiment will be described. The fourth embodiment differs from the first embodiment in that the amount-of-emission upper limit value is determined according to a flash-illuminating angle.

The correspondence between the flash-illuminating angle (hereinafter referred to as the "flash zoom position") and the amount-of-emission upper limit value will be described below with reference to FIGS. 15($a$), 15($b$) and 15($c$).

FIG. 15($a$) is a graph showing the relationship between flash zoom position and guide number, and FIG. 15($b$) is a graph showing the relationship between flash zoom position and guide number with EV differences plotted against the vertical axis from the wide-angle end of the flash zoom position to the telephoto end thereof. FIG. 15($c$) is a table showing data examples of the graphs of FIGS. 15($a$) and 15($b$).

As can be seen from FIGS. 15($a$), 15($b$) and 15($c$), if zooming toward the wide-angle end is performed after a preliminary emission has been performed at the telephoto end, the guide number halves and the amount of emission decreases by two steps. Contrarily, if zooming toward the telephoto end is performed after a preliminary emission has been performed at the wide-angle end, the guide number becomes twofold and the amount of emission increases by two steps. Accordingly, in a case where zooming is performed after a preliminary emission, if an amount-of-emission upper limit value is not updated and a decision is not newly made as to whether flash control is possible, according to the maximum amount of emission (or the amount-of-emission upper limit value) which varies with the zooming, the entire amount of emission of the flash unit cannot be effectively utilized and exposure accuracy is adversely affected.

Figure 16:
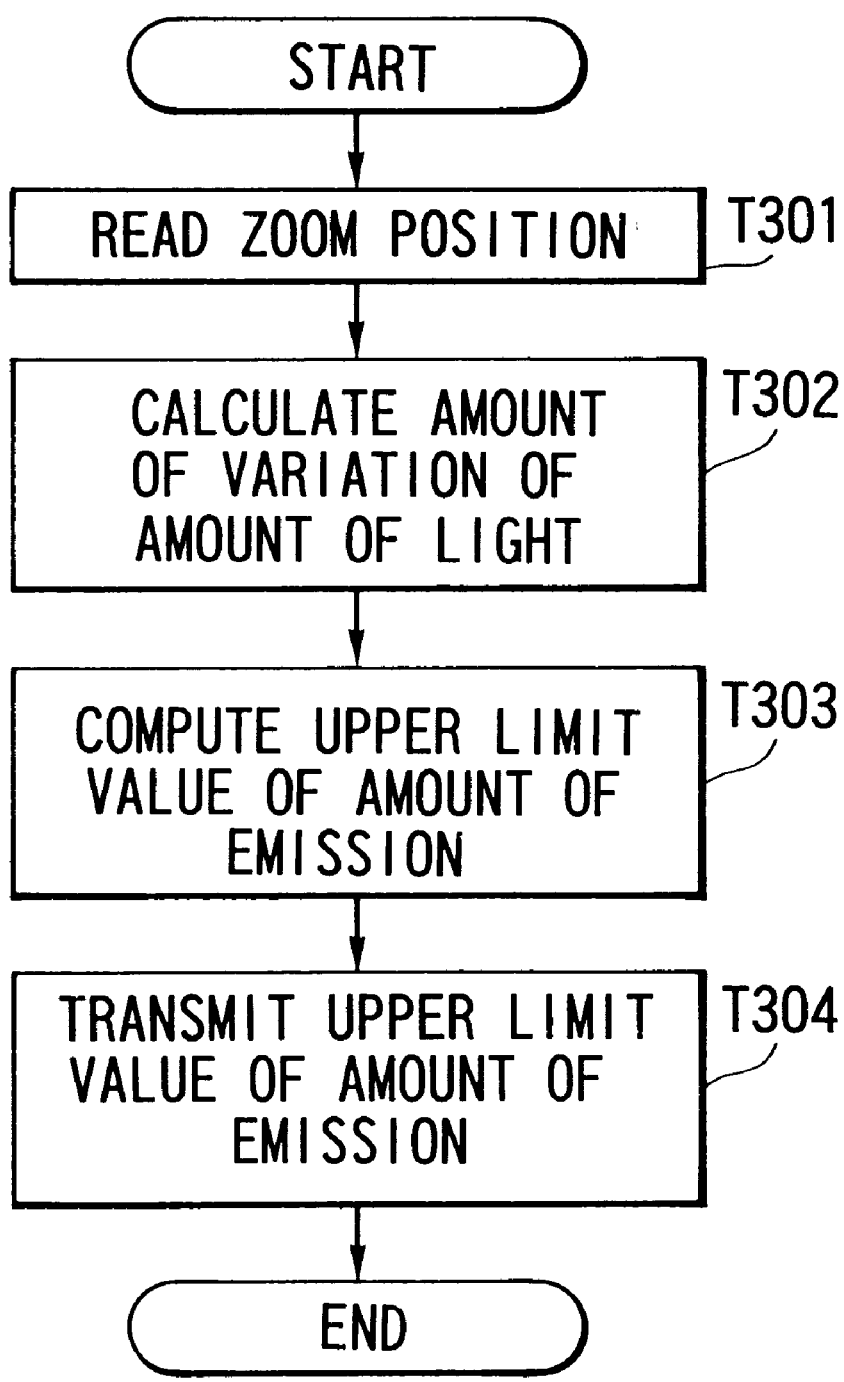
FIG. 16 is a flowchart showing the operation of the flash unit according to the fourth embodiment.

A method of determining whether flash control is possible and calculating an amount-of-emission upper limit value in order to cope with a variation in the amount of light after zooming will be described below with reference to FIG. 16. FIG. 16 is a flowchart showing the operation of calculating amount-of-emission upper limit value data, which is performed by the flash-unit microcomputer 200. First, in Step T301, the flash-unit microcomputer 200 reads the current flash zoom position through the terminals ZM0, ZM1 and ZM2. In Step T302, the flash-unit microcomputer 200 finds the amount of variation in the amount of light, ΔEV, relative to the amount of light of a preliminary emission, from the memorized value of a flash zoom position at the time of the preliminary emission (the memorized value is obtained by reading out the flash zoom position in Step S106 of FIG. 4 and in Step S204 of FIG. 5), by using the following expression:

$$\Delta EV = EV_{pre} - EV_{main}$$

$EV_{pre}$: amount-of-light correction value corresponding to the flash zoom position at the time of the preliminary emission, and $EV_{main}$: amount-of-light correction value corresponding to the current flash zoom position.

Incidentally, the values of $EV_{pre}$ and $EV_{main}$ are selected from among the amount-of-light correction values (the EV differences) shown in FIG. 15(c) which are memorized in a ROM (not shown) provided in the flash-unit microcomputer 200. Such values may be memorized in the memory 210.

Then, in Step T303, the flash-unit microcomputer 200 finds the amount-of-emission upper limit value (FPH__LIMIT) by the following expression:

$$FPH\_LIMIT = FPH\_LIMIT_{pre} + \Delta EV$$

$FPH\_LIMIT_{pre}$: amount-of-emission upper limit value at the time of the preliminary emission, and ΔEV: amount of variation in the amount of light, which has been obtained in Step T302.

Incidentally, the amount-of-emission upper limit value at the time of the preliminary emission is data indicative of the amount of emission of a main emission which is achievable at the time of the preliminary emission. For example, assuming that the amount of emission is defined as 8-bit data and 1 EV is defined as 10H (a hexadecimal number), if the amount of emission of a preliminary emission is a predetermined amount nnH which is lower than the maximum amount of emission of a main emission by m steps, the amount-of-emission upper limit value of the main emission which is possible at the time of the preliminary emission becomes nnH+m0H. If zooming is performed at a later time, the amount-of-emission upper limit value of the main emission capable of provide the amount of emission which is 1 EV higher than the amount of emission of the preliminary emission becomes nnH+m0H+10H.

Then, in Step T304, the flash-unit microcomputer 200 transmits the amount-of-emission upper limit value obtained in Step T303 to the camera microcomputer 100. As described previously, the camera microcomputer 100 compares the received amount-of-emission upper limit value and the amount of emission to be required for the main emission, and determines whether flash control after zooming is possible. The processing shown in FIG. 16 is performed in Step S208 of FIG. 5.

As is apparent from the above description, according to the fourth embodiment, the amount-of-emission upper limit value of the main emission is computed on the basis of the flash zoom position in real time and the amount-of-emission upper limit value and the amount of correct emission of the main emission are compared to make a decision as to whether flash control is possible, and the result of this decision is displayed in real time before photography. Accordingly, even if it is determined at the time of a preliminary emission that flash control is impossible, and it is subsequently determined that flash control has become possible as the result of zooming toward the telephoto end, or even if it is determined at the time of the preliminary emission that flash control is possible, and it is subsequently determined that flash control has become impossible as the result of zooming toward the wide-angle end, the photographer can be securely informed of that fact before photography. In addition, in the former case, the main emission is controlled so that the amount of emission of the main emission does not exceed the amount-of-emission upper limit value (which has increased as the result of the zooming toward the telephoto end) corresponding to a varied flash zoom position, so that a main emission which causes an insufficient amount of emission can be prevented and it is possible to realize highly efficient and reliable flash photography.

Since the result of a decision as to whether flash control is possible is further displayed after the main emission, a highly reliable post-check can be made as to the result of flash control without an error due to a difference in film reflectance like TTL flash control.

(Fifth Embodiment)

This embodiment includes means for displaying a deviation between the amount-of-emission upper limit value and the amount of correct emission in order to give a photographer detailed information indicating whether flash control is possible. The hardware arrangement of the fifth embodiment is similar to that of the fourth embodiment, and the description thereof is omitted for the sake of simplicity.

Figure 17A:
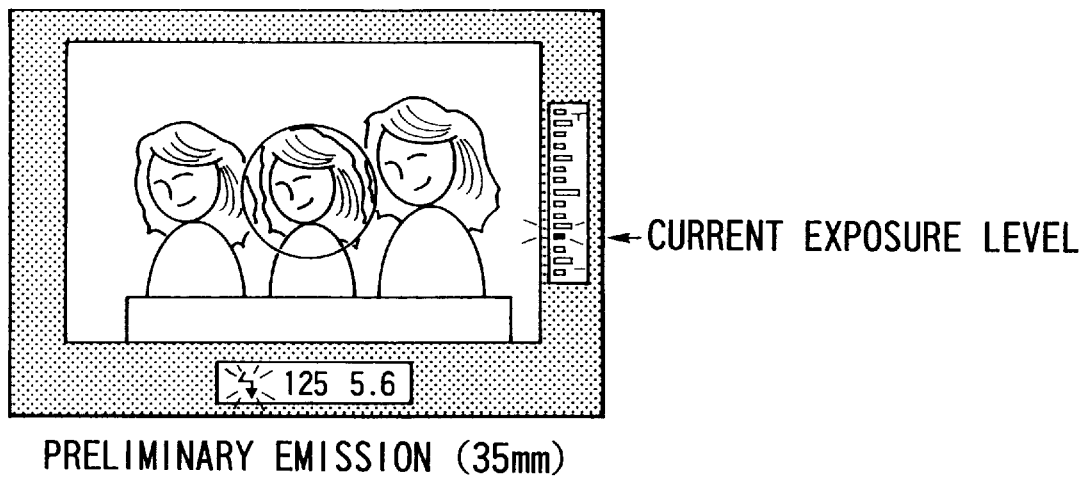
FIGS. 17(*a*) and 17(*b*) are views showing display examples provided in a camera according to a fifth embodiment of the present invention.
Figure 17B:
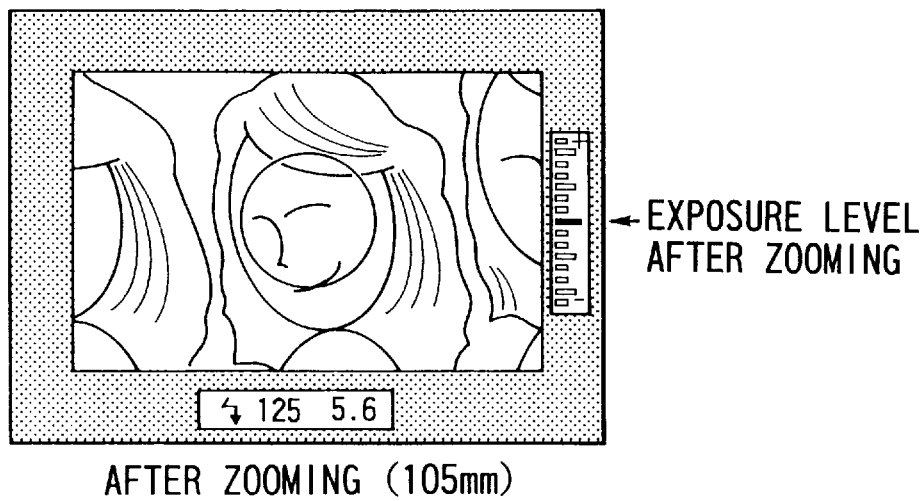

FIGS. 17(a) and 17(b) show the in-viewfinder display device 24 of a camera system according to the fifth embodiment. The bottom portion of the viewfinder 5 of the fifth embodiment is similar to that of the viewfinder 5 of each of the first and fourth embodiments, but the fifth embodiment differs from either of the embodiments in that the level at which an emission can be performed is displayed in the right-side portion of the viewfinder 5. A similar display may also be provided on the monitoring display device 42 disposed on the top of the camera body 1.

FIG. 17(a) shows a state of a display indicating whether flash control is possible, which display is provided immediately after a preliminary emission has been performed with the photographing lens system set to a focal length of 35 mm. In the right-side portion, the current exposure level is displayed by blinking which shows that an insufficient amount of light can only be obtained during this state.

FIG. 17(b) shows a state in which although the exposure level immediately after the preliminary emission was an underexposure level, the amount of light has become correct as the result of zooming up to the telephoto end (105 mm) carried out after the preliminary emission.

A flowchart for performing a computation to provide the aforesaid display during flash photography will be described below with reference to FIG. 18. Since the aforesaid display is suited to the FE lock mode, a flowchart for performing a display computation for the FE lock mode will be described below. Incidentally, this computation is performed in Step S208 of FIG. 5 referred to in the description of the first embodiment, and since the other steps are similar to those shown in FIG. 5, the description thereof is omitted for the sake of simplicity.

Figure 18:
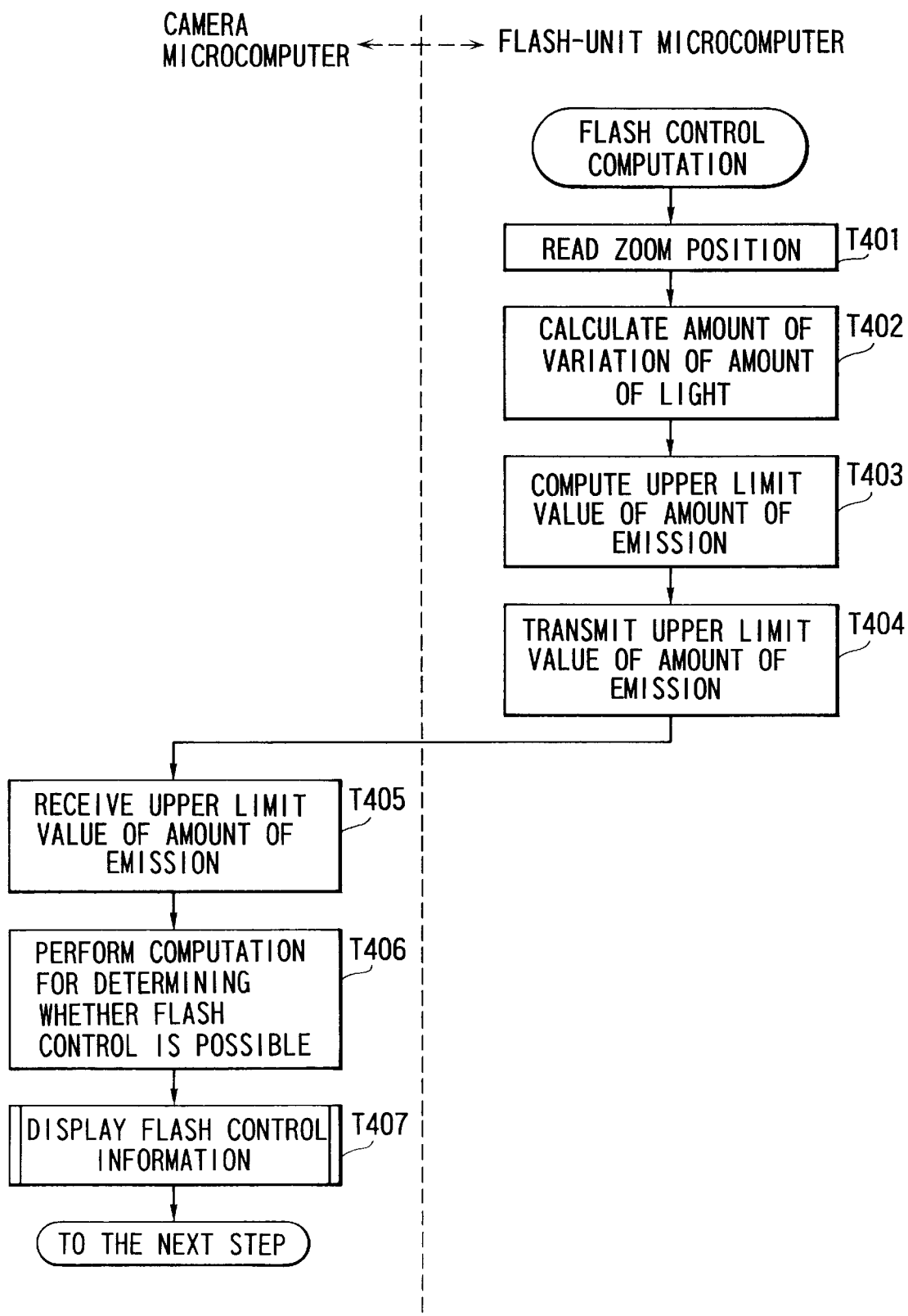
FIG. 18 is a flowchart showing the operation of a camera system according to the fifth embodiment.

FIG. 18 shows the flow of a program from the flash-unit microcomputer 200 to the camera microcomputer 100. Steps T401 to T404 are processed by the flash-unit microcomputer 200, and Steps T405 to T407 are processed by the camera microcomputer 100.

First, in Step T401, the flash-unit microcomputer 200 reads the current flash zoom position through the terminals ZM0, ZM1 and ZM2. In Step T402, the flash-unit microcomputer 200 finds the amount of variation in the amount of light, ΔEV, relative to the amount of light of the preliminary emission, from the memorized value of a flash zoom position at the time of the preliminary emission, by using the following expression:

$$\Delta EV = EV_{pre} - EV_{main}$$

$EV_{pre}$: amount-of-light correction value corresponding to the flash zoom position at the time of the preliminary emission, and $EV_{main}$: amount-of-light correction value corresponding to the current flash zoom position.

Incidentally, the values of $EV_{pre}$ and $EV_{main}$ are selected from among the amount-of-light correction values (the EV differences) shown in FIG. 15(c) which are memorized in the ROM (not shown) provided in the flash-unit microcomputer 200. Such values may be memorized in the memory 210.

Then, in Step T403, the flash-unit microcomputer 200 finds the amount-of-emission upper limit value (FPH__LIMIT) by the following expression:

$$FPH\_LIMIT = FPH\_LIMIT_{pre} + \Delta EV$$

$FPH\_LIMIT_{pre}$: amount-of-emission upper limit value at the time of the preliminary emission, and ΔEV: amount of variation in the amount of light, which has been obtained in Step T402.

Incidentally, the amount-of-emission upper limit value at the time of the preliminary emission is data indicative of the amount of emission of a main emission which is achievable at the time of the preliminary emission, as described above in connection with Step T303 of FIG. 16.

Then, in Step T404, the flash-unit microcomputer 200 transmits the amount-of-emission upper limit value obtained in Step T403 to the camera microcomputer 100.

In Step T405, the camera microcomputer 100 receives the amount-of-emission upper limit value from the flash-unit microcomputer 200. Then, in Step T406, the camera microcomputer 100 computes the difference (indicating whether flash control is possible) between the amount-of-emission upper limit value and the amount of correct emission of the main emission obtained in Step S206 of FIG. 5.

Then, in Step T407, on the basis of the value obtained in Step T406, the camera microcomputer 100 causes the liquid crystal display circuit 111 to display an amount-of-emission upper limit value relative to the current flash zoom position on each of the in-viewfinder display device 24 and the monitoring display device 42 provided on the top of the camera body 1, as shown in FIGS. 17(a) and 17(b).

Thus, the photographer can check before photography whether flash control is possible, and can determine the difference between the amount of correct exposure and the amount-of-emission upper limit value. Accordingly, not only can the photographer check whether flash control has become possible as the result of zooming carried out after the preliminary emission, but also can check how the amount of light is insufficient if flash control is impossible, before photography. Incidentally, the display may also be provided after photography.

As is apparent from the above description, according to the fifth embodiment, since whether flash control is possible is displayed in real time and the amount-of-emission upper limit value corresponding to zooming is computed and displayed before photography, the photographer can check before photography not only whether flash zoom position but also the difference between the amount of correct exposure and the amount-of-emission upper limit value. Accordingly, if the photographer, after zooming, confirms that no correct exposure is obtainable and inhibits execution of a main emission before photography, a main emission which causes an insufficient amount of emission can be prevented and emission energy can be effectively utilized.

(Sixth Embodiment)

Figure 19:
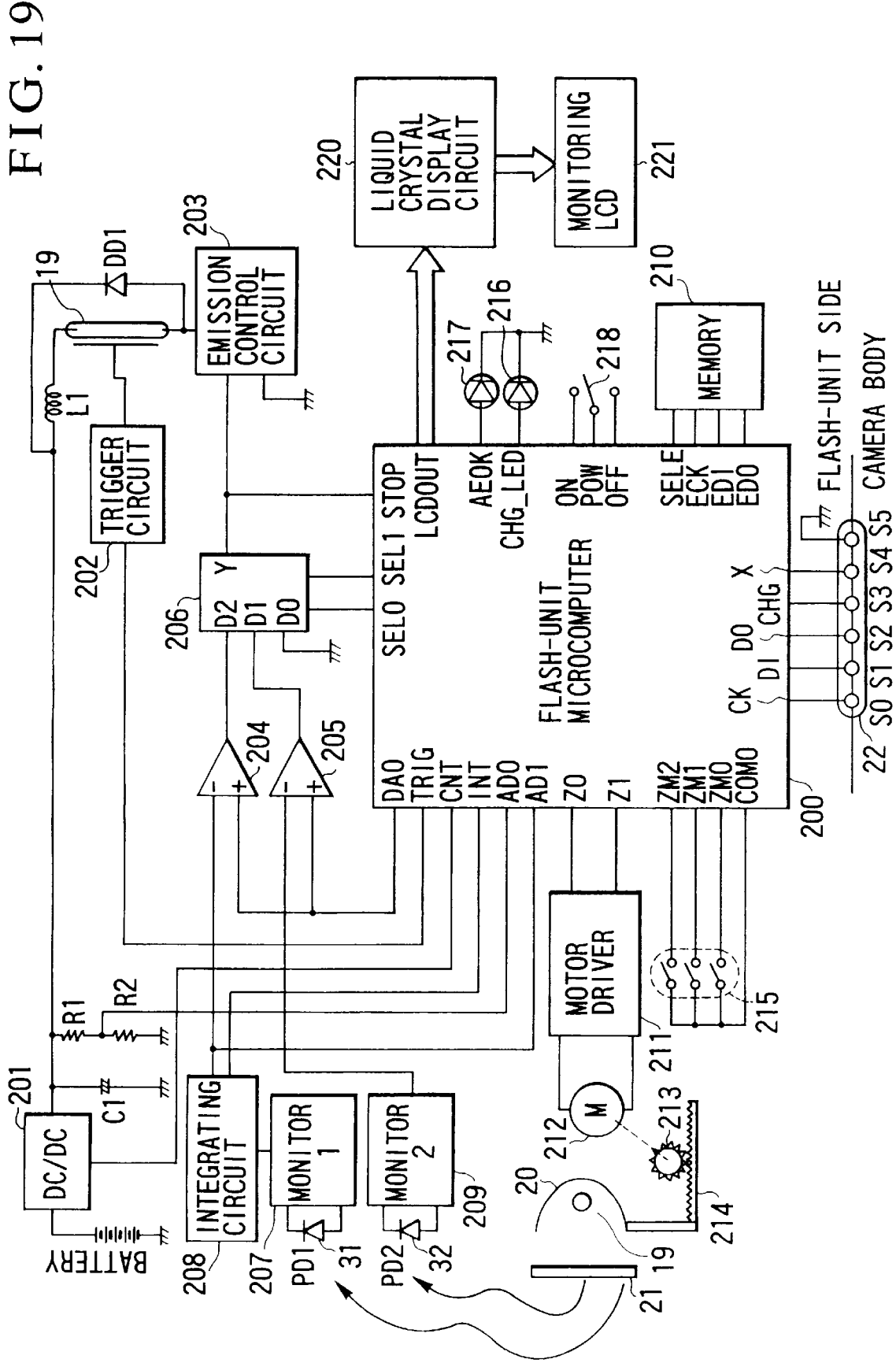
FIG. 19 is a block diagram of the electrical circuit of a sixth embodiment of the present invention.

FIG. 19 is a block diagram showing the electrical circuit of a camera system according to a sixth embodiment of the present invention. In FIG. 19, identical reference numerals are used to denote constituent elements identical to the corresponding ones shown in FIG. 11, and the description thereof is omitted for the sake of simplicity. In the sixth embodiment, the flash unit 18 has the function of displaying the amount of exposure.

In FIG. 19, reference numeral 220 denotes a liquid crystal display circuit, and reference numeral 221 denotes a monitoring liquid crystal display.

Figure 20A:
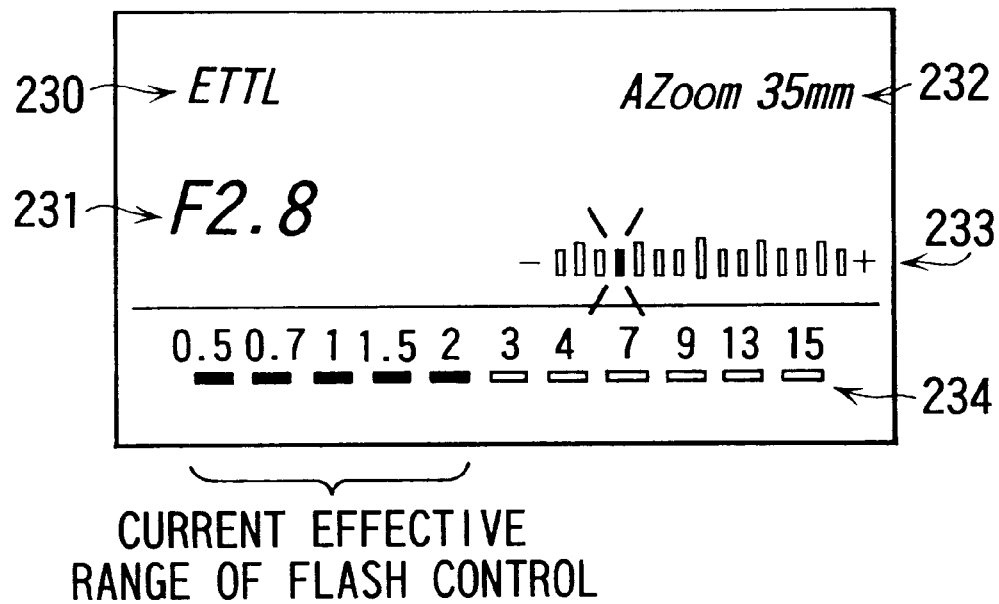
FIGS. 20(*a*) and 20(*b*) are views showing display examples of a flash unit according to the sixth embodiment.
Figure 20B:
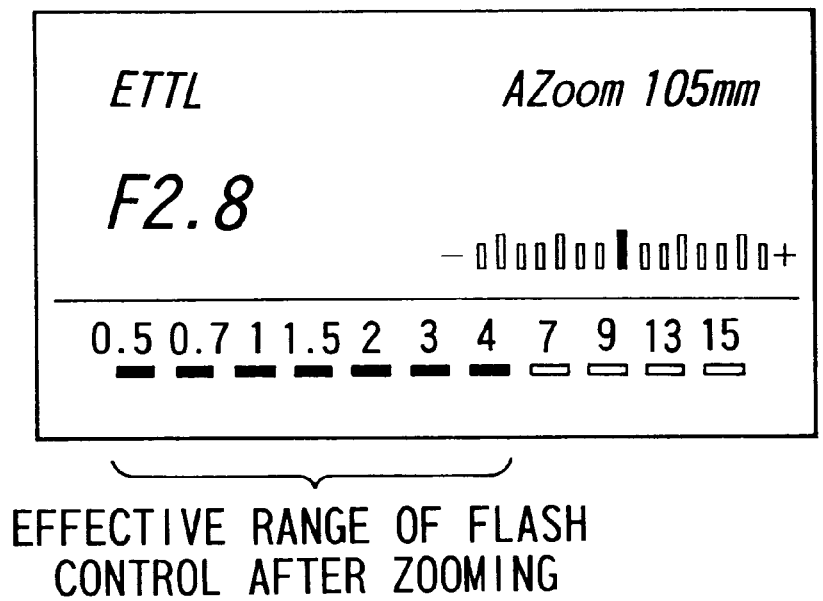

FIGS. 20(a) and 20(b) show different display examples to be provided on the liquid crystal display 221. The liquid crystal display 221 includes the display part 230 for indicating a photographing mode, the display part 231 for indicating an aperture value of the photographing lens system, the display part 232 for indicating a focal length of the photographing lens system, the display part 233 for indicating an exposure level to indicate whether flash control is possible, and the display part 234 for indicating an effective photographing distance.

Figure 21:
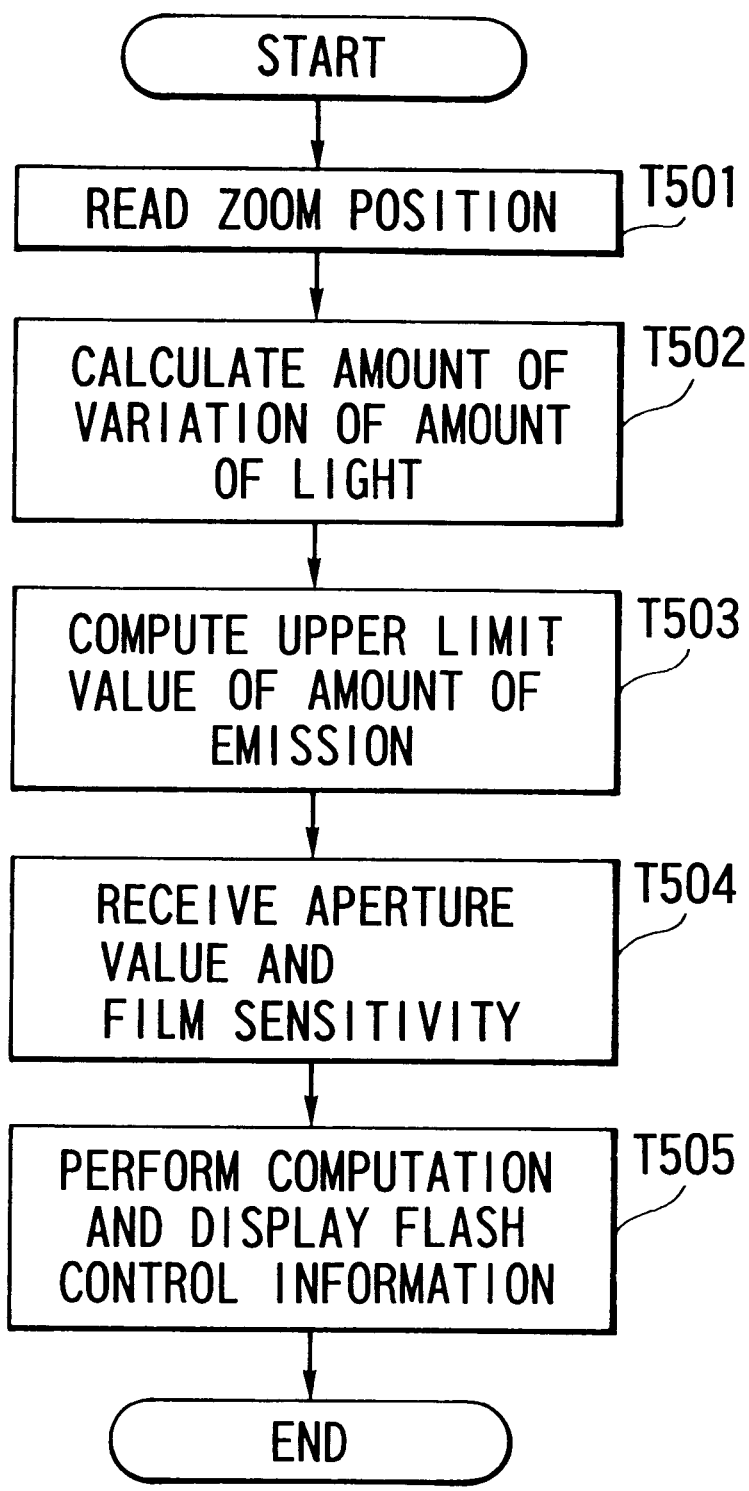
FIG. 21 is a flowchart showing the operation of the flash unit according to the sixth embodiment.

A flowchart for performing a computation to provide the aforesaid display during flash photography will be described below with reference to FIG. 21. Since the aforesaid display is particularly suited to the FE lock mode, a flowchart for performing a display computation for the FE lock mode will be described below. Incidentally, this computation is performed in Step S208 of FIG. 5, and since the other steps are similar to those shown in FIG. 5, the description thereof is omitted for the sake of simplicity.

First, in Step T501, the flash-unit microcomputer 200 reads the current flash zoom position through the terminals ZM0, ZM1 and ZM2. In Step T502, the flash-unit microcomputer 200 finds the amount of variation in the amount of light, ΔEV, relative to the amount of light of the preliminary emission, from the memorized value of a flash zoom position at the time of the preliminary emission, by using the following expression:

$$\Delta EV = EV_{pre} - EV_{main}$$

$EV_{pre}$: amount-of-light correction value corresponding to the flash zoom position at the time of the preliminary emission, and $EV_{main}$: amount-of-light correction value corresponding to the current flash zoom position.

Incidentally, the values of $EV_{pre}$ and $EV_{main}$ are selected from among the amount-of-light correction values (the EV differences) shown in FIG. 15(c) which are memorized in the ROM (not shown) provided in the flash-unit microcomputer 200. Such values may be memorized in the memory 210.

Then, in Step T503, the flash-unit microcomputer 200 finds the amount-of-emission upper limit value (FPH_LIMIT) by the following expression:

$$FPH\_LIMIT = FPH\_LIMIT_{pre} + \Delta EV$$

FPH_LIMIT$_{pre}$: amount-of-emission upper limit value at the time of the preliminary emission (FPH_LIMIT$_{pre}$ is determined on the basis of the voltage provided across the main emission at the time of the preliminary emission), and ΔEV: amount of variation in the amount of light, which has been obtained in Step T502.

Incidentally, the amount-of-emission upper limit value at the time of the preliminary emission is data indicative of the amount of emission of a main emission which is achievable at the time of the preliminary emission, as described above in connection with Step T303 of FIG. 16.

Then, in Step T504, the flash-unit microcomputer 200 receives the aperture value and the film sensitivity from the camera microcomputer 100.

In Step T505, the flash-unit microcomputer 200 computes the current exposure level on the basis of the difference between the amount of correct emission of the main emission received from the camera microcomputer 100 and the amount-of-emission upper limit value corresponding to the current flash zoom position, which value has been obtained in Step T503. Then, the flash-unit microcomputer 200 displays the current exposure level in the exposure level display part 233 of the monitoring liquid crystal display 221. In addition, the flash-unit microcomputer 200 computes the current effective range of flash control on the basis of a guide number corresponding to the current flash zoom position obtained in Step T503 and the aperture value and the film sensitivity received from the camera microcomputer 100, and displays the current effective range of flash control in the distance display part 234 of the liquid crystal display 221.

After the preliminary emission, the difference between the amount of correct emission and the amount-of-emission upper limit value relative to the current flash zoom position and the effective range of flash control are displayed not only on the display portion provided on the camera body 1 but also on the display portion 221 provided on the flash unit 18. Accordingly, the photographer can check before photography whether flash control is possible and whether a subject is in the effective range of flash control. In addition, since the display is updated in real time according to a change in the flash zoom position after the preliminary emission, the photographer can check before photography whether flash control is possible or the subject is in the effective range of flash control even after the change in the flash zoom position, and can further check how the amount of light is insufficient if flash control is impossible. Incidentally, the display may also be provided for a predetermined time after photography.

As is apparent from the above description, according to the sixth embodiment, since individual flash zoom positions are detected at different points in time from the preliminary emission until the main emission and the effective range of flash control is computed and displayed, if a subject is outside the effective range of flash control at the time of the preliminary emission, but enters the effective range of flash control as the result of zooming toward the telephoto end at a later time, or if a subject is within the effective range of flash control at the time of the preliminary emission, but goes out of the effective range of flash control as the result of zooming toward the wide-angle end at a later time, the photographer can be definitely informed of that fact before photography and can determine the effective range of flash control in real time before photography so that the photographer can perform highly reliable flash photography.

(Seventh Embodiment)

A seventh embodiment will be described below. The optical arrangement of a camera system according to the seventh embodiment is identical to that shown in FIG. 1, the circuit arrangements of its camera body and its lens barrel are identical to those shown in FIG. 14, and the circuit arrangement of its flash unit is identical to that shown in FIG. 3. In addition, preliminary emission, main emission control, main flat emission control and main flash emission control to be performed in the seventh embodiment are identical to those described previously in connection with the aforesaid embodiments. Therefore, the descriptions of such arrangements and controls are omitted for the sake of simplicity.

In the seventh embodiment, an emission intensity or the amount of emission is corrected with respect to a variation in a flash-illuminating angle. The following description is focused on this feature.

Correction Computation

The sensor 32 which is used for controlling the flat emission in the seventh embodiment is disposed in the vicinity of the reflector 20, as shown in FIG. 1. Since the sensor 32 moves together with the reflector 20 according to the operation of driving the flash unit 18 to vary the illuminating angle thereof (hereinafter referred to as the "flash zooming"), the amount of light received by the sensor 32 basically does not vary. The sensor 31 which is used for controlling the flash emission is located away from the xenon tube 19 to avoid the affection of noise, and is disposed at a position different from the position where the reflector 20 is disposed. However, since the glass fiber 30 for transmitting light to the sensor 31 is fixed to the reflector 20, the sensor 31 is located substantially at the same position as the reflector 20 and the amount of light received by the sensor 31 basically does not vary according to the flash zooming operation.

Accordingly, even if flash zooming is performed while the flat emission or the flash emission is being controlled, if control values, i.e., control voltages for the comparators 204 and 205 described previously with reference to FIG. 3, do not vary, the guide number of the flash unit 18 will vary owing to an optical light gathering action on the basis of the positional relationship between the Fresnel lens 21 and the reflector 20. This phenomenon will be described below with reference to FIG. 22.

Figure 22:
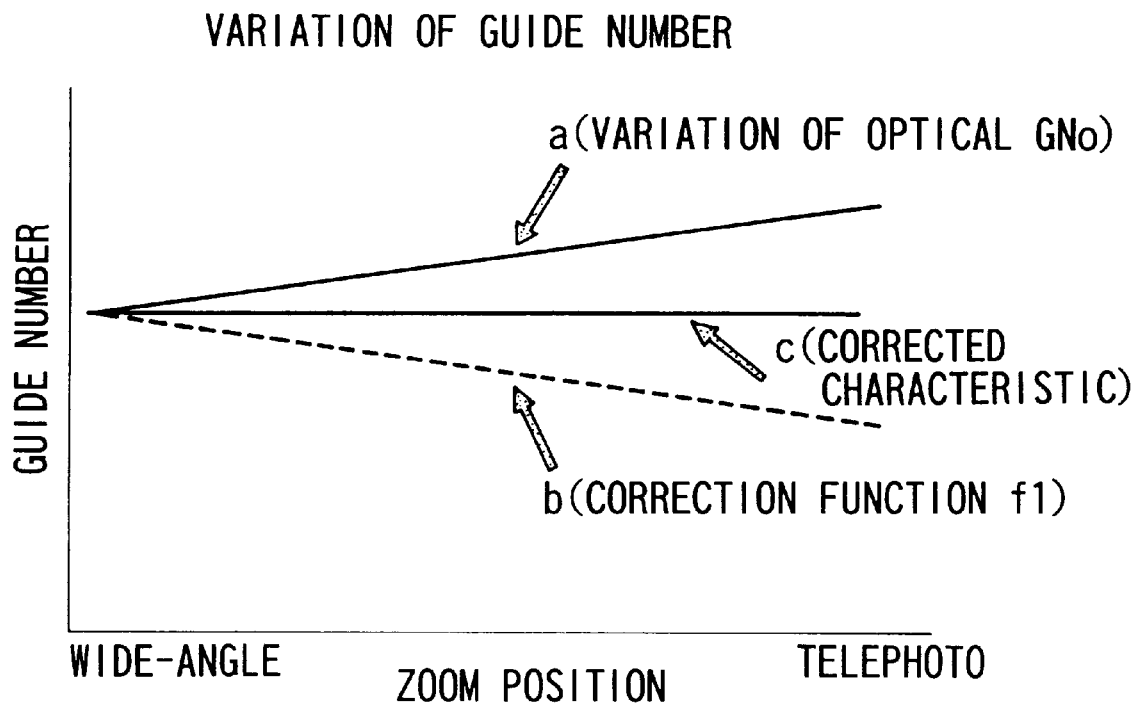
FIG. 22 is a graph aiding in describing a variation in guide number due to flash zooming in a seventh embodiment of the present invention.

FIG. 22 shows variations in the guide number with respect to variations in the flash zoom position of the flash unit 18, a guide number correction function and a corrected guide number. In FIG. 22, a line "a" indicates a non-corrected guide number, and as the flash zoom position is closer to the telephoto end, this guide number "a" increases owing to the optical light gathering action. A line "b" indicates a correction function for electrically correcting the optical light gathering action due to flash zooming in an opposite direction so as to keep the guide number constant. This guide number correction function is denoted by fl. A line "c" indicates a guide number corrected with the correction function "b", and is approximately constant irrespective of the flash zoom position.

Although the above description states that the amount of light received by each of the sensors 31 and 32 basically does not vary, if the respective positions of the Fresnel lens 21 and the reflector 20 vary with flash zooming toward the wide-angle side, i.e., the distance between the reflector 20 and the reflector 20 becomes short, the sensitivities of the sensors 31 and 32 rise to a slight extent by being affected by the light reflected directly from the Fresnel lens 21. This phenomenon is shown in FIG. 23.

Figure 23:
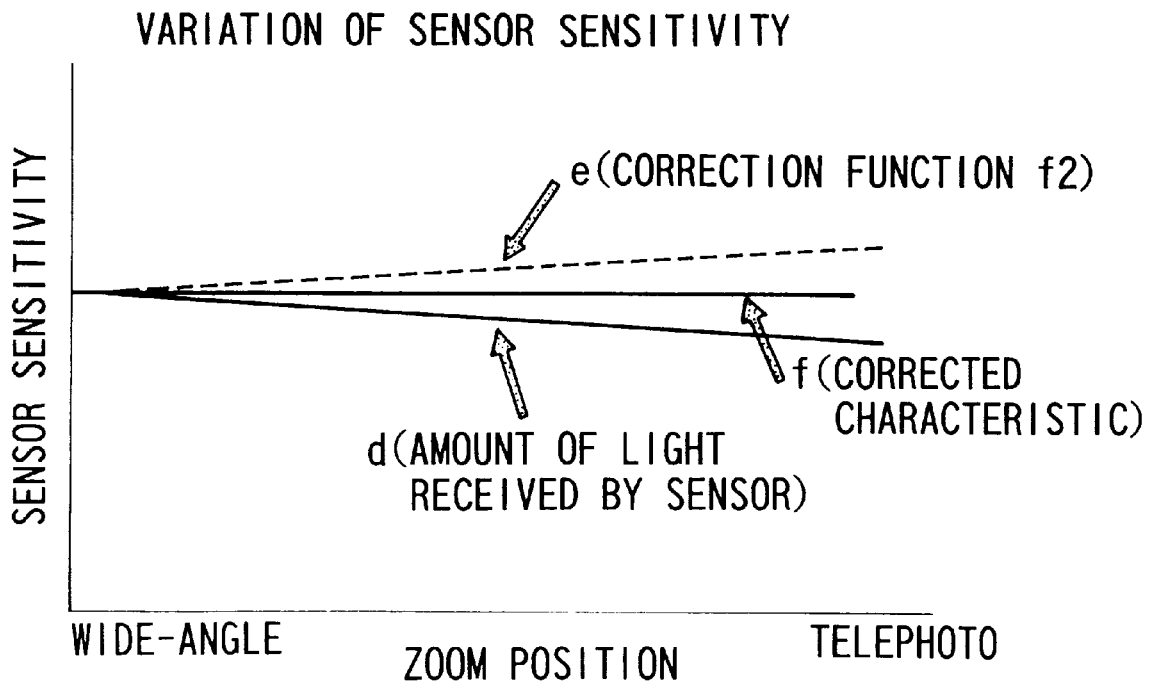
FIG. 23 is a graph aiding in describing a variation in the sensitivity of a light receiving sensor due to flash zooming in the seventh embodiment.

In FIG. 23, a line "d" indicates the amount of light received by each of the sensors 31 and 32. It can be seen from the amount of received light "d" that as the Fresnel lens 21 is closer to each of the sensors 31 and 32, the amount of light received by each of the sensors 31 and 32 increases by being affected by the light reflected from the Fresnel lens 21. Accordingly, if control using only the correction function f1 is performed during flash zooming, as shown by the line "d", the amount of emission becomes smaller toward the wide-angle end and larger toward the telephoto end. Accordingly, by performing correction using the correction function shown at "e" in FIG. 23, the sensitivity of each of the light receiving sensors 31 and 32 can be electrically corrected to be kept constant as shown at "f". This correction function is denoted by f2.

Although these correction functions f1 and f2 may be combined into one function, the correction functions f1 and f2 are separately prepared in the seventh embodiment. This is because since the seventh embodiment assumes that the preliminary emission uses 1/a predetermined number of the energy stored in the main capacitor C1, an emission intensity proportional to a rise in the guide number is needed for the preliminary emission, but it is also necessary to prevent the amount of light from being decreased on the wide-angle side by the affection of the light reflected from the Fresnel lens 21. In addition, since the optical position of each of the light receiving sensors 31 and 32 differs between the flat emission and the flash emission, it is preferable that the sensor sensitivity correction function f2 be prepared as two individual correction functions for flat emission and for flash emission.

Figure 24:
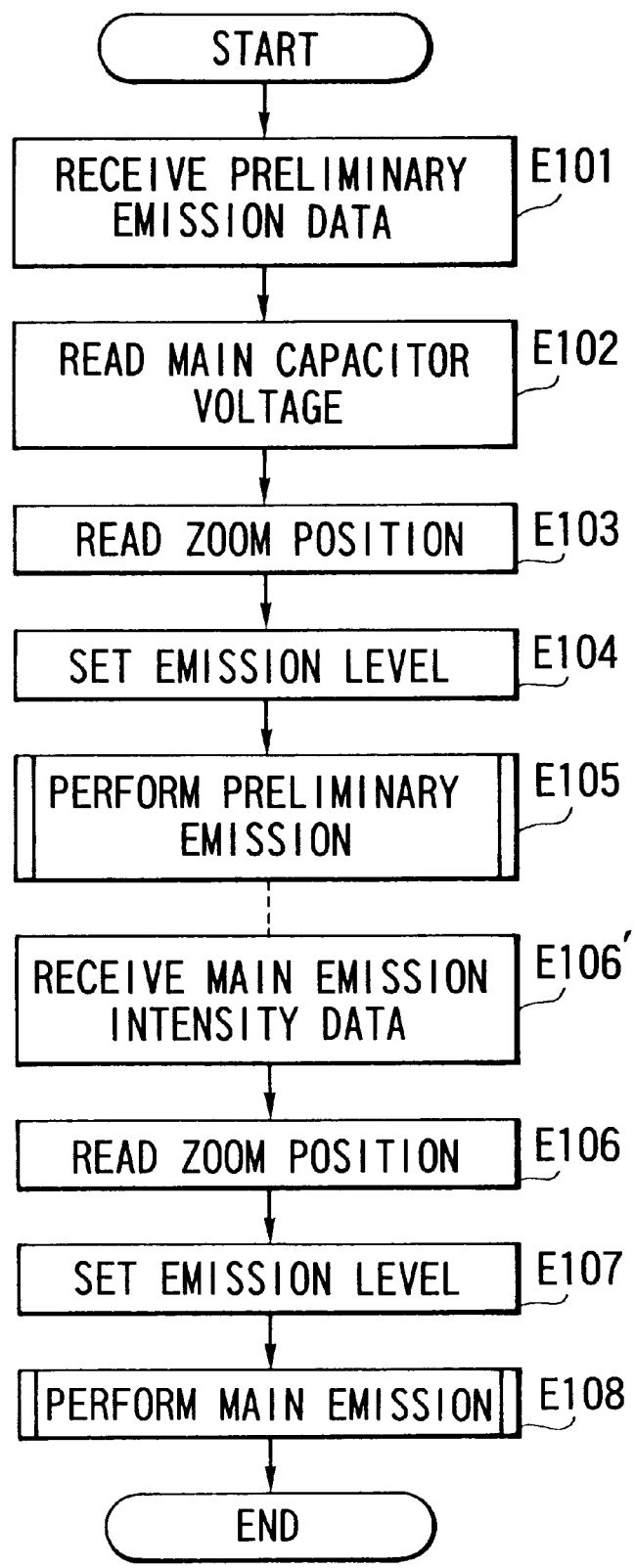
FIG. 24 is a flowchart showing a program for performing a correcting computation on the guide number according to the seventh embodiment.

A method of performing a correction computation to keep the guide number constant during flash zooming will be described below with reference to FIG. 24. FIG. 24 is a flowchart showing operations to be mainly performed by the flash-unit microcomputer 200. First, in Step E101, if a photographer performs an operation for executing a preliminary emission (an operation of the light/distance measuring switch SW1 in the case of the batch emission mode, or an operation of the switch SWFELK in the FE lock mode), the flash-unit microcomputer 200 receives preliminary emission data for executing the preliminary emission, i.e., an emission intensity $FH_{pre}$ and an emission time $FT_{pre}$, from the camera microcomputer 100 through the serial communication lines S0 to S2.

In Step E102, the flash-unit microcomputer 200 reads through the terminal Ad0 data relative to the main capacitor C1 which is a parameter required for determining the intensity of the preliminary emission, and finds a correction coefficient corresponding to the voltage of the main capacitor C1. Specifically, since the energy stored in the main capacitor C1 according to the voltage is proportional to the square of the voltage of the main capacitor C1, the amount of emission of the preliminary emission which is equivalent to 1/n of the voltage of the main capacitor C1 can be obtained by correcting a full-charge emission intensity by using the following expression (function f3):

$$f3 = \text{LOG}_2\left(k\frac{V_{mc}^2}{V_{full}^2}\right)$$

$V_{full}$: full-charge voltage of the main capacitor C1,
$V_{mc}$: voltage currently provided across the main capacitor C1, and
k: correction coefficient for correcting loss due to the internal resistances of an emission control element and a power supply.

Incidentally, the solution of this function f3 may be memorized in the ROM (not shown) of the flash-unit microcomputer 200 as a computation result corresponding to the voltage of the main capacitor C1.

Then, in Step E103, the flash-unit microcomputer 200 reads from the zoom position encoder 215 a flash zoom position which is another parameter required for determining the intensity of the preliminary emission, and obtains from the ROM (not shown) of the flash-unit microcomputer 200 the guide number correction function f1 and the sensitivity correction function f2 which correspond to the flash zoom position indicated by the zoom position encoder 215. The following tables show examples of the guide number correction function f1 and the sensitivity correction function f2, respectively.

Example of Correction Coefficient f1

| FOCAL LENGTH | GNo | CORRECTION VALUE f1 |
|---|---|---|
| 24 mm | 21 | 0 EV |
| 28 mm | 23 | −0.26 EV |
| 35 mm | 28 | −0.83 EV |
| 50 mm | 31 | −1.12 EV |
| 70 mm | 33 | −1.30 EV |
| 105 mm | 38 | −1.71 EV |

Example of Correction Coefficient f2

| FOCAL LENGTH | CORRECTION VALUE f2 |
|---|---|
| 24 mm | 0 EV |
| 28 mm | −0.1 EV |
| 35 mm | −0.15 EV |
| 50 mm | −0.2 EV |
| 70 mm | −0.3 EV |
| 105 mm | −0.3 EV |

Incidentally, this sensitivity correction function f2 is not needed for the preliminary emission, but is needed for correcting the guide number during the main emission. For this reason, the sensitivity correction function f2 is read out in advance and memorized in a RAM (not shown) provided in the flash-unit microcomputer 200.

These correction functions may not be memorized in the aforesaid ROM of the flash-unit microcomputer 200. If the correction functions are memorized in the writable memory 210 during an adjustment step of a manufacturing process, it is possible to easily cope with individual differences among products by using these memorized functions.

These correction functions may be obtained by a computation as functions according to the flash zoom position.

Then, in Step E104, the flash-unit microcomputer 200 obtains an emission intensity $H_{pre}$ of the preliminary emission by adding together the emission intensity data received from the camera microcomputer 100 in Step E101, the voltage correction function f3 obtained in Step E102 and the sensor sensitivity correction function f2 obtained in Step E103, and sets a voltage corresponding to the emission intensity $H_{pre}$ at the output terminal DAO of the flash-unit microcomputer 200 at which to provide an emission comparison level setting output. This set value is equivalent to approximately 1/n of the emission energy stored in the main capacitor C1 at the time of the preliminary emission.

Then, in Step E105, the flash-unit microcomputer 200 performs preliminary emission control in accordance with the emission intensity set in Step E104. Since the method of controlling the preliminary emission has been described previously, the description thereof is omitted for the sake of simplicity.

Then, in Step E106', if the photographer operates the shutter release starting switch SW2, the flash-unit microcomputer 200 receives an emission mode for a main emission (the flat emission mode or the flash emission mode) and emission data for the main emission (an emission intensity $FH_{main}$ and an emission time $FT_{main}$ in the case of the flat emission mode, or the emission intensity $FH_{main}$ in the case of the flash emission mode), from the camera microcomputer 100 through the through the serial communication lines S0 to S2. As described previously, the flat emission mode is set if a shutter speed faster than the flash-synchronizing speed is selected, while the flash emission mode is set if a shutter speed slower than or equal to the flash-synchronizing speed is selected. Then, in Step E106, the flash-unit microcomputer 200 obtains the correction functions f1 and f2 in a manner similar to Step E103.

In Step E107, the flash-unit microcomputer 200 obtains the emission intensity of the main emission from the emission intensity $H_{pre}$ of the preliminary emission obtained in Step E104 and the emission intensity $FH_{main}$ of the main emission received in Step E106'. However, the flash-unit microcomputer 200 performs the following computations to obtain the emission intensity of the main emission so that a variation in the amount of exposure can be suppressed even if the flash zoom position varies after the preliminary emission has been performed:

flat emission intensity=emission intensity of preliminary emission+difference emission intensity of main emission+$(f1_{main}-f1_{pre})+(f2_{main}-f2_{pre})$, and flash emission intensity=emission integral value of preliminary emission+difference emission intensity of main emission+$(f1_{main}-f1_{pre})+(f2_{main}-f2_{pre})$, where $f1_{main}$ and $f2_{main}$ are the values obtained in Step E106, and $f1_{pre}$ and $f2_{pre}$ are the values obtained in Step E103.

Specifically, the emission intensity of the flat emission is calculated by adding the difference emission intensity of the main emission to an emission intensity equivalent to the voltage to be set at the terminal DAO through which to provide a D/A converter output at the time of the preliminary emission, to prepare a basic emission intensity, and adding a guide number correction value and a sensor sensitivity correction value corresponding to flash zooming to the basic emission intensity. The emission intensity (the amount of emission) of the flash emission is calculating by adding an integral value of the amount of light of the preliminary emission to the difference emission intensity of the main emission to prepare a basic emission intensity, and adding a guide number correction value and a sensor sensitivity correction value corresponding to flash zooming to the basic emission intensity.

The emission intensity (the amount of emission) thus calculated is set as a voltage at the output terminal DAO through which to provide an emission controlling D/A converter output.

Then, in Step E108, the flash-unit microcomputer 200 executes the main emission so that a correct amount of emission can be achieved, on the basis of the main emission intensity obtained in Step E107. If the flat emission mode is selected, the main emission is performed at the aforesaid emission intensity for a specified time, while if the flash emission mode is selected, the main emission is performed so that the amount of emission of the main emission reaches a predetermined integral amount of emission.

As is apparent from the above description, in the seventh embodiment, the main emission intensity (the amount of emission of the main emission) computed at the time of the preliminary emission is corrected according to a variation in the flash zoom position so that a variation due to optical factors in the guide number which occurs owing to the variation in the flash zoom position after the preliminary emission can be cancelled. Accordingly, it is possible to realize highly accurate and easy flash photography which does not involve a variation in the amount of light due to the variation in the flash zoom position.

In addition, since the preliminary emission and the main emission are defined in a relative relationship, even if the emission intensity of the preliminary emission differs among individual products owing to nonuniform adjustment in a manufacturing process or the like, the emission intensity of the main emission is set as a relative value of the result of measurement of the amount of emission of the preliminary emission, so that it is possible to obtain a correct main emission intensity at all times. In addition, even if an exposure correction is performed by using amount-of-exposure-correction setting means (not shown) after the preliminary emission, it is possible to easily vary the main emission intensity merely by adding an exposure correction value to a relative main emission intensity, so that it is possible to provide various photographic effects by means of easy operations and system constructions.

(Eighth Embodiment)

Figure 25:
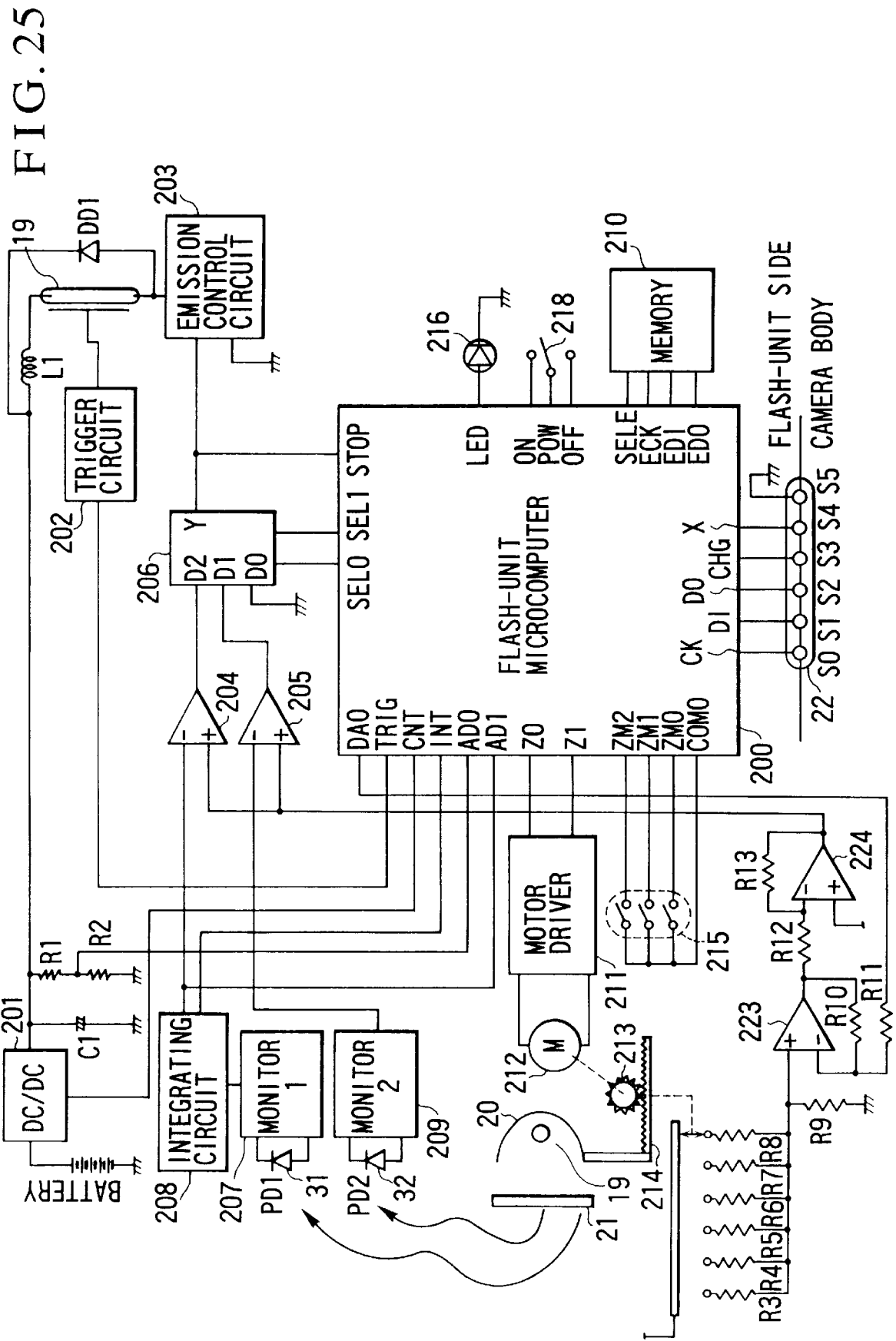
FIG. 25 is a block diagram showing the electrical arrangement of a flash unit according to an eighth embodiment of the present invention.

In an eighth embodiment, an analog correction circuit is used to perform the correction (described above in connection with the seventh embodiment) of a variation in the guide number due to flash zooming. FIG. 25 is a block diagram showing the arrangement of a flash unit according to the eighth embodiment. In FIG. 25, identical reference numerals are used to denote constituent elements identical to those shown in FIG. 3, and the description thereof is omitted for the sake of simplicity.

In the arrangement shown in FIG. 25, resistors R3 to R8 are provided for correcting a variation in the guide number due to flash zooming, and the resistors R3 to R8 are selectively connected to a power source Vc according to the position of the reflector 20. Resistors R9 to R11 as well as an operational amplifier 223 constitute a subtracting circuit. Resistors R12 and R13 and an operational amplifier 224 constitute an inverting amplifier.

The operation of the subtracting circuit will be described below. A voltage $V_+$ at the + input terminal of the operational amplifier 223 is expressed as:

$$V_+ = R9/(RZ+R9)*Vc$$

(RZ is a resistance value which is selected according to the zoom position).

Since the potentials at the + input terminal and the − input terminal of the operational amplifier 223 are equal, the current flowing through the resistor R11 is expressed by the following expression:

$$I_{R11} = \frac{DA0 - V+}{R11}$$

$$= \frac{1}{R11} * \left(DA0 - \frac{R9}{RZ + R9} * Vc\right)$$

Since this current $I_{R11}$ flows through the feedback resistor R10, an output $V_{op}$ of the operational amplifier 223 is expressed by the following expression:

$$V_{op} = V_+ - R11 * I_{R11}$$

$$= -\frac{R10}{R11} * DA0 + \frac{R9(R11 + R10)}{R11(RZ + R9)} * Vc$$

Accordingly, if the sign of the voltage of the output $V_{op}$ is inverted through the inverting amplifier (such as the operational amplifier 224), a correction voltage determined by the resistance value RZ is subtracted from the original output provided at the terminal DA0. In other words, as the resistance value RZ becomes larger, the amount of the subtraction becomes smaller. Accordingly, the resistance value of the resistor R3 located on the wide-angle end is set to infinity and the resistance values of the resistors R4 to R8 are selected to become gradually smaller toward the telephoto end, so that a variation due to flash zooming can be corrected.

As is apparent from the above description, in the eighth embodiment, a variation in the guide number due to flash zooming after the preliminary emission is cancelled by electrically correcting an emission intensity control voltage by means of the analog subtraction circuit corresponding to the flash zoom position, so that it is possible to realize highly accurate and easy flash photography which does not involve a variation in the amount of light due to the variation in the flash zoom position.

(Ninth Embodiment)

Figure 26:
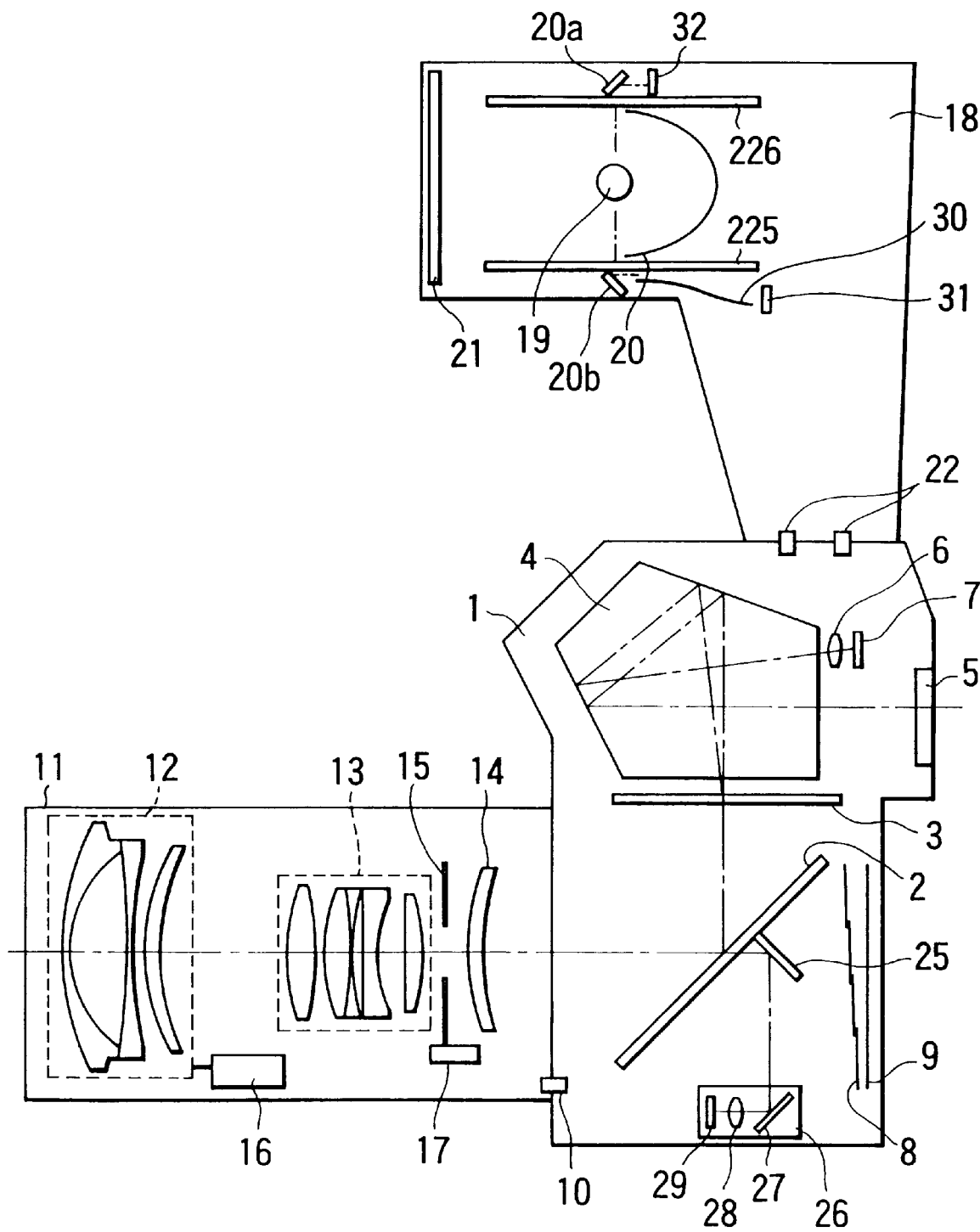
FIG. 26 is a diagrammatic cross-sectional view of a camera system according to a ninth embodiment of the present invention.

In a ninth embodiment, a variation in the guide number due to flash zooming is optically corrected instead of being electrically corrected as described above in connection with the seventh and eighth embodiments. FIG. 26 is a cross-sectional view mainly showing the optical arrangement of a camera system according to the ninth embodiment. In FIG. 26, identical reference numerals are used to denote constituent elements identical to those shown in FIG. 1, and the description thereof is omitted for the sake of simplicity.

The arrangement shown in FIG. 26 includes a transmission type of optical filter 225 for correcting, according to the flash zoom position, the amount of light incident on the sensor 31 for integrating the amount of light. This filter 225 is fixed to the body of the flash unit 18, and varies its transmittance according to the movement of the reflector 20, thereby correcting the amount of light to be made incident on the sensor 31. The arrangement shown in FIG. 26 also includes a transmission type of optical filter 226. This filter 226 is arranged similarly to the filter 225, and is disposed with respect to the sensor 32 in a positional relationship similar to the positional relationship of the filter 225 with the sensor 31. The filter 226 corrects, according to the flash zoom position, the amount of light to be made incident on the sensor 32 for controlling the flash emission.

Figure 27:
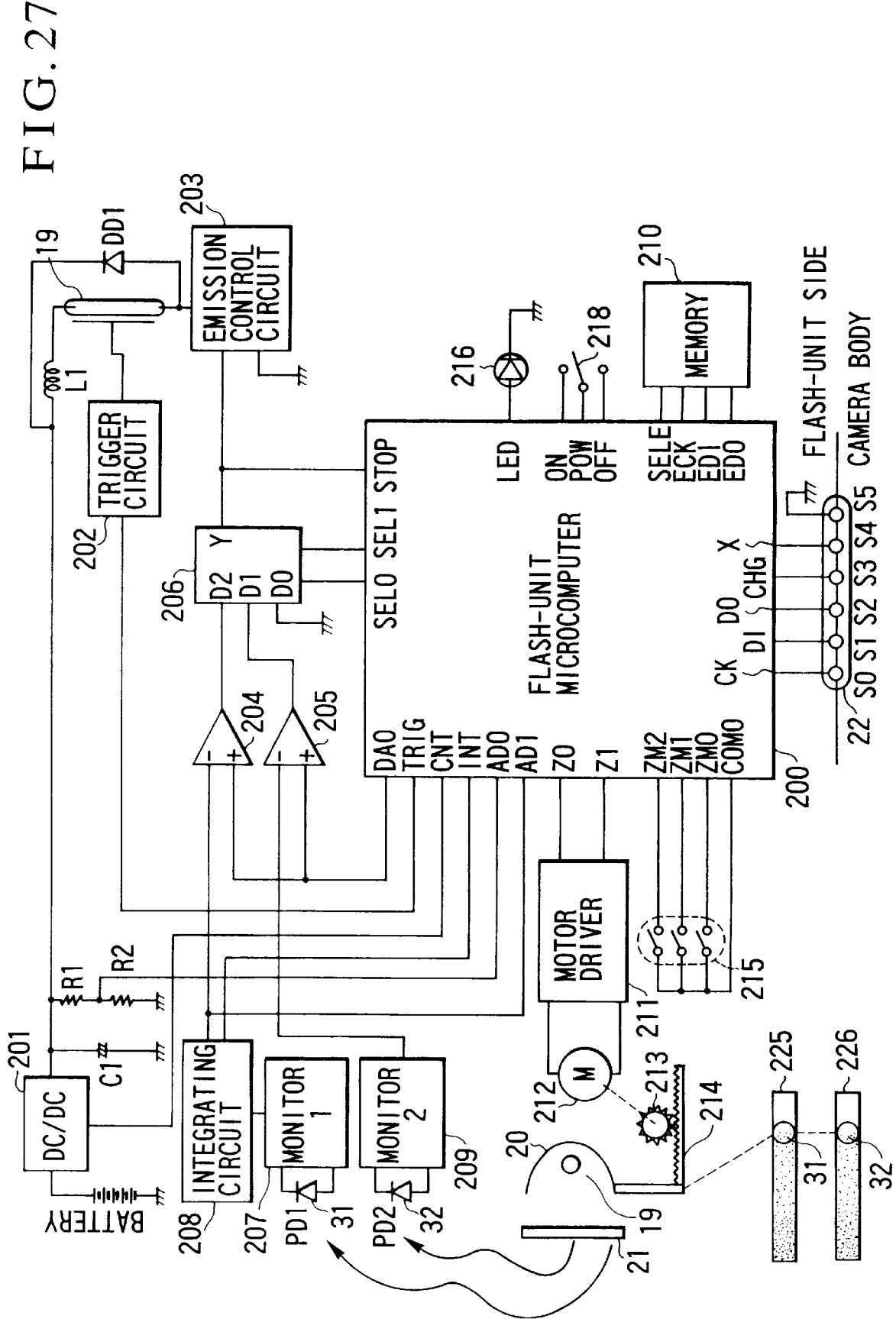
FIG. 27 is an electrical circuit block diagram showing the electrical arrangement of a flash unit according to the ninth embodiment.

FIG. 27 is a block diagram showing the arrangement of the flash unit according to the ninth embodiment. In FIG. 27, identical reference numerals are used to denote constituent elements identical to those shown in FIG. 25, and the description thereof is omitted for the sake of simplicity. In FIG. 27, reference numerals 225 and 226 denotes the optical filters described above with reference to FIG. 26. FIG. 27 shows the state in which the light emitted from the xenon tube 19 is made incident on the sensors 31 and 32 through the respective filters 225 and 226.

The operation of the ninth embodiment will be described below. As shown in FIG. 27, each of the optical filters 225 and 226 is set so that its transmittance becomes lower toward the wide-angle end at which the guide number is smallest, whereas the transmittance becomes higher toward the telephoto end at which the guide number is largest. Specifically, as the reflector 20 moves toward the telephoto end, the amount of light incident on the sensor 31 or 32 becomes larger, and the corresponding one of an amount-of-light control circuit which is composed of the monitor circuit 209 and the comparator 205 and an amount-of-light control circuit which is composed of the monitor circuit 207, the integrating circuit 208 and the comparator 204 determines that "it is too bright", and decreases the emission intensity. Conversely, as the reflector 20 moves toward the wide-angle end, the amount the amount of light incident on the sensor 31 or 32 becomes smaller, and the corresponding amount-of-light control circuit determines that "it is too dark", and increases the emission intensity. Accordingly, an approximately constant amount of light is maintained over the entire range of focal lengths between the wide-angle end and the telephoto end.

As is apparent from the above description, according to the ninth embodiment, a variation due to optical factors in the guide number which occurs owing to the variation in the flash zoom position after the preliminary emission can be corrected by optically correcting the sensitivity of the control system according to the flash zoom position. Accordingly, it is possible to realize highly accurate and easy flash photography which does not involve a variation in the amount of light due to the variation in the flash zoom position.

(Tenth Embodiment)

A tenth embodiment of the present invention will be described below.

The optical arrangement of the tenth embodiment is identical to that shown in FIG. 1, the circuit arrangements of its camera body and its lens barrel are identical to those shown in FIG. 14, and the circuit arrangement of its flash unit is identical to that shown in FIG. 3. In addition, preliminary emission, main emission control, main flat emission control, main flash emission control and the like are performed in manners identical to those described previously in connection with the aforesaid embodiments.

The FE lock mode according to the tenth embodiment will be described below with reference to FIGS. 28 and 29.

Figure 28:
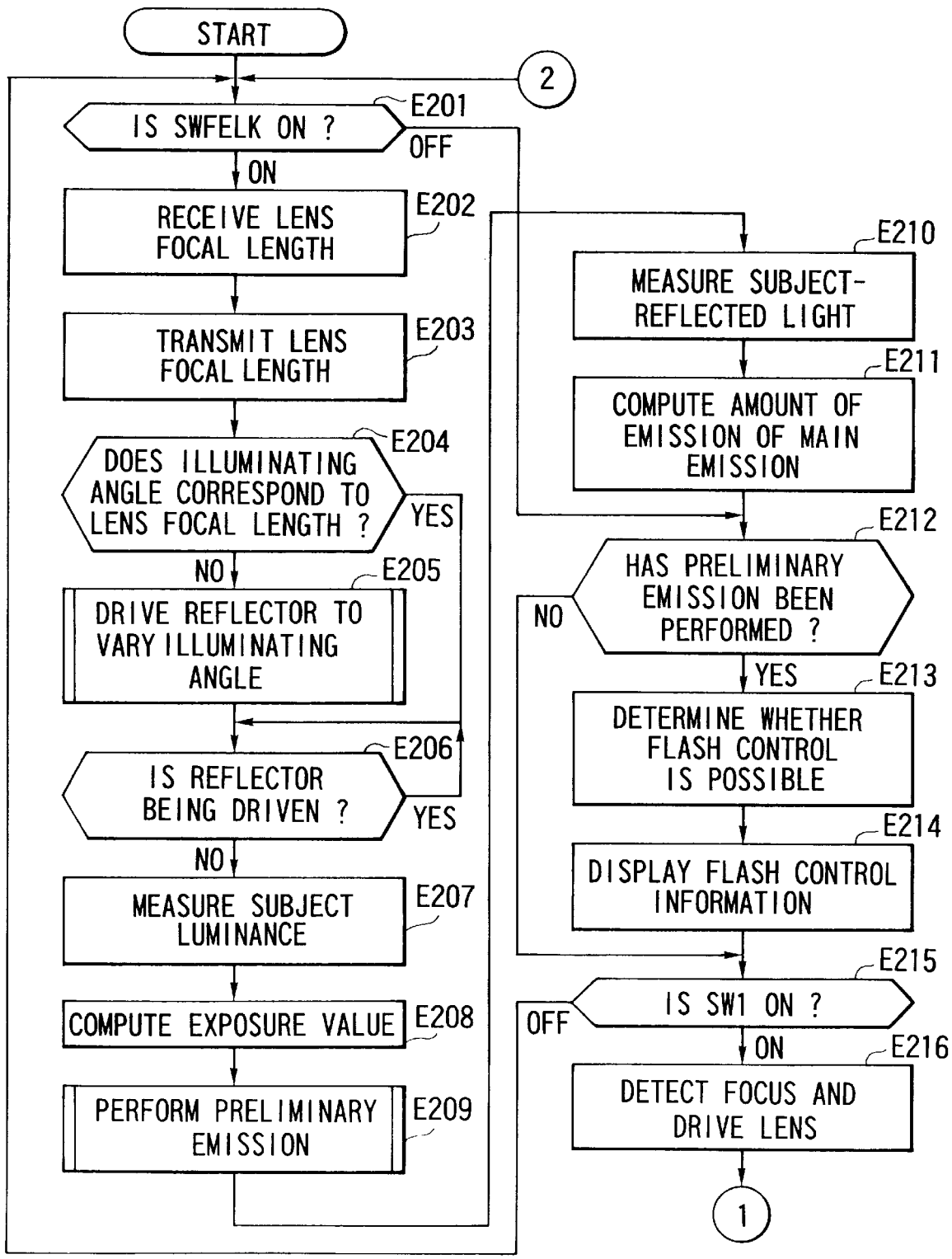
FIG. 28 is a flowchart showing part of the processing operation of a camera system according to a tenth embodiment of the present invention.
Figure 29:
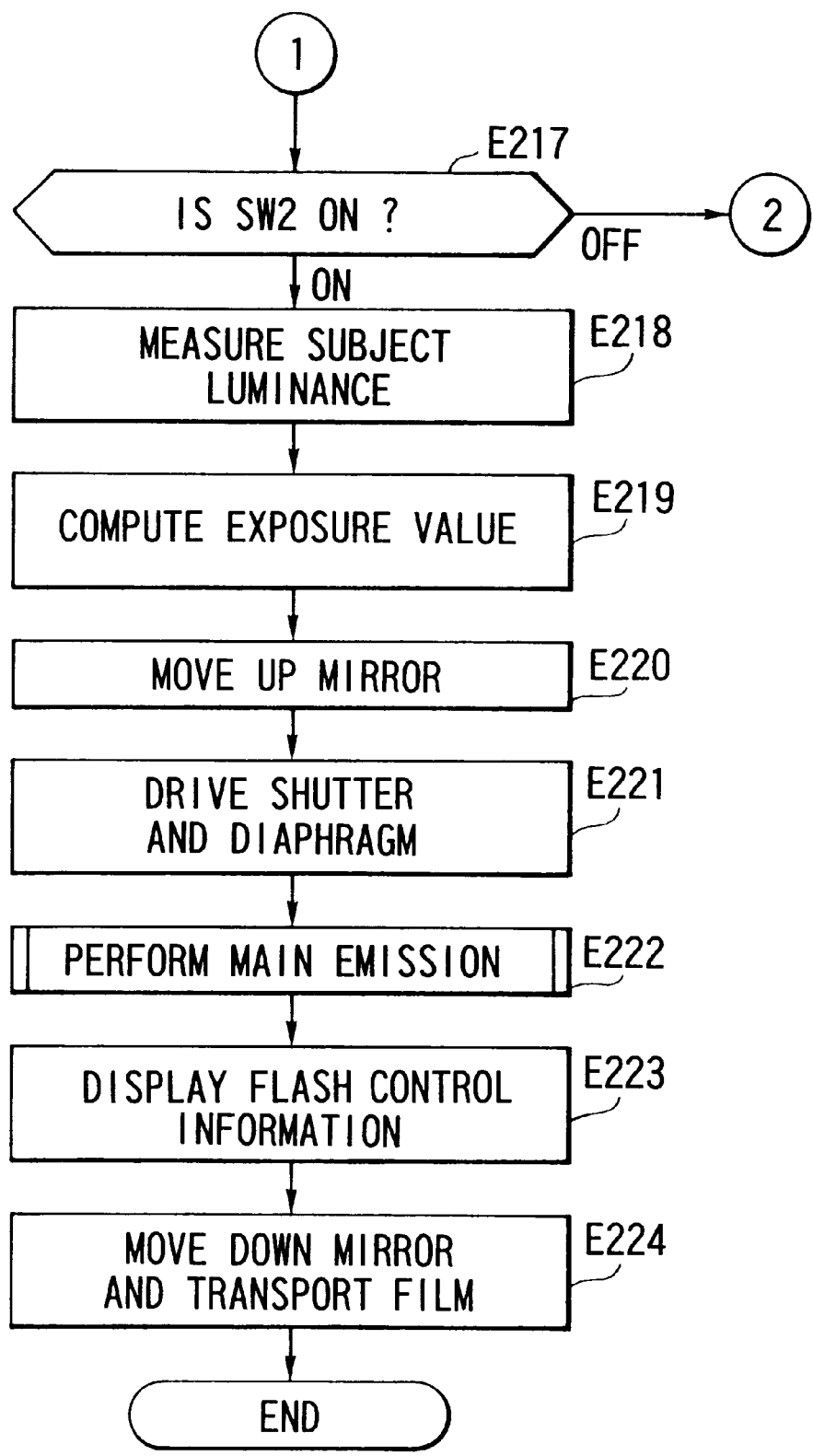
FIG. 29 is a flowchart showing part of the processing operation of the camera system according to the tenth embodiment of the present invention.

FIGS. 28 and 29 show flowcharts for setting an emission operation to be performed by the camera microcomputer 100 and the flash-unit microcomputer 200, and the circled letters "1" and "2" of FIG. 28 are respectively connected to the circled letters "1" and "2" of FIG. 29. First, when the operation of the camera system is started, the process proceeds to Step E201, in which the camera microcomputer 100 determines whether the FE lock switch SWFELK has been turned on. If the switch SWFELK is on, the process proceeds to Step E202, whereas if the switch SWFELK is off, the process jumps to Step E212.

In Step E202, the camera microcomputer 100 receives lens focal length information indicative of the current focal length of the photographing lens system from the lens microcomputer 112. Specifically, the camera microcomputer 100 transmits a command to transmit the lens focal length information, to the lens microcomputer 112 by serial communication through the communication lines L2 to L4, and causes the lens microcomputer 112 to read the code output of the encoder 33 for detecting a lens zoom position indicative of the position of the second lens group 13 for varying magnification, and causes the lens microcomputer 112 to transmit a focal length corresponding to the read code to the camera microcomputer 100 through a serial communication command line.

Then, in Step E203, the camera microcomputer 100 transmits the focal length information read in the Step E202 to the flash-unit microcomputer 200 through the serial communication lines SO, Si and S2. Then, in Step E204, the flash-unit microcomputer 200 reads the output of the encoder 215 for detecting a flash zoom position indicative of the current emission-illuminating angle of the flash unit 18, and compares the current illuminating angle and the lens focal length transmitted from the camera microcomputer 100 and determines whether the illuminating angle corresponds to the lens focal length (whether the illuminating angle is an appropriate angle). If the illuminating angle corresponds to the lens focal length, the process proceeds to Step E206, whereas if the illuminating angle does not correspond to the lens focal length, the process proceeds to Step E205.

In Step E205, the flash-unit microcomputer 200 instructs the motor driving circuit 211 to drive the reflector 20 (the motor 212) so as to change the illuminating angle to an angle corresponding to the lens focal length.

In Step E206, the camera microcomputer 100 determines via the aforesaid serial communication whether the reflector 20 is being driven. If the reflector 20 is being driven, the process repeats Step E206t whereas if the driving of the reflector 20 has been completed, the process proceeds to Step E207.

In Step E207, the camera microcomputer 100 obtains the subject luminance value Bv through the light measuring circuit 106. Then, in Step E208, the camera microcomputer 100 determines the amount of correct exposure, EvS (=Tv+Av), on the basis of the subject luminance and the film sensitivity, and determines a shutter speed and an aperture value in accordance with a photographing mode which has been set. Then, in Step E209, the camera microcomputer 100 indicates a predetermined amount of emission to the flash-unit microcomputer 200 and causes the flash unit 18 to perform a preliminary emission.

Then, in Step E210, the camera microcomputer 100 causes the light measuring circuit 106 to measure the light reflected from a subject during the preliminary emission, and, in Step E211, obtains the amount of correct emission of a main emission relative to the preliminary emission by subtracting the amount of exposure of the preliminary emission measured in Step E210 from the amount of correct exposure obtained in Step E208. Specifically, the camera microcomputer 100 obtains a main emission luminance (the amount of correct emission of the main emission) which is required to achieve a correct exposure, by subtracting the luminance of reflected light due to the preliminary emission of the flash unit 18 from the subject luminance under natural light.

Then, in Step E212, the camera microcomputer 100 determines whether the preliminary emission has been performed. If the preliminary emission has been performed, the process proceeds to Step E213, whereas if the preliminary emission has not been performed, the process proceeds to Step E215. In Step E213, the camera microcomputer 100 determines whether flash control is possible, on the basis of the amount of correct emission of the main emission obtained in Step E211. Then, in Step E214, the camera microcomputer 100 causes a predetermined flash mark to continuously emit light or blink, thereby displaying the result of the decision.

In Step E215, the camera microcomputer 100 determines whether the light measurement/distance measurement starting switch SW1 has been turned on. If the switch SW1 is on, the process proceeds to Step E216, whereas if the switch SW1 is off, the camera microcomputer 100 repeats Steps E201 to E215. In Step E216, the camera microcomputer 100 drives the focus detecting circuit 105 to perform a focus detecting operation using a known phase-difference detecting method. The camera microcomputer 100 also instructs the lens microcomputer 112 to perform driving for focusing, thereby performing focus adjustment. Then, in Step E217, the camera microcomputer 100 determines whether the release starting switch SW2 has been turned on. If the switch SW2 is on, the process proceeds to Step E218. If the switch SW2 is off, the process returns to Step E201.

In Step E218, the camera microcomputer 100 obtains the subject luminance value Bv (=Bvo+Avo) through the light measuring circuit 106 in order to cope with a change of framing which may occur after the preliminary emission. Then, in Step E219, the camera microcomputer 100 determines the amount of correct exposure, EvS (=Tv+Av), from the subject luminance and the film sensitivity, and determines a shutter speed and an aperture value in accordance with a photographing mode which has been set. Then, in Step E220, the camera microcomputer 100 moves up the main mirror 2 and the sub-mirror 25 and retracts them from the photographic optical path, prior to an exposure operation.

Then, in Step E221, the camera microcomputer 100 gives the lens microcomputer 112 an instruction to set a correct aperture value according to the exposure value based on the amount of exposure computed in Step E219, and causes the shutter control circuit 107 to drive the shutter 8 upon completion of such aperture setting. Then, in Step E222, the flash-unit microcomputer 200 is caused to control the main emission of the flash unit 18 in accordance with the amount of emission obtained in Step E206, in synchronism with the driving of the shutter 8.

After the main emission, in Step E223, the camera microcomputer 100 gives the flash-unit microcomputer 200 an instruction to cause the flash control confirmation LED 217 to emit light for a predetermined time in accordance with the latest display instruction given in Step E214. When the exposure operation is completed in this manner, the process proceeds to Step E224, in which the camera microcomputer 100 moves down the main mirror 2 and the sub-mirror 25 which have been retracted from the photographing optical path, thereby obliquely inserting the main mirror 2 and the sub-mirror 25 into the photographing optical path. The camera microcomputer 100 winds the film 9 by one frame, by means of the motor control circuit 108 and the film running detecting circuit 109, and brings the operation to an end.

Although in the tenth embodiment the FE lock switch SWFELK is provided separately from the light measurement/distance measurement starting switch SW1, the switch SW1 and the switch SWFELK may be provided as one switch.

As is apparent from the above description, in the tenth embodiment, if no correct correspondence is established between the focal length of the lens barrel 11 and the illuminating angle of the flash unit 18, the preliminary emission is inhibited even if the photographer operates the switch SWFELK, and, subsequently, after the illuminating angle has been corrected, the preliminary emission is allowed to be executed. Accordingly, it is possible to compute the amount of emission of the main emission according to the lens focal length, so that it is possible to realize flash photography of high exposure accuracy.

(Eleventh Embodiment)

In the above-described tenth embodiment, the camera microcomputer 100 determines whether the illuminating angle of the flash unit 18 (the reflector 20) is being driven, and the camera microcomputer 100 confirms the completion of the driving of the illuminating angle and executes the preliminary emission. However, in an eleventh embodiment, the camera microcomputer 100 reads the current illuminating angle of the flash unit 18, and the camera microcomputer 100 compares the current illuminating angle and a focal length read from the lens barrel 11 and issues an instruction to execute the preliminary emission or the driving of the illuminating angle (the reflector 20). The hardware arrangement of the eleventh embodiment is identical to that of the tenth embodiment, and the description thereof is omitted for the sake of simplicity.

Figure 30:
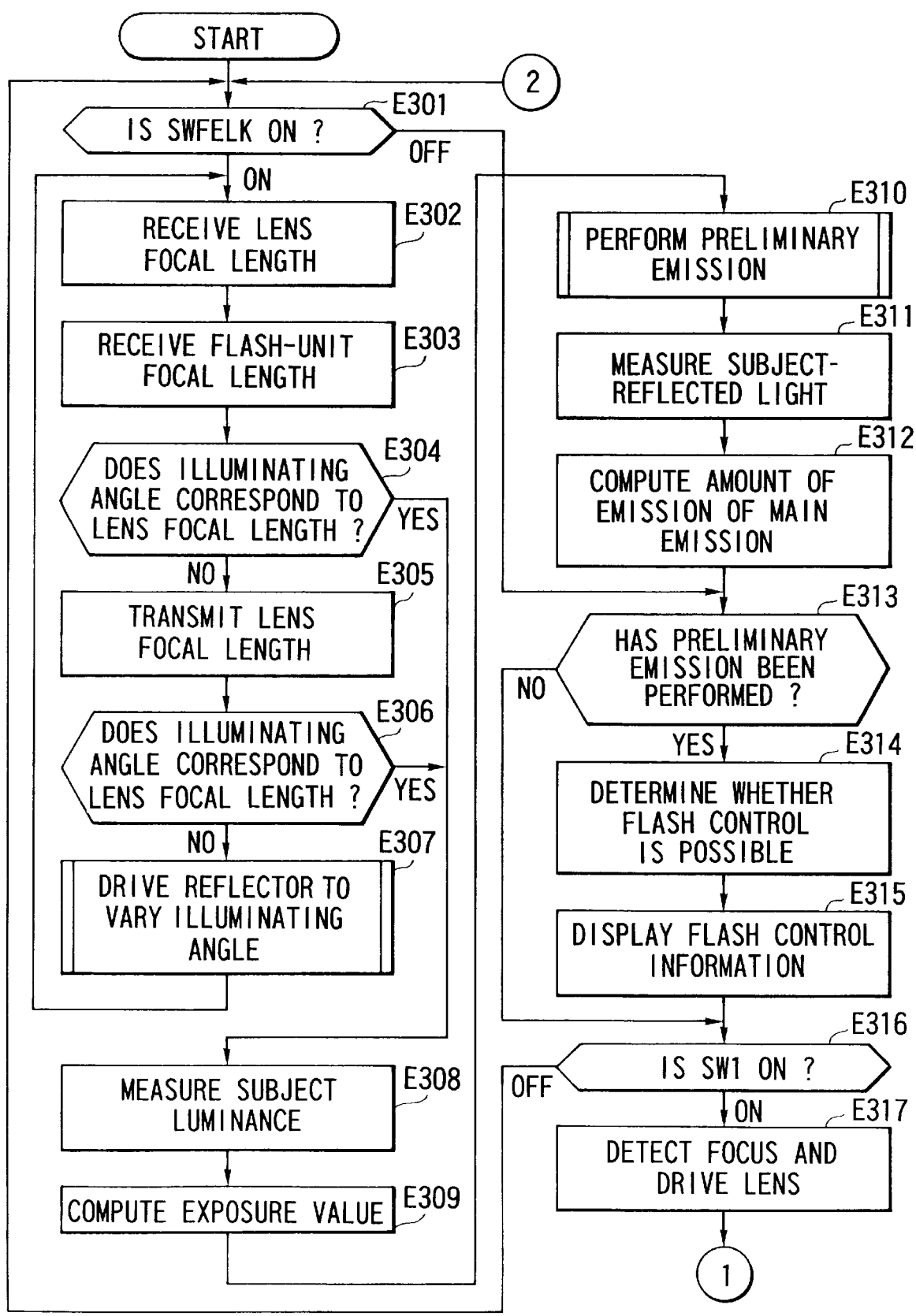
FIG. 30 is a flowchart showing part of the processing operation of a camera system according to an eleventh embodiment of the present invention.
Figure 31:
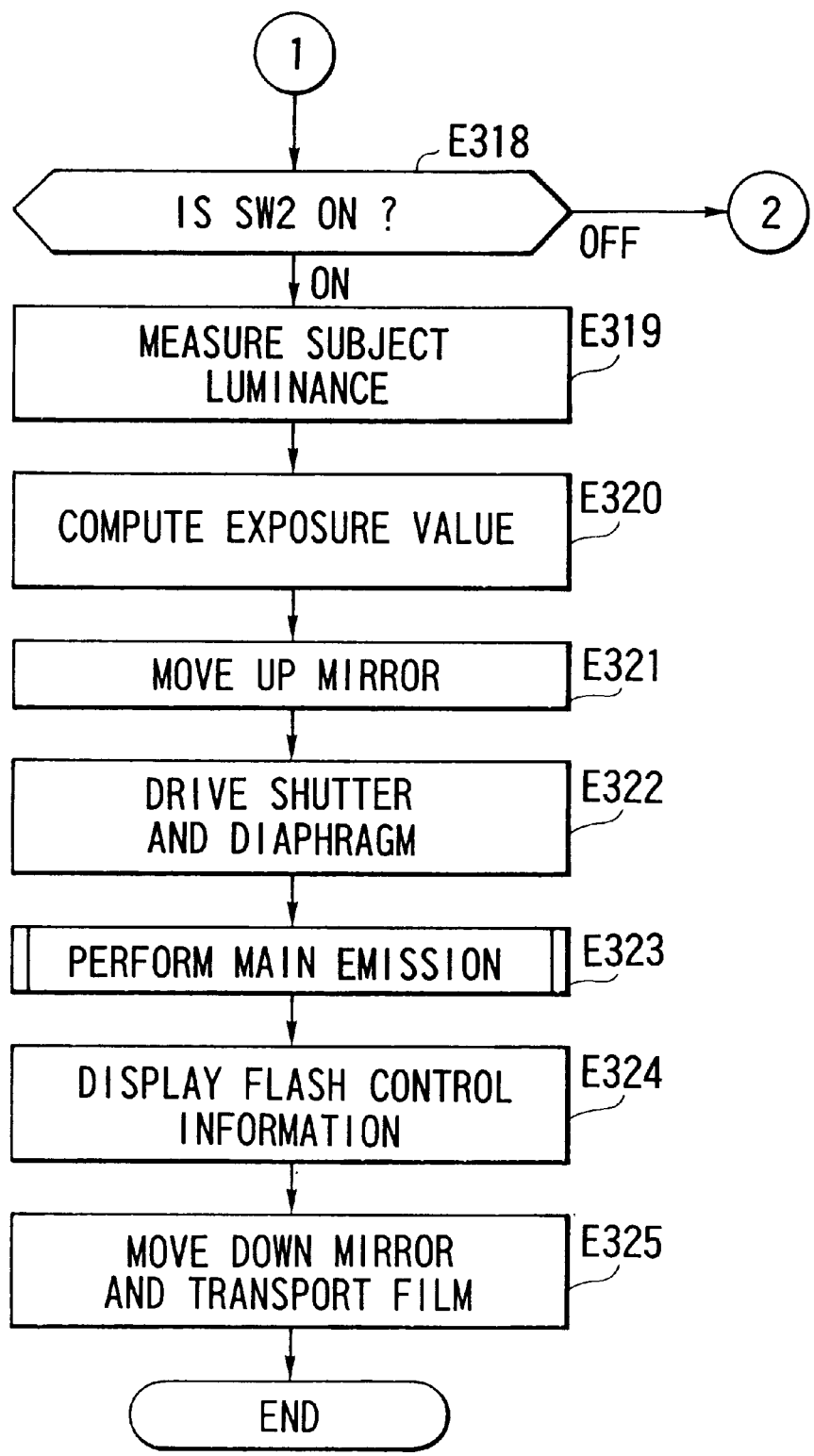
FIG. 31 is a flowchart showing part of the processing operation of the camera system according to the eleventh embodiment.

The operation flow of the camera system in the EF lock mode according to the eleventh embodiment-will be described below with reference to FIGS. 30 and 31. FIGS. 30 and 31 show flowcharts for setting an emission operation to be performed by the camera microcomputer 100 and the flash-unit microcomputer 200, and the circled letters "1" and "2" of FIG. 30 are respectively connected to the circled letters "1" and "2" of FIG. 31. First, when the operation of the camera system is started, the process proceeds to Step E301, in which the camera microcomputer 100 determines whether the FE lock switch SWFELK has been turned on. If the switch SWFELK is on, the process proceeds to Step E302, whereas if the switch SWFELK is off, the process jumps to Step E313.

In Step E302, the camera microcomputer 100 receives lens focal length information indicative of the current focal length of the photographing lens system from the lens microcomputer 112. Specifically, the camera microcomputer 100 transmits a command to transmit the lens focal length information, to the lens microcomputer 112 by serial communication through the communication lines L2 to L4, and causes the lens microcomputer 112 to read the code output of the encoder 33 for detecting a lens zoom position indicative of the position of the second lens group 13 for varying magnification, and causes the lens microcomputer 112 to transmit a focal length corresponding to the read code to the camera microcomputer 100 through the serial communication command line.

Then, in Step E303, the flash-unit microcomputer 200 transmits the current illuminating angle (or the illuminating distance of the flash unit 18) to the camera microcomputer 100 through the serial communication lines S0, S1 and S2. Specifically, when the flash-unit microcomputer 200 receives a command to transmit an illuminating angle or an illuminating distance, from the camera microcomputer 100 through the serial communication lines S0 to S2 by serial communication, the flash-unit microcomputer 200 reads the code output of the zoom position encoder 215 which indicates the angle of the reflector 20, and transmits an illuminating angle or an illuminating distance corresponding to the read code to the camera microcomputer 100 through the serial communication command line.

Then, in Step E304, the camera microcomputer 100 compares the current illuminating angle or illuminating distance received from the flash-unit microcomputer 200 and the lens focal length received from the lens microcomputer 112, and determines whether the illuminating angle or the illuminating distance corresponds to the lens focal length.

If the illuminating angle or the illuminating distance corresponds to the lens focal length, the process proceeds to Step E308, whereas if it does not correspond to the lens focal length, the process proceeds to Step E305.

In Step E305, the camera microcomputer 100 transmits the lens focal length information read in Step E302 to the flash-unit microcomputer 200 through the serial communication lines S0 to S2.

Then, in Step E306, the camera microcomputer 100 compares the current illuminating angle or illuminating distance received from the flash-unit microcomputer 200 and the lens focal length received from the lens microcomputer 112, and determines whether the illuminating angle or the illuminating distance corresponds to the lens focal length. If the illuminating angle or the illuminating distance corresponds to the lens focal length, the process proceeds to Step E308,. whereas if it does not correspond to the lens focal length, the process proceeds to Step E307.

In Step E307, the flash-unit microcomputer 100 instructs the motor driving circuit 211 to drive the reflector 20 (the motor 212) to change the illuminating angle of the flash unit 18 to an angle corresponding to the lens focal length, thereby varying the angle of the reflector 20. After that, the process returns to Step E302, and repeats Steps E302 to E307 until the driving of the illuminating angle (the reflector 20) is completed.

In Step E308, the camera microcomputer.100 obtains the subject luminance value Bv through the light measuring circuit 106. Then, in Step E309, the camera microcomputer 100 determines the amount of correct exposure, EvS (=Tv+Av), on the basis of the subject luminance and the film sensitivity, and determines a shutter speed and an aperture value in accordance with a photographing mode which has been set. Then, in Step E310, the camera microcomputer 100 indicates a predetermined amount of emission to the flash-unit microcomputer 200 and causes the flash unit 18 to perform a preliminary emission.

Then, in Step E311, the camera microcomputer 100 causes the light measuring circuit 106 to measure the light reflected from a subject during the preliminary emission, and, in Step E312, obtains the amount of correct emission of a main emission relative to the preliminary emission by subtracting the amount of exposure of the preliminary emission measured in Step E311 from the amount of correct exposure obtained in Step E309. Specifically, the camera microcomputer 100 obtains a main emission luminance (the amount of correct emission of the main emission) which is required to achieve a correct exposure, by subtracting the luminance of reflected light due to the preliminary emission of the flash unit 18 from the subject luminance under natural light.

Then, in Step E313, the camera microcomputer 100 determines whether the preliminary emission has been performed. If the preliminary emission has been performed, the process proceeds to Step E314, whereas if the preliminary emission has not been performed, the process proceeds to Step E316. In Step E314, the camera microcomputer 100 determines whether flash control is possible, on the basis of the amount of correct emission of the main emission obtained in Step E312. Then, in Step E315, the camera microcomputer 100 causes a predetermined flash mark to continuously emit light or blink, thereby displaying the result of the decision.

In Step E316, the camera microcomputer 100 determines whether the light measurement/distance measurement starting switch SW1 has been turned on. If the switch SW1 is on, the process proceeds to Step E317, whereas if the switch SW1 is off, the camera microcomputer 100 repeats Steps E301 to E315. In Step E317, the camera microcomputer 100 drives the focus detecting circuit 105 to perform a focus detecting operation using a known phase-difference detecting method. The camera microcomputer 100 also instructs the lens microcomputer 112 to perform driving for focusing, thereby performing focus adjustment. Then, in Step E318, the camera microcomputer 100 determines whether the release starting switch SW2 has been turned on. If the switch SW2 is on, the process proceeds to Step E319. If the switch SW2 is off, the process returns to Step E301.

In Step E319, the camera microcomputer 100 obtains the subject luminance value Bv (=Bvo+Avo) through the light measuring circuit 106 in order to cope with a change of framing which may occur after the preliminary emission.

Then, in Step E320, the camera microcomputer 100 determines the amount of correct exposure, EvS (=Tv+Av), from the subject luminance and the film sensitivity, and determines a shutter speed and an aperture value in accordance with a photographing mode which has been set. Then, in Step E321, the camera microcomputer 100 moves up the main mirror 2 and the sub-mirror 25 and retracts them from the photographic optical path, prior to an exposure operation.

Then, in Step E322, the camera microcomputer 100 gives the lens microcomputer 112 an instruction to set a correct aperture value according to the exposure value based on the amount of exposure computed in Step E320, and causes the shutter control circuit 107 to drive the shutter 8 upon completion of such aperture setting. Then, in Step E323, the flash-unit microcomputer 200 is caused to control the main emission of the flash unit 18 in accordance with the amount of emission obtained in Step E312, in synchronism with the driving of the shutter 8.

After the main emission, in Step E324, the camera microcomputer 100 gives the flash-unit microcomputer 200 an instruction to cause the flash control confirmation LED 217 to emit light for a predetermined time in accordance with the latest display instruction given in Step E315. When the exposure operation is completed in this manner, the process proceeds to Step E325, in which the camera microcomputer 100 moves down the main mirror 2 and the sub-mirror 25 which have been retracted from the photographing optical path, thereby obliquely inserting the main mirror 2 and the sub-mirror 25 into the photographing optical path. The camera microcomputer 100 winds the film 9 by one frame, by means of the motor control circuit 108 and the film running detecting circuit 109, and brings the operation to an end.

As is apparent from the above description, similarly to the first embodiment, in the tenth embodiment as well, if no correct correspondence is established between the focal length of the lens barrel 11 and the illuminating angle of the flash un it 18, the preliminary emission is inhibited even if the photographer operates the switch SWFELK, and, subsequently,, after the illuminating angle has been corrected, the preliminary emission is allowed to be executed. Accordingly, it is possible to compute the amount of emission of the main emission according to the lens focal length, so that it is possible to realize flash photography of high exposure accuracy.

(Twelfth Embodiment)

Figure 32:
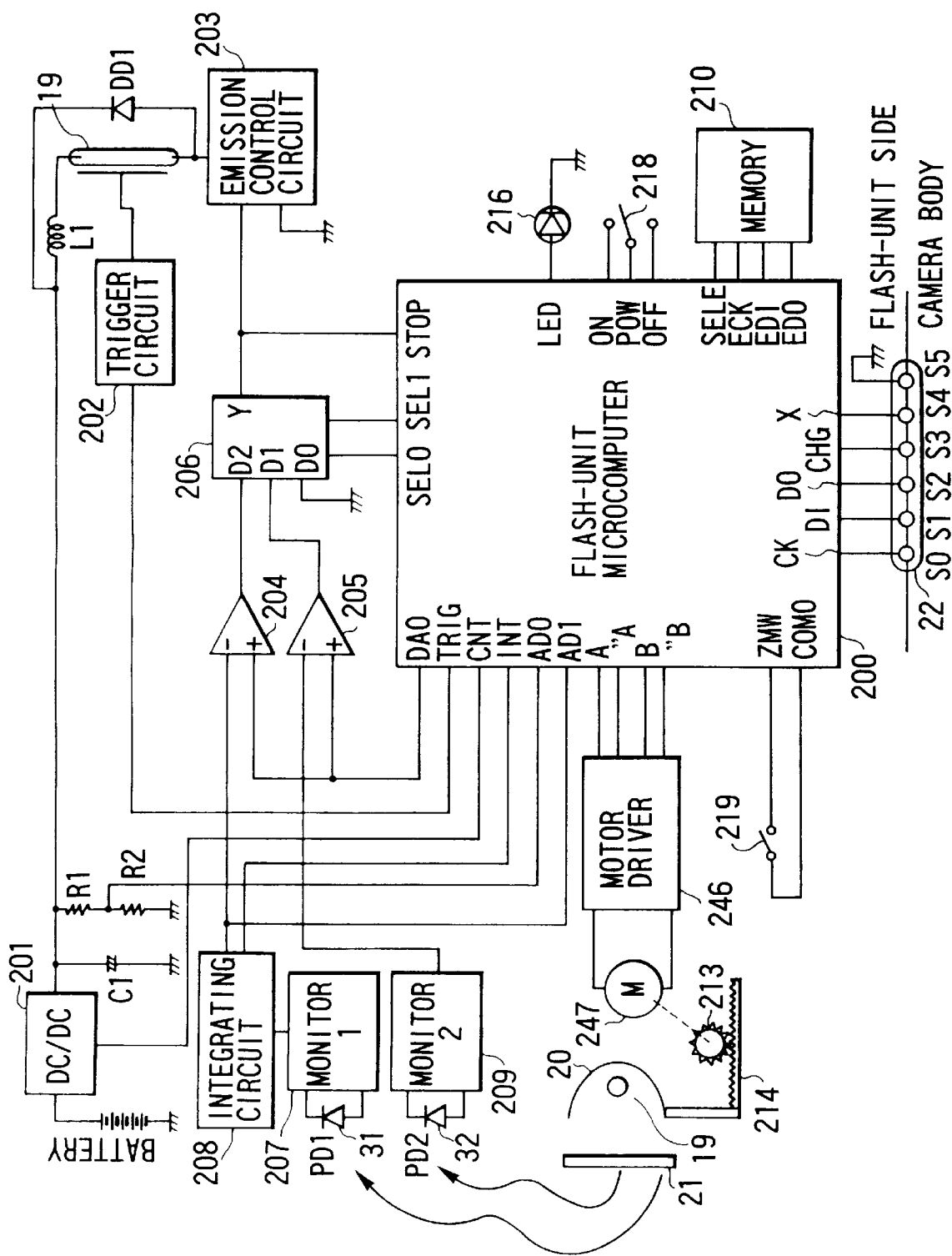
FIG. 32 is a block diagram showing the electrical circuit of a flash unit of a camera system according to a twelfth embodiment of the present invention.

In a twelfth embodiment, a stepping motor is used to detect the illuminating angle of the flash unit 18 and drive the reflector 20 without using an encoder or a DC motor which has been used in the tenth embodiment, so that it is possible to realize far finer control of the illuminating angle by means of a simple construction. FIG. 32 is a block diagram showing the electrical circuit of the flash unit 18 according to the twelfth embodiment. In FIG. 32, identical reference numerals are used to denote constituent elements identical to those shown in FIG. 3, and the description thereof is omitted for the sake of simplicity.

In FIG. 32, reference numeral 246 denotes a known stepping motor driver which drives a stepping motor 247 forwardly or backwardly, brakes the stepping motor 247 and shuts off the supply of electricity to the stepping motor 247. Reference numeral 219 denotes a positioning switch for determining the position of the reflector 20 at the wide-angle end.

Terminals newly added to the flash-unit microcomputer 200 will be described below. Terminals A, "A, B and "B are stepping-motor controlling output terminals, and signals to be outputted through the respective terminals A, "A, B and "B are combined to control the stepping motor 247. A terminal ZMW is an input terminal through which to input an output from the wide-angle-end switch 219, and a terminal COM0 is a terminal through which to input a current equivalent to the ground level of the switch 219.

In the twelfth embodiment which is not provided with the illuminating-angle detecting encoder 215 described above in connection with each of the tenth and eleventh embodiments, since the reflector 20 needs to be positioned at a predetermined location when the power supply of the camera system is turned on, a wide-angle-end detecting switch 219 is provided for positioning purpose. However, a switch similar to the switch 219 may be provided for detecting the telephoto end or an intermediate focal length position.

Figure 33:
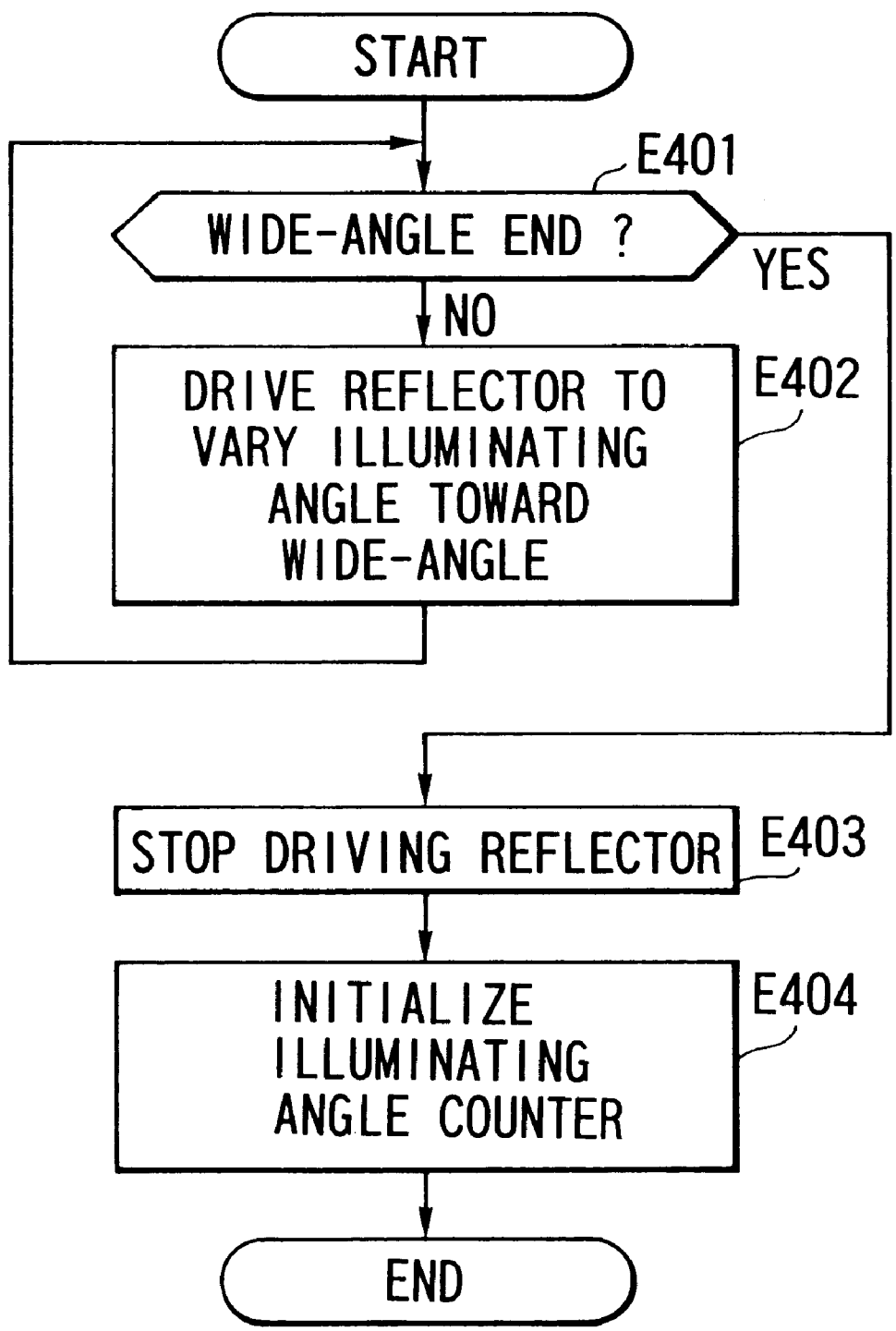
FIG. 33 is a flowchart showing part of the processing operation of the camera system according to the twelfth embodiment.

Initialization of the position of the reflector 20 will be described below with reference to FIG. 33. FIG. 33 is a flowchart showing a program to be executed by the flash-unit microcomputer 200. First, in Step E401, the flash-unit microcomputer 200 reads the output of the switch 219 and determines whether the position of the reflector 20 is the wide-angle end. If it is the wide-angle end, the process proceeds to Step E403, whereas if it is not the wide-angle end, the process proceeds to Step E402.

In Step E402, the flash-unit microcomputer 200 outputs a wide-angle-direction driving signal through the terminals A to "B. and causes the motor driver 246 to forcedly drive the stepping motor 247 in the direction of the wide-angle end. Then, the process returns to Step E401. Thus, Steps E401 and E402 are repeated until the reflector 20 reaches the wide-angle end.

When the reflector 20 reaches the wide-angle end, the flash-unit microcomputer 200 brings the driving of the stepping motor 247 to an end in Step E403. Then, in Step E404, the flash-unit microcomputer 200 resets the count of an illuminating-angle counter for counting the number of pulses corresponding to the illuminating angle, which count is memorized in the RAM (not shown) provided in the flash-unit microcomputer 200. Thus, the initialization of the reflector 20 is completed.

Figure 34:
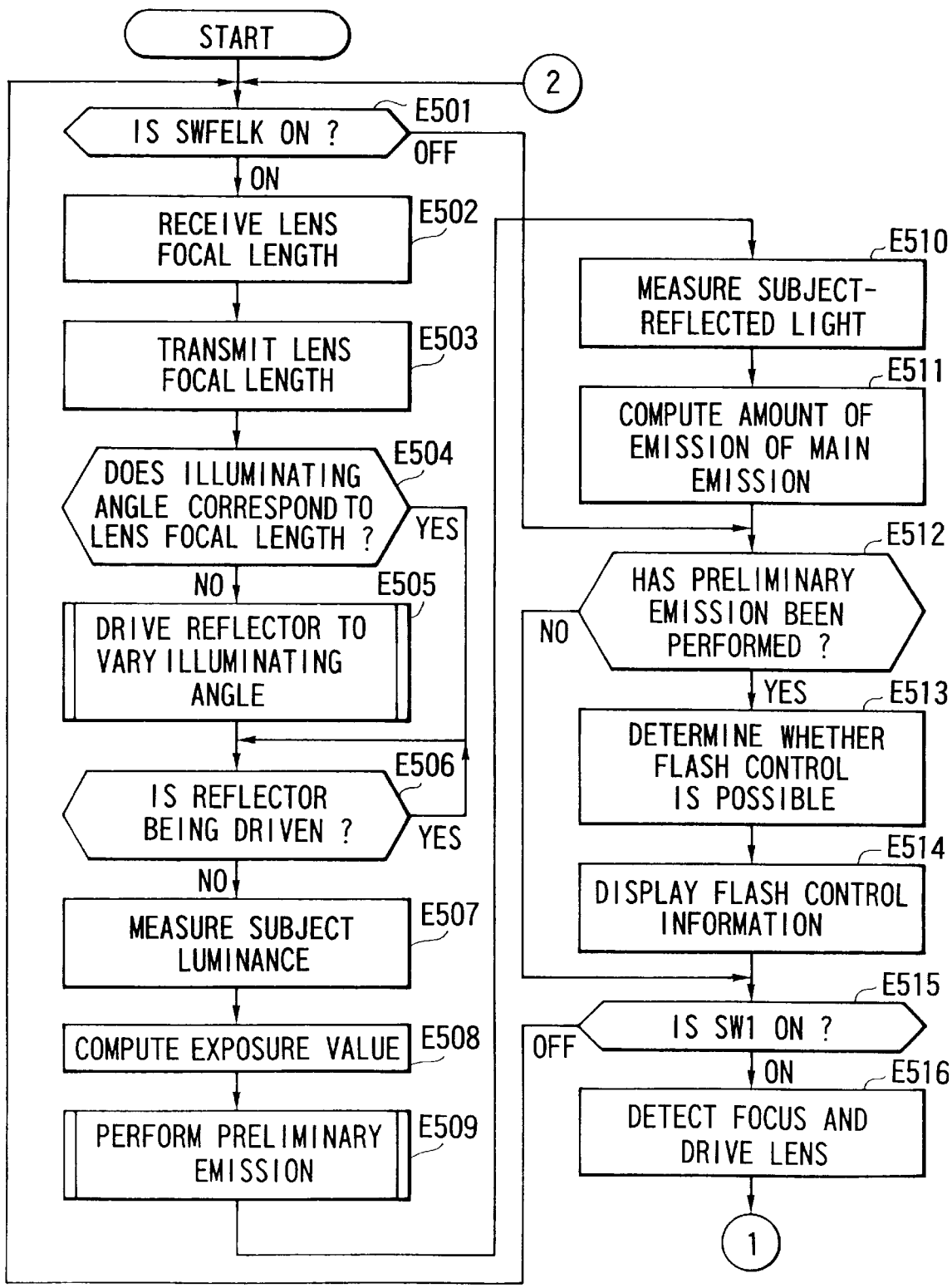
FIG. 34 is a flowchart showing part of the processing operation of the camera system according to the twelfth embodiment.
Figure 35:
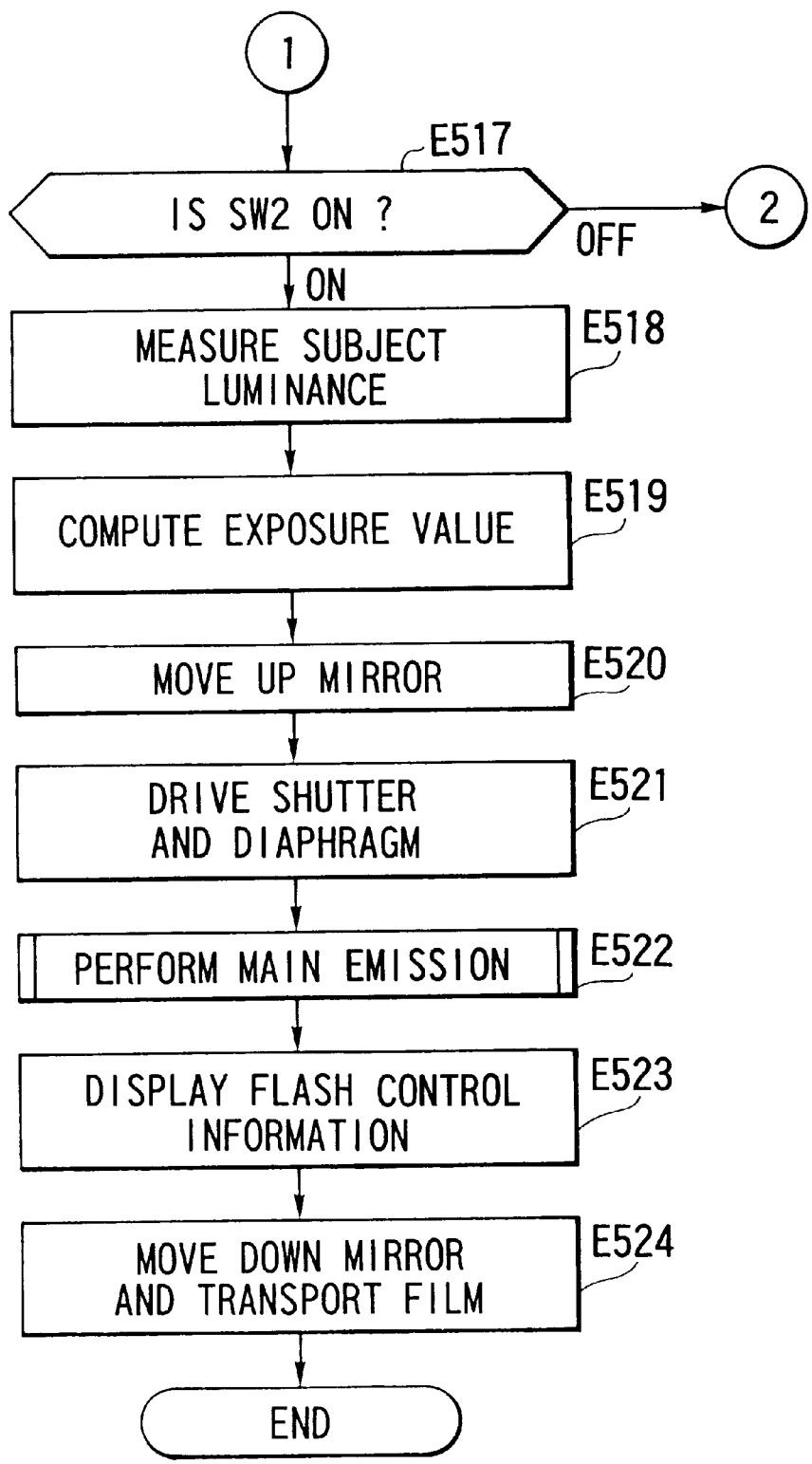
FIG. 35 is a flowchart showing part of the processing operation of the camera system according to the twelfth embodiment.
Figure 36:
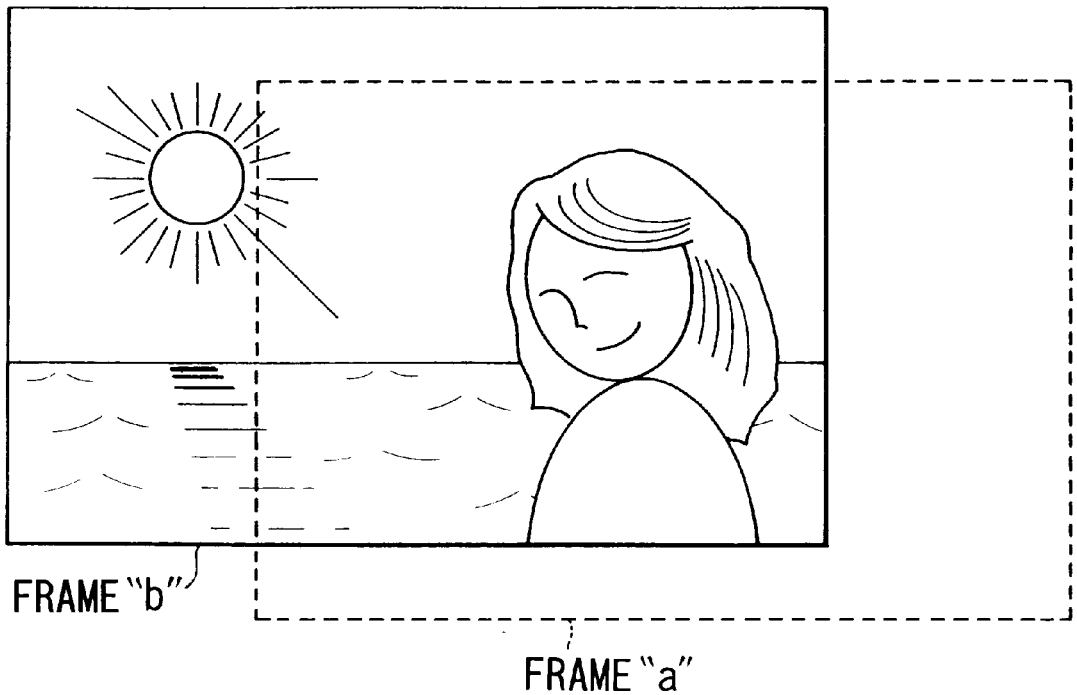
FIG. 36 is an explanatory view of AE lock.
Figure 37:
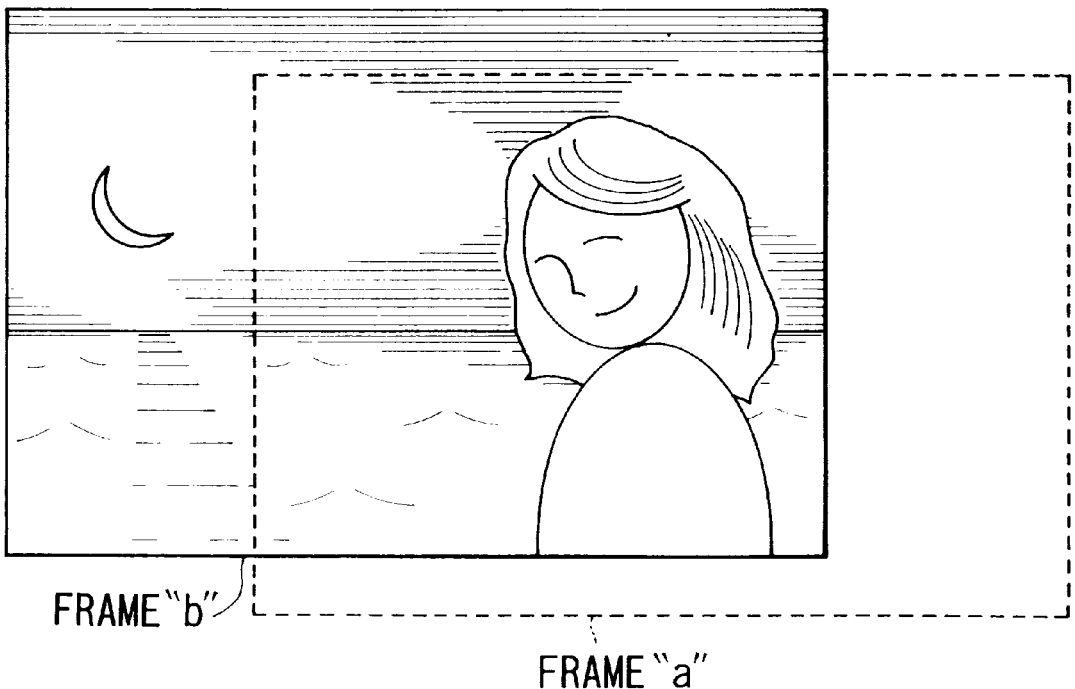
FIG. 37 is an explanatory view of FE lock.

The operation flow of the camera system in the EF lock mode according to the twelfth embodiment will be described below with reference to FIGS. 34 and 35. FIGS. 34 and 35 show flowcharts for setting an emission operation to be performed by the camera microcomputer 100 and the flash-unit microcomputer 200, and the circled letters "1" and "2" of FIG. 34 are respectively connected to the circled letters "1" and "2" of FIG. 35. First, when the operation of the camera system is started, the process proceeds to Step E501, in which the camera microcomputer 100 determines whether the FE lock switch SWFELK has been turned on. If the switch SWFELK is on, the process proceeds to Step E502, whereas if the switch SWFELK is off, the process jumps to Step E512.

In Step E502, the camera microcomputer 100 receives lens focal length information indicative of the current focal length of the photographing lens system from the lens microcomputer 112. Specifically, the camera microcomputer 100 transmits a command to transmit the lens focal length information, to the lens microcomputer 112 by serial communication through the communication lines L2 to L4, and causes the lens microcomputer 112 to read the code output of the encoder 33 for detecting a lens zoom position indicative of the position of the second lens group 13 for varying magnification, and causes the lens microcomputer 112 to transmit a focal length corresponding to the read code to the camera microcomputer 100 through the serial communication command line.

Then, in Step E503, the camera microcomputer 100 transmits the focal length information read in Step E502 to the flash-unit microcomputer 200 through the serial communication lines S0, S1 and S2. Then, in Step E504, the flash-unit microcomputer 200 calculates the current emission-illuminating angle of the flash unit 18 from the count of the illuminating-angle counter memorized in the RAM, and compares the current illuminating angle and the lens focal length transmitted from the lens microcomputer 112, and determines whether the illuminating angle corresponds to the lens focal length (whether the illuminating angle is an appropriate angle). If the illuminating angle corresponds to the lens focal length, the process proceeds to Step E506, whereas if the illuminating angle does not correspond to the lens focal length, the process proceeds to Step E505.

In Step E505, in order to drive the reflector 20 so that the illuminating angle is made coincident with the lens focal length, the flash-unit microcomputer 200 calculates the number of steps in which to drive the stepping motor 247 up to a target drive position, from the current count of the illuminating-angle counter, and causes the motor driver 246 to repeatedly give a predetermined driving pulse pattern to the stepping motor 247, thereby driving the stepping motor 247. Incidentally, by increasing or decreasing the number of driving pulses to be given to the stepping motor 247 and the count of the illuminating angle counter memorized in the RAM, it is possible to obtain the illuminating angle of the flash unit 18 or a focal length corresponding to the illuminating angle at all times.

In Step E506, the camera microcomputer 100 determines via the aforesaid serial communication whether the reflector 20 is being driven. If the reflector 20 is being driven, the process repeats Step E506, whereas if the driving of the reflector 20 has been completed, the process proceeds to Step E507.

In Step E507, the camera microcomputer 100 obtains the subject luminance value Bv through the light measuring circuit 106. Then, in Step E508, the camera microcomputer 100 determines the amount of correct exposure, EvS (=Tv+Av), on the basis of the subject luminance and the film sensitivity, and determines a shutter speed and an aperture value in accordance with a photographing mode which has been set. Then, in Step E509, the camera microcomputer 100 indicates a predetermined amount of emission to the flash-unit microcomputer 200 and causes the flash unit 18 to perform a preliminary emission.

Then, in Step E510, the camera microcomputer 100 causes the light measuring circuit 106 to measure the light reflected from a subject during the preliminary emission, and, in Step E511, obtains the amount of correct emission of a main emission relative to the preliminary emission by subtracting the amount of exposure of the preliminary emission measured in Step E510 from the amount of correct exposure obtained in Step E507. Specifically, the camera microcomputer 100 obtains a main emission luminance (the amount of correct emission of the main emission) which is required to achieve a correct exposure, by subtracting the luminance of reflected light due to the preliminary emission of the flash unit 18 from the subject luminance under natural light.

Then, in Step E511, the camera microcomputer 100 determines whether the preliminary emission has been performed. If the preliminary emission has been performed, the process proceeds to Step E513, whereas if the preliminary emission has not been performed, the process proceeds to Step E515. In Step E513, the camera microcomputer 100 determines whether flash control is possible, on the basis of the amount of correct emission of the main emission obtained in Step E511. Then, in Step E514, the camera microcomputer 100 causes a predetermined flash mark to continuously emit light or blink, thereby displaying the result of the decision.

In Step E515, the camera microcomputer 100 determines whether the light measurement/distance measurement starting switch SW1 has been turned on. If the switch SW1 is on, the process proceeds to Step E516, whereas if the switch SW1 is off, the camera microcomputer 100 repeats Steps E501 to E514. In Step E516, the camera microcomputer 100 drives the focus detecting circuit 105 to perform a focus detecting operation using a known phase-difference detecting method. The camera microcomputer 100 also instructs the lens microcomputer 112 to perform driving for focusing, thereby performing focus adjustment. Then, in Step E517, the camera microcomputer 100 determines whether the release starting switch SW2 has been turned on. If the switch SW2 is on, the process proceeds to Step E518. If the switch SW2 is off, the process returns to Step E501.

In Step E518, the camera microcomputer 100 obtains the subject luminance value Bv (=Bvo+Avo) through the light measuring circuit 106 in order to cope with a change of framing which may occur after the preliminary emission.

Then, in Step E519, the camera microcomputer 100 determines the amount of correct exposure, EvS (=Tv+Av), from the subject luminance and the film sensitivity, and determines a shutter speed and an aperture value in accordance with a photographing mode which has been set. Then, in Step E520, the camera microcomputer 100 moves up the main mirror 2 and the sub-mirror 25 and retracts them from the photographic optical path, prior to an exposure operation.

Then, in Step E521, the camera microcomputer 100 gives the lens microcomputer 112 an instruction to set a correct aperture value according to the exposure value based on the amount of exposure computed in Step E519, and causes the shutter control circuit 107 to drive the shutter 8 upon completion of such aperture setting. Then, in Step E522, the flash-unit microcomputer 200 is caused to control the main emission of the flash unit 18 in accordance with the amount of emission obtained in Step E506, in synchronism with the driving of the shutter 8.

After the main emission, in Step E523, the camera microcomputer 100 gives the flash-unit microcomputer 200 an instruction to cause the flash control confirmation LED 217 to emit light for a predetermined time in accordance with the latest display instruction given in Step E514. When the exposure operation is completed in this manner, the process proceeds to Step E524, in which the camera microcomputer 100 moves down the main mirror 2 and the sub-mirror 25 which have been retracted from the photographing optical path, thereby obliquely inserting the main mirror 2 and the sub-mirror 25 into the photographing optical path. The camera microcomputer 100 winds the film 9 by one frame, by means of the motor control circuit 108 and the film running detecting circuit 109, and brings the operation to an end.

Although in the twelfth embodiment the FE lock switch SWFELK is provided separately from the light measurement/distance measurement starting switch SWI, the switch SW1 and the switch SWFELK may be provided as one switch.

As is apparent from the above description, similarly to each of the tenth and eleventh embodiments, in the twelfth embodiment, if no correct correspondence is established between the focal length of the lens barrel 11 and the illuminating angle of the flash unit 18, the preliminary emission is inhibited even if the photographer operates the switch SWFELK, and, subsequently, after the illuminating angle has been corrected, the preliminary emission is allowed to be executed. Accordingly, it is possible to compute the amount of emission of the main emission according to the lens focal length, so that it is possible to realize flash photography of high exposure accuracy. In addition, since the stepping motor 247 is used for varying the illuminating angle of the flash unit 18, the illuminating-angle detecting encoder 33 which has been used in each of the tenth and eleventh embodiments can be omitted and the illuminating angle of the flash unit 18 can be controlled far more finely.

The present invention is not limited to only the above-described embodiments, and the embodiments and modifications or their technical elements may be arbitrarily combined with each other, as required.

Although in each of the above-described embodiments the switch SWFELK is interlocked with an operating member independent of the release operating member, the switch SWFELK may be interlocked with the release operating member.

The present invention can also be applied to various types of cameras such as a single-lens reflex camera, a lens shutter camera or a video camera, optical apparatuses other than such cameras, apparatuses other than the optical apparatuses, apparatuses applied to the cameras or the optical or other apparatuses, or elements which constitute part of such apparatuses.

What is claimed is:

1. A camera system in which a flash unit is caused to make a preliminary emission before a main emission and a light measurement circuit for measuring light from the object during the preliminary emission to obtain a control value for controlling the main emission amount on the basis of the light measurement, comprising:
    (a) charge detecting means for detecting a state of charge voltage of a capacitor for storing energy to be used for emission of said flash unit;
    (b) upper limit value computing means for computing an amount-of-emission upper limit value on the basis of charge voltage detected by said charge detecting means;
    said computing means computing a limit value on the basis of a charge voltage at the time of the preliminary emission and computing a limit value on the basis of charge of the charge voltage in said capacitor after the preliminary emission; and
    (c) decision means for determining whether flash control under which the main emission can provide an amount-of-emission corresponding to said control value is possible, before the main emission on the basis of the control value and an amount-of-emission upper limit value computed by said upper limit value computing means.

2. A camera system according to claim 1, wherein the control value for the main emission is computed as a relative value of an emission value of the preliminary emission.

3. A camera system according to claim 1, further comprising display means for displaying a decision result provided by said decision means.

4. A camera system according to claim 3, wherein said display means displays the decision result by continuous lighting and/or blinking of a predetermined display element.

5. A camera system according to claim 3, wherein said display means displays the decision result by displaying a difference between the control value and an amount-of-emission upper limit value attainable when said charge detecting means detects the state of charge voltage.

6. A camera system according to claim 3, wherein said display means also displays the decision result after the main emission.

7. A camera system in which a flash unit is caused to make a preliminary emission before a main emission and a light measurement circuit for measuring light from the object during the preliminary emission to obtain a control value for a controlling the main emission amount on the basis of the light measurement, comprising:
    a) charge detecting means for detecting a state of charge voltage of a capacitor for storing energy to be used for emission of said flash unit;
    b) upper limit value computing means for computing an amount of emission upper limit value on the basis of charge voltage detected by said charge detecting means; and
    determination means for determining whether a main emission can be provided corresponding to the control value on the basis of an upper limit value corresponding to a present charge voltage computed by said upper limit value computing means and said control value and for determining whether the main emission can be provided corresponding to the control value on the basis of the upper limit value when the capacitor is fully charged and the control value.

8. A camera system according to claim 7, wherein the control value for the main emission is computed as a relative value of an emission value of the preliminary emission.

9. A camera system according to claim 7, further comprising display means for displaying a decision result provided by said decision means.

10. A camera system according to claim 9, wherein said display means displays the decision result by continuous lighting and/or blinking of a predetermined display element.

11. A camera system according to claim 10, wherein said display means displays the decision result by display of a difference between the control value and the amount-of-emission upper limit value attainable when said capacitor is fully charged.

12. A camera system which performs a preliminary emission before a main emission, finds an amount-of-emission control value for the main emission according to a light-measurement result obtained by a light measuring circuit during the preliminary emission, and performs main-emission control, comprising:

an emission control circuit for causing the preliminary emission to be performed at an arbitrary timing independent of the main emission;

an amount-of-emission computing circuit for obtaining information corresponding to an amount-of-emission upper limit attainable at the time of the preliminary emission and an amount-of-emission upper limit attainable after the preliminary emission, by detecting a state of charge voltage in an emission-energy storing capacitor at the time of the preliminary emission and a state of charge voltage in said capacitor subsequently to the preliminary emission; and a decision circuit for determining whether the main emission can provide an amount of flash emission corresponding to the amount-of-emission control value on the basis of the information corresponding to the amount-of-emission upper limit attainable at the time of the preliminary emission and the amount-of-emission control value, said decision circuit determining whether or not it is possible to provide the main emission in an amount corresponding to the control value on the basis of the information corresponding to the amount-of-emission upper limit obtained after the preliminary emission and the amount-of-emission control value.

13. A camera system which performs a preliminary emission before a main emission, finds an amount-of-emission control value for the main emission according to a light-measurement result obtained by a light measurement circuit during the preliminary emission, and performs main-emission control, comprising:

an emission control circuit for causing the preliminary emission to be performed at an arbitrary timing independent of the main emission;

an amount-of-emission computing circuit for obtaining information corresponding to an amount-of-emission upper limit attainable at the time of the preliminary emission and an amount-of-emission upper limit attainable after the preliminary emission, by detecting a state of charge voltage for Preliminary emission, stored in an emission-energy storing capacitor and a state of charge voltage in said capacitor after the preliminary emission; and a display circuit for displaying whether the main emission can provide an amount of flash emission corresponding to the control value on the basis of the information corresponding to the amount-of-emission upper limit attainable at the time of the preliminary emission and the amount-of-emission control value, said display circuit displaying whether or not it is possible to provide the main emission in an amount corresponding to the control value on the basis of the information corresponding to the amount-of-emission upper limit obtained after the preliminary emission and the amount-of-emission control value.

14. A flash unit for a camera system which causes said flash unit to perform a preliminary emission before causing said flash unit to perform a main emission, computes a control value for the main emission on the basis of a measured light value obtained by a light measuring circuit during the preliminary emission, and determines whether the main emission can be correctly performed, according to the control value and an upper limit value according to a state of charge voltage of an emission-energy storing capacitor of said flash unit, comprising a computing circuit for computing an upper limit value of the main emission according to the state of charge voltage of said capacitor, said computing circuit repeatedly computing the upper limit value after the preliminary emission.

* * * * *

UNITED STATES PATENT AND TRADEMARK OFFICE
CERTIFICATE OF CORRECTION

PATENT NO. : 6,167,202
DATED : December 26, 2000
INVENTOR(S) : Hajime Fukui

It is certified that error appears in the above-identified patent and that said Letters Patent is hereby corrected as shown below:

Column 10,
Line 19, delete "terminal AdO" and insert -- terminal ADO --.

Column 16,
Line 1, delete "EVS" and insert -- EvS --.

Column 20,
Line 49, delete "terminal AdO" and insert -- terminal ADO --.

Column 22,
Line 32, delete "terminal AdO" and insert -- terminal ADO --.

Column 31,
Line 56, delete "terminal AdO" and insert -- terminal ADO --.

Column 37,
Line 12, delete "So, Si and S2" and insert -- SO, S1 and S2 --.
Line 32, delete "E206t" and insert -- E206 --.

Column 39,
Line 24, delete "embodiment-will" and insert -- embodiment will --.

Column 40,
Line 21, delete "E308,." and insert -- E308, --.
Line 31, delete "microcomputer.100" and insert -- microcomputer 100 --.

Column 41,
Line 57, delete "un it 18" and insert "unit 18".
Line 59, delete "subsequently,," and insert -- subsequently, --.

UNITED STATES PATENT AND TRADEMARK OFFICE
CERTIFICATE OF CORRECTION

PATENT NO.   : 6,167,202
DATED        : December 26, 2000
INVENTOR(S)  : Hajime Fukui It is certified that error appears in the above-identified patent and that said Letters Patent is hereby corrected as shown below:

<u>Column 48,</u>
Line 4, delete "Preliminary" and insert -- preliminary --.

Signed and Sealed this

First Day of January, 2002

Attest:

JAMES E. ROGAN
*Attesting Officer*   *Director of the United States Patent and Trademark Office*